United States Patent
Watanabe et al.

(10) Patent No.: US 12,251,907 B2
(45) Date of Patent: Mar. 18, 2025

(54) LAMINATED MEMBER FOR DECORATION AND METHOD FOR PRODUCING DECORATIVE MOLDED ARTICLE

(71) Applicant: NIPPON PAINT AUTOMOTIVE COATINGS CO., LTD., Osaka (JP)

(72) Inventors: Takamitsu Watanabe, Hirakata (JP); Takeki Hosokawa, Hirakata (JP); Yusuke Nakata, Hirakata (JP); Keigo Kitamoto, Hirakata (JP); Satoshi Hirose, Hirakata (JP); Kei Takigawa, Hirakata (JP); Kazuhito Kobayashi, Hirakata (JP)

(73) Assignee: NIPPON PAINT AUTOMOTIVE COATINGS CO., LTD., Osaka (JP)

( * ) Notice: Subject to any disclaimer, the term of this patent is extended or adjusted under 35 U.S.C. 154(b) by 686 days.

(21) Appl. No.: 17/299,168

(22) PCT Filed: Dec. 5, 2019

(86) PCT No.: PCT/JP2019/047678
§ 371 (c)(1),
(2) Date: Jun. 2, 2021

(87) PCT Pub. No.: WO2020/116576
PCT Pub. Date: Jun. 11, 2020

(65) Prior Publication Data
US 2022/0032587 A1     Feb. 3, 2022

(30) Foreign Application Priority Data
Dec. 6, 2018 (JP) .................................. 2018-229462

(51) Int. Cl.
B32B 27/08     (2006.01)
B29B 11/04     (2006.01)
(Continued)

(52) U.S. Cl.
CPC .............. B32B 27/08 (2013.01); B29B 11/04 (2013.01); B29B 11/14 (2013.01); B29C 70/78 (2013.01);
(Continued)

(58) Field of Classification Search
CPC .. B32B 27/08; B32B 7/06; B32B 7/12; B32B 27/308; B32B 27/32; B32B 27/365; B32B 37/02; B32B 37/12; B32B 37/24; B32B 37/26; B32B 38/0008; B32B 38/10; B32B 2037/268; B32B 2250/24; B32B 2255/10; B32B 2307/406; B32B 2307/536; B32B 2307/584; B32B 2307/714; B32B 2307/724; B32B 2307/732; B32B 2310/0831; B32B 2323/10; B32B 2333/12; B32B 2369/00; B32B 2451/00; B32B 2457/20; B32B 2255/205; B32B 23/08; B32B 23/20; B32B 27/281; B32B 27/285; B32B 27/286; B32B 27/302; B32B 2250/02; B32B 2255/26; B32B 2255/28; B32B 2270/00; B32B 2307/4023; B32B 2307/518; B32B 27/16; B32B 27/18;
(Continued)

(56) References Cited

U.S. PATENT DOCUMENTS 11,021,007 B1 *  6/2021  Kobayashi ............. C09D 5/002
2009/0156705 A1   6/2009  Yoneyama et al.
(Continued)

FOREIGN PATENT DOCUMENTS

CN    103382371    11/2013
EP    2 412 773    2/2012
(Continued)

OTHER PUBLICATIONS

Extended European Search Report issued Jul. 13, 2022 in corresponding European Patent Application No. 19891919.3.
(Continued)

*Primary Examiner* — Jeffrey M Wollschlager
(74) *Attorney, Agent, or Firm* — Wenderoth, Lind & Ponack, L.L.P.

(57) ABSTRACT

An object of the present invention is to provide a laminated member for decoration that can be molded into a complicated shape and has a superior hardcoating property. The present invention relates to a laminated member for decoration having a protective film, a coating layer and a resin substrate, wherein the surface roughness Rz(a) of the adhesive layer of the protective film on the side where the coating layer is located and the surface roughness Rz(b) of the coating layer of an unheated sample formed by peeling the protective layer, the surface roughness being taken on the side opposite from the resin substrate, define Rz(b)/Rz(a)× 100 having a prescribed relationship; the surface roughness Rz(b) and the surface roughness Rz(bh) of the coating layer of a heated sample prepared by heating the unheated sample under a prescribed condition, the surface roughness being taken on the side opposite from the resin substrate, satisfy at least one of Formulas (2) and (3) below:

$$0\% \leq Rz(bh)/Rz(b) \times 100 < 30\% \quad (2), \text{ and}$$

$$0 \leq Rz(bh) \leq Rz(b) < 0.5 \ \mu m \quad (3);$$

and the unreacted (meth)acryloyl groups of the coating layer of the heated sample irradiated with a prescribed amount of active energy rays have disappeared 10 to 100% as compared with the coating layer of the unheated sample.

12 Claims, No Drawings

(51) Int. Cl.
| | |
|---|---|
| *B29B 11/14* | (2006.01) |
| *B29C 70/78* | (2006.01) |
| *B29K 69/00* | (2006.01) |
| *B29K 623/00* | (2006.01) |
| *B29K 633/04* | (2006.01) |
| *B29L 31/34* | (2006.01) |
| *B32B 7/06* | (2019.01) |
| *B32B 7/12* | (2006.01) |
| *B32B 27/30* | (2006.01) |
| *B32B 27/32* | (2006.01) |
| *B32B 27/36* | (2006.01) |
| *B32B 37/02* | (2006.01) |
| *B32B 37/12* | (2006.01) |
| *B32B 37/24* | (2006.01) |
| *B32B 37/26* | (2006.01) |
| *B32B 38/00* | (2006.01) |
| *B32B 38/10* | (2006.01) |
| *G02B 1/14* | (2015.01) |
| *B29L 31/00* | (2006.01) |

(52) U.S. Cl.
CPC ............. *B32B 7/06* (2013.01); *B32B 7/12* (2013.01); *B32B 27/308* (2013.01); *B32B 27/32* (2013.01); *B32B 27/365* (2013.01); *B32B 37/02* (2013.01); *B32B 37/12* (2013.01); *B32B 37/24* (2013.01); *B32B 37/26* (2013.01); *B32B 38/0008* (2013.01); *B32B 38/10* (2013.01); *G02B 1/14* (2015.01); *B29C 2795/002* (2013.01); *B29K 2069/00* (2013.01); *B29K 2623/12* (2013.01); *B29K 2633/12* (2013.01); *B29K 2995/0022* (2013.01); *B29K 2995/0026* (2013.01); *B29K 2995/0065* (2013.01); *B29K 2995/007* (2013.01); *B29K 2995/0082* (2013.01); *B29K 2995/0098* (2013.01); *B29L 2031/3475* (2013.01); *B29L 2031/722* (2013.01); *B32B 2037/268* (2013.01); *B32B 2250/24* (2013.01); *B32B 2255/10* (2013.01); *B32B 2307/406* (2013.01); *B32B 2307/536* (2013.01); *B32B 2307/584* (2013.01); *B32B 2307/714* (2013.01); *B32B 2307/724* (2013.01); *B32B 2307/732* (2013.01); *B32B 2310/0831* (2013.01); *B32B 2323/10* (2013.01); *B32B 2333/12* (2013.01); *B32B 2369/00* (2013.01); *B32B 2451/00* (2013.01); *B32B 2457/20* (2013.01)

(58) Field of Classification Search
CPC ....... B32B 27/304; B32B 27/34; B32B 27/36; B32B 27/38; B32B 2307/748; B29B 11/04; B29B 11/14; B29C 70/78; B29C 2795/002; B29C 55/12; B29C 2949/0715; B29C 49/071; B29C 55/023; G02B 1/14; B29K 2069/00; B29K 2623/12; B29K 2633/12; B29K 2995/0022; B29K 2995/0026; B29K 2995/0065; B29K 2995/007; B29K 2995/0082; B29K 2995/0098; B29L 2031/3475; B29L 2031/722; B44C 1/1712; B44C 5/0453; C09D 133/00; C09D 143/04; C09D 175/14
See application file for complete search history.

(56) References Cited

U.S. PATENT DOCUMENTS

| | | | |
|---|---|---|---|
| 2015/0175808 A1 | 6/2015 | Kang et al. | |
| 2016/0363699 A1* | 12/2016 | Kunai | G02B 5/3041 |
| 2018/0265731 A1* | 9/2018 | Ekinaka | C23C 28/00 |
| 2019/0324598 A1* | 10/2019 | Ueki | G09F 9/00 |

FOREIGN PATENT DOCUMENTS

| | | |
|---|---|---|
| JP | 2006-43919 | 2/2006 |
| JP | 2008-133349 | 6/2008 |
| JP | 2009-143048 | 7/2009 |
| JP | 2010-275385 | 12/2010 |
| JP | 2011-126921 | 6/2011 |
| JP | 2012-72327 | 4/2012 |
| JP | 2015-525147 | 9/2015 |
| JP | 2017-161893 | 9/2017 |
| JP | 6393384 | 9/2018 |

OTHER PUBLICATIONS

International Preliminary Report on Patentability issued Jun. 8, 2021 in International (PCT) Application No. PCT/JP2019/047678.
International Search Report issued Mar. 3, 2020 in International (PCT) Application No. PCT/JP2019/047678.

* cited by examiner

LAMINATED MEMBER FOR DECORATION AND METHOD FOR PRODUCING DECORATIVE MOLDED ARTICLE

TECHNICAL FIELD

The present invention relates to a laminated member for decoration and a method for producing a decorative molded article.

BACKGROUND ART

Displays are used in a wide variety of fields such as computers, televisions, cellular phones, portable information terminal devices (tablet personal computers, mobile devices, electronic notebooks, etc.), and automobile display panels such as digital meters, instrument panels, navigation devices, console panels, center clusters and heater control panels. Many of such products have a hardcoat layer. Further, in many cases, exterior parts and interior parts for automobiles have also been provided with a hardcoat layer on their surfaces to improve scratch resistance and the like.

JP-A-2011-126921 (Patent Literature 1) discloses a hardcoating agent composition comprising (A) a (meth)acrylic polymer containing a constitutional unit having a hydroxyl group in its backbone and (B) a urethane (meth)acrylate containing substantially no hydroxyl group, (C) a photopolymerization initiator, and (D) a polyfunctional isocyanate compound. Further, Patent Literature 1 describes that the hardcoating agent composition is applied onto a plastic film to form a hardcoat film.

JP-A-2012-72327 (Patent Literature 2) discloses a radically polymerizable group-containing urethane prepolymer having a molecular structure in which (A) a compound having two hydroxyl groups and one radically polymerizable group in one molecule and (B) a compound having two or more isocyanate groups in one molecule are linked, wherein the radically polymerizable group-containing urethane prepolymer has an equivalent of side chain radically polymerizable groups derived from the component (A) of 1500 g/mol or less. Further, Patent Literature 2 describes that a composition containing this urethane prepolymer is applied onto a plastic film to form a hardcoat film.

CITATIONS LIST

Patent Literature

Patent Literature 1: JP-A-2011-126921
Patent Literature 2: JP-A-2012-72327

SUMMARY OF INVENTION

Technical Problems

In recent years, hardcoat layers to be used for displays, exterior parts, interior parts, etc. tend to be required to have a complicated shape. In addition, they are also required to reduce the occurrence of defective products during molding. Further, hardcoat layers must satisfy various physical properties required as hardcoat layers.

However, the hardcoat films disclosed in Patent Literature 1 and 2 cannot satisfy all such requirements, and there still is a demand for a laminated member that can be molded even into a complicated shape and have superior hardcoating performance.

The present invention solves the above-described conventional problems, and an object of the present invention is to provide a laminated member for decoration that can be molded even into a complicated shape, can reduce the occurrence of defective products during molding, and have superior hardcoating performance, for example, high hardness, abrasion resistance, and chemical resistance.

Solutions to Problems

In order to solve the above-described problems, the present invention provides the following embodiments.

[1]

A laminated member for decoration comprising, in the order of a protective film; a coating layer; and a resin substrate, wherein the protective film has an adhesive layer that is in contact with the coating layer;

a surface roughness $Rz(a)$ of the adhesive layer on its side where the coating layer is located, the surface roughness being taken in a state where the adhesive layer is not in contact with the coating layer, and a surface roughness $Rz(b)$ of the coating layer in an unheated sample comprising a resin substrate and the coating layer formed by peeling the protective film in the laminated member from the coating layer at a rate of 5.0 mm/sec, the surface roughness being taken on a side opposite from the resin substrate, exhibits a relationship of $$85\% < Rz(b)/Rz(a) \times 100 \leq 110\% \quad (1);$$

the surface roughness $Rz(b)$ and a surface roughness $Rz(bh)$ of the coating layer in a heated sample obtained by heating the unheated sample in an atmosphere of 150 to 190° C. for 30 to 60 seconds, the surface roughness being taken on a side opposite from the resin substrate, satisfy at least one of Formulas (2) and (3) below:

$$0\% \leq Rz(bh)/Rz(b) \times 100 < 30\% \quad (2), \text{ and}$$

$$0 \leq Rz(bh) \leq Rz(b) < 0.5 \ \mu m \quad (3);$$

the coating layer has unreacted (meth)acryloyl groups; and in a state where the heated sample has been irradiated with active energy rays of 500 mJ/cm², 10 to 100% of the unreacted (meth)acryloyl groups of the coating layer have disappeared in comparison with the unreacted (meth)acryloyl groups in the coating layer of the unheated sample.

[2]

The laminated member for decoration according to the above [1], wherein the laminated member comprising the protective film, the uncured coating layer and the resin substrate has a stretch ratio of 400% or less.

[3]

The laminated member for decoration according to the above [1] or [2], wherein when a scratch test is performed at a pressure of 0.5 N on the protective film using an Eriksen hardness tester, no scratch test marks are visible on a surface of the coating layer on a side where the protective film is located.

[4]

The laminated member for decoration according to any one of the above [1] to [3], wherein the protective film has an oxygen permeability of 2000 (ml/m² d MPa) or more and 800,000 (ml/m² d MPa) or less at 20° C. and 90% RH, and the adhesive layer has an adhesive strength of 0.025 N/25 mm or more and 1.000 N/25 mm or less on a side where the coating layer is located; and, in a state where the laminated member for decoration is stretched at 0 to 300% in a heating atmosphere of 150 to 190° C., the coating layer has no cracks, and the stretched decorative molded member has no air layer or has no air bubbles having a diameter of 0.3 mm or more in a plan view taken from a side where the protective film is located, at an interface between the protective film and the coating layer.

[5]

The laminated member for decoration according to any one of the above [1] to [3], wherein the protective film comprises at least one protective film substrate having a thickness of 30 µm or more and 100 µm or less selected from among a polyethylene film, a polystyrene film, a modified polyolefin film, a polymethylpentene film, a cast polypropylene film (CPP film) and a biaxially oriented polypropylene film (OPP film), and the adhesive layer having a thickness of 10 µm or more and 30 µm or less;

the adhesive strength between the adhesive layer and the coating layer is 0.005 N/25 mm or more and 0.025 N/25 mm or less; and in a state where a 0 to 300% stretch is further applied in a heating atmosphere of 150 to 190° C. to the coating layer formed by peeling the protective film in the laminated member from the coating layer at a rate of 5.0 mm/sec, the coating layer has no cracks.

[6]

The laminated member for decoration according to any one of the above [1] to [3] and [5], wherein E1 represents a stretch ratio in a heated sample for a stretch test (1) prepared by heating, in an atmosphere of 160° C. for 1 minute, a sample having the coating layer with a thickness of 3 µm or more and 20 µm or less and the resin substrate with a thickness of 100 µm or more and 500 µm or less after peeling, at 20 to 30° C. and a rate of 5.0 mm/sec, the protective film in the laminated member for decoration according to any one of the above [1] to [4] and [6], E2 represents a stretch ratio in a heated sample for a stretch test (2) to be measured under a condition where the heated sample for a stretch test (1) is irradiated with 1 mJ/cm$^2$ or more and 100 mJ/cm$^2$ or less, E3 represents a stretch ratio in a heated sample for a stretch test (3) to be measured under a condition where the heated sample for a stretch test (1) is irradiated with more than 100 mJ/cm$^2$ and 5000 mJ/cm$^2$ or less, and the stretch ratios E1, E2 and E3 have a relationship of $$0\% \leq E3 < 2\% < E2 < 40\% < E1 \quad (4).$$

[7]

The laminated member for decoration according to any one of the above [1] to [6], wherein the coating layer is a layer formed from a composition for forming a coating layer, and the composition for forming a coating layer comprises an unsaturated double bond-containing acrylic resin and/or a non-reactive acrylic resin having a weight-average molecular weight (Mw) of 5000 to 100000, and at least one species selected from the group consisting of polyfunctional (meth)acrylates having an acrylate equivalent of 50 to 500 and polyfunctional urethane (meth)acrylates having an acrylate equivalent of 50 to 500.

[8]

The laminated member for decoration according to any one of the above [1] to [7], wherein the composition for forming a coating layer comprises an unsaturated double bond-containing acrylic resin and/or a non-reactive acrylic resin, a polyfunctional silicon (meth)acrylate having a weight-average molecular weight (Mw) of 700 to 100000, a fluororesin, and inorganic oxide fine particles.

[9]

The laminated member for decoration according to any one of the above [1] to [8], wherein the composition for forming a coating layer comprises either one or both of an ultraviolet absorber and a light stabilizer.

[10]

The laminated member for decoration according to any one of the above [1] to [9], wherein the composition for forming a coating layer in a state of having not been irradiated with active energy rays is a composition that does not change in a shape of molecular weight distribution before and after heating in an atmosphere of 150 to 190° C. for 30 to 60 seconds.

[11]

The laminated member for decoration according to any one of the above [1] to [10], wherein no scratches are visible as a result of a wear test in which the surface of the coating layer in a state where the heated sample prepared by heating the unheated sample in an atmosphere of 150 to 190° C. for 30 to 60 seconds has been irradiated with active energy rays of 500 mJ/cm$^2$ is abraded 2000 times with 9 N.

[12]

A method for producing a decorative molded article, the method comprising any one of the following Step i), Step ii) and Step iii) using a laminated member for decoration:

Step i)

step i) comprising, in the laminated member for decoration according to any one of the above [1] to [3] and [5] to [11], forming a decorative layer on the surface of the resin substrate on a side opposite from the coating layer, peeling the protective film, shaping a coating laminated member comprising the coating layer and the resin substrate, forming a semi-cured laminated member by irradiating the coating laminated member after the shaping with active energy rays exceeding 100 mJ/cm$^2$ to cure the coating laminated member, and insert molding a transparent substrate on a side where the decorative layer of the resin substrate in the cured laminated member is located;

Step ii)

step ii) comprising, in the laminated member for decoration according to any one of the above [1] to [3] and [5] to [11], forming a decorative layer on the surface of the resin substrate on a side opposite from the coating layer, peeling the protective film, shaping a coating laminated member comprising the coating layer and the resin substrate, forming a semi-cured laminated member by irradiating the coating laminated member after the shaping with active energy rays of 1 mJ/cm$^2$ or more and 100 mJ/cm$^2$ or less to semi-cure the coating laminated member, insert molding a transparent substrate on a side where the decorative layer of the resin substrate in the semi-cured laminated member is located, and irradiating the laminated member obtained by molding the transparent substrate with active energy rays exceeding 100 mJ/cm² to cure the semi-cured laminated member; and Step iii)

step iii) comprising, in the laminated member for decoration according to any one of the above [1] to [3] and [5] to [11], forming a decorative layer on the surface of the resin substrate on a side opposite from the coating layer, peeling the protective film, shaping a laminated member for decoration having a decorative layer, insert molding a transparent substrate on a side where the decorative layer of the resin substrate in the laminated member for decoration after the shaping is located, performing irradiation with active energy rays exceeding 100 mJ/cm² to cure the laminated member for decoration after the insert molding, and peeling the protective film.

[13]

The method for producing a decorative molded article according to the above [12], wherein in at least one of the Step i) and the Step ii), E1 represents a stretch ratio in a heated sample for a stretch test (1) prepared by heating, in an atmosphere of 160° C. for 1 minute, a sample having the coating layer with a thickness of 3 μm or more and 20 μm or less and the resin substrate with a thickness of 100 μm or more and 500 μm or less after peeling the protective film in the laminated member at a rate of 5.0 mm/sec and before shaping the coating laminated member, E2 represents a stretch ratio in a heated sample for a stretch test (2) to be measured under a condition where the heated sample for a stretch test (1) is irradiated with 1 mJ/cm² or more and 100 mJ/cm² or less, E3 represents a stretch ratio in a heated sample for a stretch test (3) to be measured under a condition where the heated sample for a stretch test (1) is irradiated with more than 100 mJ/cm² and 5000 mJ/cm² or less, and the stretch ratios E1, E2 and E3 have the relationship of $$0\% \leq E3 < 2\% < E2 < 40\% < E1 \tag{4}.$$

Advantageous Effects of Invention

The laminated member for decoration of the present invention can be molded even into a complicated shape, and further can reduce the occurrence of defective products during molding. Moreover, it has superior hardcoating performance, such as high hardness, abrasion resistance and chemical resistance. Further, by virtue of using a prescribed laminated member for decoration, the method for producing a decorative molded article according to the present invention can perform molding even into a complicated shape, can reduce the occurrence of defective products during molding, and can produce a decorative molded article having high hardness, abrasion resistance and chemical resistance.

DESCRIPTION OF EMBODIMENTS

The process leading to the completion of the present invention will be described. The inventors of the present application have conducted various studies in order to solve the above-described problems. For example, when a hardcoat film called a precure type is used, the hardcoat layer has been cured in a step prior to the preforming (shaping) step of molding into a complicated shape, and cracks occur during preforming. Thus, it was difficult to perform molding into a complicated shape and satisfy the required physical properties.

Then, it was studied to use a so-called aftercure type hardcoat layer in order to successfully provide a complicated shape to a laminated member for decoration and to have superior physical properties. However, a conventional laminated member including the aftercure type hardcoat layer needs to handle an uncured coating film (an uncured composition for forming a coating layer) due to its characteristics, and has a problem that defective products are frequently yielded during the steps of the production of products.

The inventors of the present application found that various problems must be solved in order to mold an aftercure type laminated member for decoration into a complicated shape, the laminated member comprising a protective film, a coating layer and a resin substrate, wherein the coating layer becomes a hardcoat layer after curing, and then they made various studies.

Examples of problems mainly caused by the protective film and the coating layer include a problem that defects on the surface of the protective film are transferred to the coating layer, that is, a problem that defects on the surface of the protective film are transferred to a coating layer containing an uncured composition for forming a coating layer, and a problem that air entrapment occurs between the protective film and the coating layer.

Further, when a decorative layer is formed on the resin substrate on the side opposite from the coating layer, for example, when an ink is printed on the resin substrate, there are a problem that squeegee marks are transferred to the coating layer or the like during printing of the ink and a problem that deformation of the coating layer due to external stress may be generated. In addition, there are problems such as peeling marks of a protective film, possible curling of a laminated member for decoration caused by a mismatch in heat shrinkage of layers.

Further, as described above, various defects often occur in the coating layer before the uncured coating layer is preformed (shaped), and there have occurred various problems, for example, the preforming must be performed in a state where the smoothness of the coating layer is poor.

Further, in some cases, the laminated member for decoration is subjected to insert molding as desired to form a transparent substrate on the laminated member for decoration. In this case, there is also a problem that cracks occur due to the dimensional difference between the preformed laminated member and the mold.

Such various problems have a trade-off relationship, and it was not easy to solve those problems, for example, the attempt to form a complicated shape impairs the physical properties required of the hardcoat layer. Then, as a result of diligent studies, the inventors of the present application accomplished the invention described in the present disclosure, successfully solved the above-described problems, and have successfully obtained a laminated member for decoration that can be molded even into a complicated shape, can reduce the occurrence of defective products during molding, and has superior hardcoating performance, for example, high hardness, abrasion resistance and chemical resistance.

Here, in describing the present invention, unless otherwise specified, the following terms (constituents) have the following layer structure.

In the present disclosure, any laminated member for decoration comprises a protective film, a coating layer, and a resin substrate. In the present disclosure, a member having such constituents may be simply referred to as a laminated member.

In the present disclosure, the unheated sample is a constituent formed by peeling, at a rate of 5.0 mm/sec, the protective film from the coating layer in the laminated member for decoration, and comprises the coating layer and the resin substrate.

In the present disclosure, a heated sample means a sample prepared by at least heating a laminate having a coating layer.

For example, in the case of measuring a surface roughness Rz(bh), the heated sample means a sample that is a constituent formed by peeling, at a rate of 5.0 mm/sec, the protective film from the coating layer in the laminated member for decoration according to the present disclosure, and that comprises the coating layer and the resin substrate formed by heating, in an atmosphere of 150 to 190° C. for 30 to 60 seconds, the unheated sample after the peeling of the protective film.

For example, the unheated sample can be measured at any temperature in an atmosphere of 150 to 190° C., such as 150° C., 160° C., 170° C., 180° C., and 190° C.

On the other hand, in embodiments where various physical properties are evaluated besides the embodiment where the surface roughness Rz(bh) is measured, the sample heated at 160° C. for 30 seconds or the sample heated and held at 160° C. during the measurement period may be simply referred to as a heated sample. In the present disclosure, unless otherwise specified, the coating layer is heated with the protective film peeled. Further, it is preferable to heat the coating layer before irradiation with active energy rays.

In the present disclosure, unless otherwise specified, the heated sample for a stretch test is a constituent formed by peeling, at a rate of 5.0 mm/sec, the protective film from the coating layer in the laminated member for decoration and means a sample prepared by, after peeling the protective film, placing the constituent in a thermostat bath of a device with which a stretch ratio will be measured and heating it in an atmosphere of 160° C. for 1 minute.

In another embodiment, for example, when a stretch test is performed without peeling the protective film, the sample to be subjected to the test is referred to as a heated sample for a stretch test (unpeeled). The heated sample for a stretch test (unpeeled) means a sample that was placed in a thermostat bath of a device for measuring a stretch ratio without peeling the protective film and was heated in an atmosphere of 160° C. for 1 minute.

For example, for the laminated member for decoration according to the present disclosure with which a decorative molded article can be produced by an embodiment including the Step iii) described later, a stretch test can be performed using the above-mentioned heated sample for a stretch test (unpeeled).

In the present disclosure, the decorative molded article has a cured coating layer (also referred to as hardcoat layer) and a resin substrate. Further, the protective film in the laminated member for decoration has been peeled.

(Laminated Member for Decoration)

The present invention is a laminated member for decoration comprising, in this order: a protective film; a coating layer; and a resin substrate, wherein
the protective film has an adhesive layer that is in contact with the coating layer;
a surface roughness Rz(a) of the adhesive layer on its side where the coating layer is located, the surface roughness being taken in a state where the adhesive layer is not in contact with the coating layer, and
a surface roughness Rz(b) of the coating layer in an unheated sample comprising a resin substrate and the coating layer formed by peeling the protective film in the laminated member from the coating layer at a rate of 5.0 mm/sec, the surface roughness being taken on a side opposite from the resin substrate, satisfy a relationship of $$85\% < Rz(b)/Rz(a) \times 100 \leq 110\% \quad (1);$$

the surface roughness Rz(b) and
a surface roughness Rz(bh) of the coating layer in a heated sample obtained by heating the unheated sample in an atmosphere of 150 to 190° C. for 30 to 60 seconds, the surface roughness being taken on a side opposite from the resin substrate, satisfy at least one of Formulas (2) and (3) below:

$$0\% \leq Rz(bh)/Rz(b) \times 100 < 30\% \quad (2), \text{ and}$$

$$0 \leq Rz(bh) \leq Rz(b) < 0.5 \text{ μm} \quad (3);$$

the coating layer has unreacted (meth)acryloyl groups; and
in a state where the heated sample has been irradiated with active energy rays of 500 mJ/cm$^2$, 10 to 100% of the unreacted (meth)acryloyl groups of the coating layer have disappeared in comparison with the unreacted (meth)acryloyl groups in the coating layer of the unheated sample.

Any laminated member for decoration of the present disclosure can have high stretchability, high physical properties, and high yield.

For example, in any laminated member for decoration of the present disclosure, the coating layer can secure rigidity while being uncured. In one embodiment, the laminated member for decoration having the uncured coating layer according to the present disclosure can have a stretch ratio of 200% or more. Further, the decorative molded article obtained after curing the laminated member for decoration can be superior in abrasion resistance and chemical resistance.

Accordingly, the laminated member for decoration of the present disclosure can be molded even into a complicated shape, can reduce the occurrence of defective products during molding, and can have superior hardcoating performance, for example, high hardness, abrasion resistance, and chemical resistance.

Further, any laminated member for decoration of the present disclosure can achieve the above-described effects, can also solve the problems described below, and can have the effects described below.

The effects described below are examples and are not construed as being limited to this theory.

(I) For example, the adhesive layer of the protective film has good followability and adhesion to the coating layer, so that the problem of air entrapment has been successfully solved. Furthermore, by virtue of having the prescribed adhesive layer according to the present invention, the problem that defects that may occur in the substrate of the protective film are transferred to an uncured hardcoat layer can be solved.

For example, the coating layer according to the present disclosure can be heated before being cured to form a hardcoat layer as long as the properties of the composition for forming a coating layer are not impaired, whereby it can have high smoothness.

(II) For example, the coating layer according to the present disclosure can have a certain resistance against external stress, so that when a decorative layer is formed, the coating layer can inhibit the problem of transfer of scratches and squeegee marks that may be formed during printing an ink to a substrate, deformation or the like based on external stress, and scratches, dents, etc. due to handling of an uncured coating layer.

(III) For example, with any laminated member for decoration of the present disclosure, it is possible to prevent the protective film from peeling that may be caused by the difference in the heat shrinkage of each layer and/or the difference in the adhesive layer of the protective film, and curling of the laminated member for decoration can be prevented.

(IV) For example, with any laminated member for decoration of the present disclosure, by peeling the protective film and then heating under conditions where the physical properties of the coating layer, etc. are not impaired, the surface roughness caused by the protective layer can be reduce or eliminated, so that a superior appearance, for example gloss can be developed.

For example, the coating layer can form a smoother surface through additional heating during molding and can significantly reduce surface defects (defective smoothness) caused by the lamination of the protective film to an uncured coating layer, so that a resulting molded article can exhibit a superior appearance, for example superior glossiness.

(V) For example, with any laminated member for decoration of the present disclosure, when a preformed laminated member and a transparent substrate are insert molded, the occurrence of cracks during injection molding due to the dimensional difference between the preformed laminated member and the mold used for the insert molding can be inhibited or prevented.

As described above, the laminated member for decoration of the present disclosure have successfully solved a composite problem, so that it can be molded even into a complicated shape, can reduce or inhibit the occurrence of defective products during molding, and has superior hardcoating performance, for example, high hardness, abrasion resistance, and chemical resistance.

(Protective Film)

The protective film has an adhesive layer being in contact with the coating layer. By virtue of the protective film having a prescribed adhesive layer, the followability and adhesion of the protective film to the coating layer can be maintained, and the uncured coating layer can be better protected from external factors (for example, scratches caused by devices) and air entrapment can be inhibited.

Further, even when the uncured hardcoat layer and the protective film are wound up, such a problem does not occur or can be significantly inhibited.

The substrate thickness of the protective film is not particularly limited, and is, for example, 30 μm or more and 100 μm or less, and in one embodiment 31 μm or more and 85 μm or less, for example 32 μm or more and 80 μm or less. In another embodiment, the substrate thickness of the protective film is 33 μm or more and 65 μm or less, for example, 35 μm or more and 65 μm or less.

By virtue of the substrate thickness of the protective film being within such a range, superior resistance against external stress applied to the coating layer can be exhibited, and for example scratches can be effectively inhibited from being formed on the coating layer.

In the present disclosure, the substrate thickness of the protective film means the thickness determined by subtracting the thickness of the adhesive layer from the thickness of the entire protective film.

The thickness of the adhesive layer of the protective film is 10 μm or more and 30 μm or less, for example 10 μm or more and 25 μm or less in one embodiment, and 13 μm or more and 25 μm or less in another embodiment. By virtue of the thickness of the adhesive layer being within such a range, the followability of the protective film to the coating layer can be well secured, air entrapment can be eliminated, and defects associated with air entrapment can be significantly reduced. Moreover, scratches can be effectively inhibited from being formed on the coating layer. Further, by virtue of the adhesive having a thickness in the above range, foreign substances latent in the protective film substrate can be covered, and defects such as dents that may occur in the coating layer can be significantly reduced or inhibited.

The thickness of the substrate in the protective film and the thickness of the adhesive layer may differ depending on the components of the protective film and the adhesive layer, but for example, there is a relationship of (substrate thickness:adhesive layer thickness)=2:1 to 5:1, in one embodiment a relationship of (substrate thickness:adhesive layer thickness)=3:1 to 5:1, for example, a relationship of (substrate thickness:adhesive layer thickness)=3.5:1 to 5:1.

By virtue of having such a relationship, followability and adhesiveness between the protective film and the coating layer can be maintained good and the uncured coating layer according to the present invention can be better protected from external factors.

(Surface Roughness Rz(a))

The surface roughness Rz(a) of the adhesive layer of the protective film on its side where the coating layer is located before coming into contact with the coating layer, that is, in a state where the adhesive layer is not in contact with the coating layer, is 0.01 μm or more and 2.0 μm or less in one embodiment, for example 0.01 μm or more and 1.9 μm or less, and in another embodiment, it is 0.01 μm or more and 1.85 μm or less.

By virtue of the surface roughness Rz(a) of the adhesive layer on its side where the coating layer is located before coming into contact with the coating layer being within such a range, a hardcoat layer obtained by curing an (uncured) coating layer according to the present disclosure can have high smoothness. Moreover, the decorative molded article obtained from the laminated member for decoration of the present disclosure can have a superior appearance such as high glossiness.

In the present disclosure, unless otherwise specified, the state in which the adhesive layer of the protective film is not in contact with the coating layer is a state before the protective film is laminated on the coating layer, and means a protective film in an unlaminated state.

As will be described later, since the surface roughness Rz(a) has a prescribed relationship with Rz(b), for example, the adhesive layer of the protective film has good adhesion and followability to the coating layer, and air entrapment can be significantly inhibited.

In addition, the decorative molded article obtained from the laminated member for decoration of the present disclosure can have a superior appearance such as high glossiness.

In the present disclosure, the surface roughness Rz(a) is a kind of parameter that indicates the bumpy shape (roughness shape) of the surface defined in Appendix JA of JIS B0601;

2001. The ten-point average roughness Rz(a) is the sum of the average of the peak heights of from the first highest mountain peak (projection) to the fifth highest peak and the average of the valley depths of from the first deepest valley (recess) to the fifth deepest valley in a roughness curve with a reference length obtained by applying a cut-off value phase compensation band pass filter. The ten-point average roughness Rz(a) can be determined, for example, by using a laser microscope in accordance with the provision of JIS B0601; 2001.

In one embodiment, the protective film has an oxygen permeability of 2000 (ml/m² d MPa) or more and 800,000 (ml/m² d MPa) or less at 20° C. and 90% RH. In one embodiment, the adhesive strength of the adhesive layer of the protective film on a side where the coating layer is located may be 0.025 N/25 mm or more and 1.000 N/25 mm or less.

By virtue of the protective film having such characteristics, the coating layer is less likely to allow the occurrence of change in appearance, foaming, or the like.

For example, when the protective film has an oxygen permeability within the above range and the adhesive layer of the protective film has the above-mentioned adhesive strength, the coating layer according to the present disclosure has no cracks in a state where the decorative molded member according to the present disclosure is 0 to 300% stretched in a heating atmosphere of 150 to 190° C. Further, the stretched decorative molded member does not have an air layer at the interface between the protective film and the coating layer, or does not have air bubbles having a diameter of 0.3 mm or more in a plan view taken from the side where the protective film is located.

In addition, a 0 to 300% stretch means extending at an arbitrary value within the above range. However, 0% is in an unstretched state.

In one embodiment, the protective film has an oxygen permeability of 3500 (ml/m² d MPa) and 70000 (ml/m² d MPa) at 20° C. and 90% RH, for example, has an oxygen permeability of 5000 (ml/m² d MPa) or more and 65000 (ml/m² d MPa) or less, and in one embodiment 6000 (ml/m² d MPa) or more and 60000 (ml/m² d MPa) or less.

By virtue of the protective film having an oxygen permeability in such a range, foaming marks and the like can be further inhibited.

Oxygen permeability can be measured using a known method. For example, it can be measured by using differential pressure type gas chromatography. In the present description, unless otherwise specified, the oxygen permeability of the protective film indicates its value of the discrete substrate.

By virtue of the protective film having an oxygen permeability in such a range, defects caused by foaming of the uncured coating layer can be inhibited. As a result, the coating layer can have better smoothness.

For example, in the laminated member for decoration to be used for a decorative molded article to be produced by curing the coating layer by irradiation with active energy rays exceeding 100 mJ/cm² and then peeling the protective film, the protective film may have an oxygen permeability in the range disclosed in the present disclosure, and the adhesive layer of the protective film may have an adhesive strength of 0.025 N/25 mm or more and 1.000 N/25 mm or less on a side where the coating layer is located.

That is, in a laminated member for decoration having a protective film, a coating layer and a resin substrate, the protective film may have an oxygen permeability within the above range, and the adhesive layer of the protective film may have an adhesive strength of 0.025 N/25 mm or more and 1.000 N/25 mm or less on a side where the coating layer is located.

In one embodiment, the oxygen permeability of the protective film may be any value in the range of 2000 (ml/m² d MPa) to 800,000 (ml/m² d MPa) at 20° C. and 90% RH, and the adhesive strength may be any value of 0.025 N/25 mm or more and 1.000 N/25 mm or less.

When the adhesive layer has an adhesive strength of 0.025 N/25 mm or more and 1.000 N/25 mm or less, the decorative molded article can be produced through a process comprising Step iii) described later.

In the above embodiment, the adhesive strength of the adhesive layer of the protective film on a side where the coating layer is located may be 0.025 N/25 mm or more and 1.000 N/25 mm or less, for example, the adhesive strength of the adhesive layer of the protective film on a side where the coating layer is located may be more than 0.025 N/25 mm and 1.000 N/25 mm or less, and may be 0.03 N/25 mm or more and 0.9 N/25 mm or less. In one embodiment, the adhesive strength of the adhesive layer of the protective film on a side where the coating layer is located is 0.03 N/25 mm or more and 0.8 N/25 mm or less.

Adhesive strength can be measured using a known method. For example, it can be measured using a peel strength tester (manufactured by ADY Co., Ltd.).

By virtue of the adhesive strength being within such a range, the followability and adhesiveness of the protective film to the coating layer can be secured, air entrapment can be eliminated, and defects that may be caused by air entrapment can be significantly reduced.

For example, by virtue of both the adhesive strength of the adhesive layer and the oxygen permeability of the protective film being within the above ranges, foaming can be further inhibited in molding under vacuum conditions. Thereby, a molded article having a good appearance can be obtained.

For example, when the protective film has an oxygen permeability within the above range and the adhesive layer of the protective film has an adhesive strength in the range of 0.025 N/25 mm or more and 1.000 N/25 mm or less, the coating layer according to the present disclosure has no cracks in a state where the decorative molded member according to the present disclosure is 0 to 300% stretched in a heating atmosphere of 150 to 190° C. Further, the stretched decorative molded member does not have an air layer at the interface between the protective film and the coating layer, or does not have air bubbles having a diameter of 0.3 mm or more in a plan view taken from the side where the protective film is located. In one embodiment, the stretched decorative molded member has no air bubbles having a diameter of 0.25 mm or more.

In another embodiment, in the laminated member for decoration for a decorative molded article produced by the step of peeling the protective film before irradiation with active energy rays, the adhesive strength of the adhesive layer of the protective film on a side where the coating layer is located is 0.005 N/25 mm or more and 0.025 N/25 mm or less.

That is, in the laminated member for decoration having the protective film, the coating layer before irradiation with active energy rays, and the resin substrate, the adhesive strength of the adhesive layer of the protective film on a side where the coating layer is located is 0.005 N/25 mm or more and 0.025 N/25 mm or less.

For example, when the adhesive layer of the protective film has the above-mentioned adhesive strength, the production of the decorative molded article may comprise Step i) or Step ii) described later.

Although it should not be interpreted only in a specific theory, by virtue of the adhesive strength of the adhesive layer of the protective film on a side where the coating layer is located being 0.005 N/25 mm or more and 0.025 N/25 mm or less, the layer formed from the composition for forming a coating layer according to the present disclosure can retain its morphology without damaging the layer structure even before irradiation with active energy rays.

For example, with any coating layer according to the present disclosure, when the protective film in which the adhesive strength of the adhesive layer of the protective film on a side where the coating layer is located is 0.005 N/25 mm or more and 0.025 N/25 mm or less is peeled from the coating layer at a rate of 5.0 mm/sec, the coating layer according to the present disclosure has no deficiencies or defects in which the coating layer is peeled from the resin substrate even if the coating layer has not been completely cured.

For example, the adhesive strength of the adhesive layer of the protective film on a side where the coating layer is located is 0.005 N/25 mm or more and 0.025 N/25 mm or less, and in one embodiment the adhesive strength is 0.01 N/25 mm or more and 0.025 N/25 mm or less.

In one embodiment, with a laminated member having an adhesive layer and a protective film that has an adhesive strength of 0.005 N/25 mm or more and 0.025 N/25 mm or less with the coating layer, the coating layer has no cracks in a state where a 0 to 300% stretch is applied in a heating atmosphere of 150 to 190° C. to the coating layer formed by peeling the protective film from the coating layer at a rate of 5.0 mm/sec.

By virtue of the protective film and the coating layer having such a relationship, the coating layer in the laminated member for decoration of the present disclosure can secure rigidity at a higher level even while being uncured. Further, the laminated member for decoration having the uncured coating layer according to the present disclosure can have a stretch ratio of 200% or more, for example, can have a stretch ratio of 250% or more.

Moreover, since the laminated member for decoration having the uncured coating layer according to the present disclosure does not develop cracks, it can be molded even into a complicated shape. Further, the decorative molded article obtained after curing the laminated member for decoration can be superior in abrasion resistance and chemical resistance.

The resin film applicable to the substrate of the protective film is not particularly limited. For example, it may be polyolefin film such as polyethylene film and polypropylene film, modified polyolefin film prepared by such polyolefin to add further functions, polyester film such as polyethylene terephthalate, polycarbonate and polylactic acid, polystyrene-based resin film such as polystyrene film, AS resin film and ABS resin film, and such films as nylon film, polyamide film, polyvinyl chloride film, polyvinylidene chloride film, and polymethylpentene film.

Further, those treated with an additive such as an antistatic agent, an ultraviolet protective agent, etc. as necessary and those treated with corona treatment or low temperature plasma treatment on the surface of the substrate may be applied.

In one embodiment, the resin film applicable to the substrate of the protective film is at least one type of film selected from among polyethylene film, polystyrene film, modified polyolefin film, polymethylpentene film, cast polypropylene film (CPP film), and biaxially oriented polypropylene film (OPP film).

In another embodiment, the resin film applicable to the substrate of the protective film is polypropylene film, for example, oriented polypropylene film (OPP film) or cast polypropylene film (CPP film).

In one embodiment, the protective film comprises at least one type of protective film substrate having a thickness of 30 μm or more and 100 μm or less selected from among polyethylene film, polystyrene film, modified polyolefin film, polymethylpentene film, cast polypropylene film (CPP film), and biaxially oriented polypropylene film (OPP film), and an adhesive layer having a thickness of 10 μm or more and 30 μm or less.

(Coating Layer)

The coating layer according to the present disclosure has unreacted (meth)acryloyl groups, and in a state where active energy rays of 500 mJ/cm$^2$ are applied to a heated sample prepared by heating, in an atmosphere of 150 to 190° C. for 30 to 60 seconds, an unheated sample comprising a resin substrate and the coating layer formed by peeling the protective film in the laminated member from the coating layer at a rate of 5.0 mm/sec, 10 to 100% of the unreacted (meth)acryloyl groups of the coating layer have been disappeared as compared with the unreacted (meth)acryloyl groups in the coating layer of the unheated sample.

The coating layer according to the present disclosure is a layer that is uncured at room temperature, and is cured by irradiation with active energy rays. Such a coating layer comprises a composition for forming a coating layer, and a hardcoat layer is formed by curing the coating layer.

Although it should not be interpreted only in a specific theory in the present disclosure, the laminated member for decoration can be molded even into a complicated shape and can reduce the occurrence of defective products during molding by virtue of having the coating layer according to the present disclosure. Moreover, it can have superior hardcoating performance, such as high hardness, abrasion resistance and chemical resistance.

As described above, any coating layer according to the present disclosure can provide a laminated member for decoration that can be molded even into a complicated shape, can reduce the occurrence of defective products during molding, and has superior hardcoating performance, for example, high hardness, abrasion resistance, and chemical resistance.

Herein, as described above, the unheated sample is a sample comprising a resin substrate and a coating layer formed by peeling the protective film of a laminated member comprising a protective film, a coating layer and a resin substrate from the coating layer at a rate of 5.0 mm/sec, and it means a sample that has not been heated at a temperature of 150° C. or higher, for example, a sample placed in a room temperature (20° C. to 30° C.) atmosphere.

Unless otherwise specified, the heated sample means a sample prepared by heating the unheated sample in an atmosphere of 150 to 190° C. for 30 to 60 seconds. Depending on the resin contained in the coating layer, for example, it may be heated at an arbitrary temperature of 150° C. to 190° C. for an arbitrary time of 30 seconds to 60 seconds, and for example, may be heated at 190° C. for 30 seconds.

In the present disclosure, an unreacted (meth)acryloyl group has a double bond represented by C═C, and when irradiated with active energy rays, the unreacted (meth) acryloyl group reacts, so that the double bond disappears. The disappearance of a double bond can be confirmed by using a known method, for example, FT-IR.

In the present disclosure, irradiation with active energy rays means ionizing radiation such as ultraviolet rays, electron beams, α rays, β rays, and γ rays. For example, in the irradiation with active energy rays, ultraviolet rays may be applied.

In one embodiment, the coating layer according to the present disclosure has unreacted (meth)acryloyl groups, and in a state where a heated sample is irradiated with active energy rays of 500 mJ/cm$^2$, for example, ultraviolet rays, the unreacted (meth)acryloyl groups in the coating layer after the irradiation with the active energy rays disappear in the range of 15% or more and 90% or less, for example, disappear in the range of 20% or more and 80% or less, as compared with the unreacted (meth)acryloyl groups in the coating layer of an unheated sample.

In another embodiment, in a state where a heated sample is irradiated with active energy rays of 500 mJ/cm$^2$, the unreacted (meth)acryloyl groups in the coating layer after the irradiation with the active energy rays disappear in the range of 30% or more and 70% or less, for example, disappear in the range of 30% or more and 60% or less, as compared with the unreacted (meth)acryloyl groups in the coating layer of an unheated sample.

In one embodiment, the coating layer according to the present disclosure has unreacted (meth)acryloyl groups, and in a state where a heated sample is irradiated with active energy rays of 5 mJ/cm$^2$, the unreacted (meth)acryloyl groups in the coating layer after the irradiation with the active energy rays disappear in the range of 10% or more and 30% or less as compared with the unreacted (meth)acryloyl groups in the coating layer of an unheated sample.

Further, the coating layer according to the present disclosure has unreacted (meth)acryloyl groups, and in a state where a heated sample is irradiated with active energy rays of 30 mJ/cm$^2$, the unreacted (meth)acryloyl groups in the coating layer after the irradiation with the active energy rays may disappear in the range of 10% or more and 50% or less as compared with the unreacted (meth)acryloyl groups in the coating layer of an unheated sample.

As described above, by virtue of adjusting the integral light quantity of active energy rays for the composition for forming a coating layer to form the coating layer according to the present disclosure, the semi-cured coating layer or the cured coating layer can have desired hardness and followability. Accordingly, it is possible to obtain a laminated member for decoration that can follow deformation without generating cracks and can be easily molded even when a complicated shape is required.

In one embodiment, such effects can also be obtained when irradiating with ultraviolet rays.

In one embodiment, in the coating layer according to the present disclosure, no scratches are visible as a result of a wear test in which the surface of the coating layer in a state where the heated sample prepared by heating the unheated sample described above in an atmosphere of 150 to 190° C. for 30 to 60 seconds has been irradiated with active energy rays of 500 mJ/cm$^2$ is abraded 2000 times with 9 N.

The term "no scratches are visible" as used herein means that scratches cannot be observed when the presence of scratches is visually checked. For example, it means a state where scratches cannot be visually found on a sample surface after a wear test and when the surface is observed using a microscope of 100 magnification, very slight scratches are observed or no scratches are observed.

As described above, the coating layer according to the present disclosure that has been irradiated with active energy rays, such as ultraviolet rays, does not suffer from deterioration in visibility due to change in appearance, has high hardness and abrasion resistance, is superior in long-term visibility-ensuring property, and has superior decorativeness. Moreover, the laminate film for molded decoration can follow deformation without generating cracks and can be easily molded even when a complicated shape is required.

The wear test can be performed using a known method, and for example, the test can be performed by the method shown in Examples. Preferably, the wear test is performed using a cotton cloth.

In the present disclosure, in an unheated sample comprising a resin substrate and a coating layer formed by peeling a protective film in a laminated member from the coating layer at a rate of 5.0 mm/sec, the surface roughness Rz(b) of the coating layer on the side opposite from the resin substrate has a prescribed relationship with the surface roughness Rz(a) and Rz(bh).

For example, the protective film in the laminated member is peeled from the coating layer at 20° C. to 30° C., for example 25° C., at a rate of 5.0 mm/sec. The protective film may be peeled from the coating layer, for example, in accordance with JIS Z 0237: 2009. Further, the peeling may be performed with the peeling direction set to 170°.

Unless otherwise specified, the peeling is performed under the conditions described above in the present description.

In one embodiment, the surface roughness Rz(b) is 0.01 μm or more and 2.0 μm or less, for example 0.01 μm or more and 1.95 μm or less. In one embodiment, the surface roughness Rz(b) is 0.01 μm or more and 1.90 μm or less, for example 0.01 μm or more and 1.80 μm or less.

The surface roughness Rz(b) can be measured in the same manner as the above-mentioned Rz(a).

The surface roughness Rz(a) of the adhesive layer on its side where the coating layer is located, the surface roughness being taken in a state where the adhesive layer is not in contact with the coating layer, namely in an unlaminated state, and the surface roughness Rz(b) of the coating layer in an unheated sample comprising a resin substrate and the coating layer formed by peeling the protective film in the laminated member from the coating layer at a rate of 5.0 mm/sec, the surface roughness being taken on a side opposite from the resin substrate, exhibit a relationship of $$85\% < Rz(b)/Rz(a) \times 100 \leq 110\% \quad (1).$$

By virtue of (Rz(b)/Rz(a)×100) having the above relationship, that is, the relationship of Formula (1), the followability and adhesion between the protective film and the coating layer are excellent, for example, air entrapment between the protective film and the coating can be significantly inhibited. Moreover, even when the protective film and the coating layer are laminated and wound up, air entrapment can be significantly inhibited.

Further, by virtue of (Rz(b)/Rz(a)×100) having the prescribed relationship, the uncured coating layer can have the coating film rigidity required for producing a molded article. For example, the coating layer can maintain a layer structure and can have a hardness sufficient to satisfactorily perform a printing process and preforming. Further, since it is possible to inhibit the coating layer from becoming extremely soft, it is possible to inhibit appearance defects such as protrusions growing on the coating layer.

In one embodiment, the relationship represented by Formula (1) above between the surface roughness Rz(a) on the side where the coating layer is located in a state not in contact with the coating layer and the surface roughness Rz(b) of the coating layer on its side opposite from the resin substrate is $$85.5\% \leq Rz(b)/Rz(a) \times 100 \leq 110\%, \text{ for example}$$

$$86.5\% \leq Rz(b)/Rz(a) \times 100 \leq 110\%.$$

In another embodiment, the relationship between Rz(a) and Rz(b) is $$87\% \leq Rz(b)/Rz(a) \times 100 \leq 110\%.$$

By virtue of having such a range, air entrapment, etc. can be inhibited more satisfactorily.

Further, by virtue of (Rz(b)/Rz(a)×100) having the prescribed relationship, damage to the coating layer at the time of peeling can be inhibited. Further, for example, it is possible to inhibit the coating layer from being peeled together with the protective film and the coating layer from being peeled from the resin substrate.

By virtue of having the prescribed relationship in this way, the adhesiveness and followability between the protective film and the coating layer can be kept good, the coating layer can be protected in a good state, and the protective film and the coating layer can be peeled from each other without impairing the physical properties, appearance, etc. of the coating layer.

The surface roughness Rz(bh) of the coating layer in the laminated member for decoration of the present disclosure on the side opposite from the resin substrate is measured for a heated sample prepared by heating, in an atmosphere of 150 to 190° C. for 30 to 60 seconds, an unheated sample comprising a resin substrate and a coating layer formed by peeling the protective film in the laminated member from the coating layer at a rate of 5.0 mm/sec.

The heating condition may be, for example, a condition of heating at 190° C. for 30 seconds. In another embodiment, the unheated sample may be measured under the condition of being heated at 150° C. for 30 seconds according to the resin contained in the coating layer. Alternatively, the temperature may be raised stepwise in a temperature range of 150° C. or higher and 190° C. or lower and raised for 30 seconds to 60 seconds.

The surface roughness Rz(bh) of the coating layer of the heated sample prepared by heating the unheated sample in an atmosphere of 150 to 190° C. for 30 to 60 seconds, taken on the side opposite from the resin substrate, is 0.01 µm or more and less than 0.7 µm, for example, 0.01 µm or more and 0.5 µm or less, and in another embodiment, it is 0.01 µm or more and 0.45 µm or less, for example, 0.01 µm or more and 0.43 µm or less.

By virtue of having such a numerical range, the coating layer according to the present disclosure can be subjected to heat treatment before the coating layer is completely cured under a condition where the properties required of the coating layer are not impaired, and can be provided with s surface high in smoothness due to the heat treatment. Further, since the coating layer can be preformed into a complicated shape while holding high smoothness, a hardcoat layer obtained from the coating layer can also have a complicated shape and can have a smooth hardcoat surface.

For example, the heat treatment performed under the condition where the properties required of the coating layer are not impaired can be appropriately chosen according to the composition for forming a coating layer to be used, and for example 90° C. or higher and 200° C. or lower, in one embodiment 100° C. or higher and 200° C. or lower, and in another embodiment 110° C. or higher and 200° C. or lower.

The heat treatment time may be, for example, 30 seconds or more and 10 minutes or less.

The relationship between the surface roughness Rz(bh) of a coating layer taken on the side opposite from a resin substrate as measured under the condition where an unheated sample comprising the resin substrate and the coating layer formed by peeling a protective film in a laminated member for decoration from the coating layer at a rate of 5.0 min/sec is heated in an atmosphere of 150 to 190° C. for 30 to 60 seconds, and the surface roughness Rz(b) of a coating layer of an unheated sample prepared by peeling the protective film from the laminated member for decoration without performing the above-mentioned heating treatment satisfies at least one of Formulas (2) and (3) below:

$$0\% \leq Rz(bh)/Rz(b) \times 100 < 30\% \qquad (2), \text{ and}$$

$$0 \leq Rz(bh) \leq Rz(b) < 0.5 \text{ µm} \qquad (3).$$

In one embodiment, by virtue of the coating layer having the relationship of Formula (2) above, the coating layer can have good smoothness even when surface defects which the protective film may have may be transferred to the coating layer. As a result, appearance defects caused by the transfer of the roughness of the protective film, such as low gloss and air entrapment marks, can be significantly reduced or inhibited.

Regarding Formula (2) above, in a certain embodiment, $$1.0\% \leq Rz(bh)/Rz(b) \times 100 < 27\%, \text{ for example}$$

$$2.0\% \leq Rz(bh)/Rz(b) \times 100 \leq 27\%.$$

In another embodiment, $$3.0\% \leq Rz(bh)/Rz(b) \times 100 \leq 20\%, \text{ for example}$$

$$3.5\% \leq Rz(bh)/Rz(b) \times 100 \leq 20\%.$$

For example, when the adhesive layer of the protective film has high smoothness, the coating layer may have the relationship of Formula (3) above. By virtue of having such a relationship, the coating layer can also have good smoothness, and low gloss, air entrapment marks, etc. can be significantly reduced or inhibited.

Here, the fact that the protective film has high smoothness means, for example, that the Rz(a) of the protective film is 0.01 µm or more and 0.5 µm or less, and in one embodiment the Rz(a) is 0.01 µm or more and 0.4 µm or less.

Regarding Formula (3) above, in one embodiment, $$0 \leq Rz(bh) \leq Rz(b) \leq 0.45 \text{ µm}, \text{ for example}$$

$$0.05 \leq Rz(bh) \leq Rz(b) \leq 0.45 \text{ µm}.$$

In one embodiment, the relationship between the surface roughness Rz(bh) and the surface roughness Rz(b) satisfies both Formulas (2) and (3) below:

$$0\% \leq Rz(bh)/Rz(b) \times 100 < 30\% \qquad (2), \text{ and}$$

$$0 \leq Rz(bh) \leq Rz(b) < 0.5 \text{ µm} \qquad (3).$$

By virtue of having both these relationships, the coating layer can have good smoothness even when the surface defects which the protective film may have can be transferred to the coating layer. As a result, appearance defects caused by the transfer of the roughness of the protective film, such as low gloss and air entrapment marks, can be significantly reduced or inhibited.

Further, the coating layer can also have good smoothness, and low gloss, air entrapment marks, etc. can be significantly reduced or inhibited.

The ranges of Formulas (2) and (3) above may be various numerical ranges described above.

In one embodiment, when the laminated member for decoration of the present disclosure is subjected to a scratch test at a pressure of 0.5 N on the protective film using an Eriksen hardness tester, no scratch test marks are visible on the surface of the coating layer on a side where the protective film is located.

The fact that scratch test marks are not visible on the coating layer means that defects such as scratches cannot be found on the coating layer in a visual evaluation.

For example, the five scratches may include no scratches having a surface roughness (Rz) of 1.0 μm or more.

The laminated member for decoration according to the present disclosure has such characteristics and can satisfactorily exhibit the protective performance of the protective film. Further, since the coating layer can have prescribed rigidity, the coating layer itself can also have resistance against external stress.

In addition, in the formation of a decorative layer, for example a printing step, that can be performed in the process of producing a molded article, defects caused by external stress, for example streak-like dents in the coating layer, scratch marks of devices and pressing marks can be inhibited.

The coating layer according to the present invention is a layer that is uncured at room temperature. The laminated member for decoration according to the present disclosure having such a coating layer has a high stretch ratio, and moreover, it does not develop cracks or the like as long as it exhibits a high stretch ratio. For this, the laminated member for decoration according to the present disclosure can be molded into a complicated shape.

In one embodiment, in a stretch test in which a 0 to 300% stretch is applied to a sample in which the thickness of the coating layer is 3 μm or more and 20 μm or less and the thickness of the resin substrate is 100 μm or more and 500 μm or less and which is prepared by peeling the protective film at 20 to 30° C. at a rate of 5.0 mm/sec, the coating layer does not allow rupture, cracks, change in appearance, etc. to occur. In the evaluation of the size of cracks, observation can be performed using, for example, a microscope.

The stretch test can be performed using a known method. For example, the test can be performed using an autograph manufactured by Shimadzu Corporation.

Further, in one embodiment, by virtue of having the prescribed coating layer according to the present disclosure, an unheated sample comprising a resin substrate and the coating layer formed by peeling the protective film in the laminated member from the coating layer at a rate of 5.0 mm/sec can be stretched 150% or more, for example 250% or more, and in one embodiment 300%.

In another embodiment, the coating layer according to the present disclosure is in an uncured state as described above and has superior resistance against rupture and cracks even at a stretch ratio of about 300%.

For example, a laminated member comprising a protective film, an uncured coating layer and a resin substrate has a stretch ratio of 1% or more and 400% or less, preferably 50% or more and 350% or less.

In another embodiment, an unheated sample comprising a resin substrate and the coating layer formed by peeling the protective film in the laminated member from the coating layer at a rate of 5.0 mm/sec has a stretch ratio of 1% or more and 400% or less, and preferably has a stretch ratio of 50% or more and 350% or less.

In one embodiment, there is provided a laminated member for decoration wherein

E1 represents a stretch ratio in a heated sample for a stretch test (1) prepared by heating, in an atmosphere of 160° C. for 1 minute, a sample having the coating layer with a thickness of 3 μm or more and 20 μm or less and the resin substrate with a thickness of 100 μm or more and 500 μm or less after peeling, at 20 to 30° C. and a rate of 5.0 mm/sec, the protective film in the laminated member for decoration according to the present disclosure, E2 represents a stretch ratio in a heated sample for a stretch test (2) to be measured under a condition where the heated sample for a stretch test (1) is irradiated with 1 mJ/cm$^2$ or more and 100 mJ/cm$^2$ or less, E3 represents a stretch ratio in a heated sample for a stretch test (3) to be measured under a condition where the heated sample for a stretch test (1) is irradiated with more than 100 mJ/cm$^2$ and 5000 mJ/cm$^2$ or less, and the stretch ratios E1, E2 and E3 have the relationship of $$0\% \leq E3 < 2\% < E2 < 40\% < E1 \tag{4}$$

In the above embodiment, E1 means the stretch ratio of a sample comprising a resin substrate and an uncured coating layer having been subjected to heating treatment at 160° C., which is a condition where the properties required of the coating layer according to the present disclosure are not impaired, E2 means the stretch ratio of a sample comprising a resin substrate and a semi-cured coating layer after the heating treatment, and E3 means the stretch ratio of a molded article comprising a resin substrate and a cured coating layer after the heating treatment (namely, a hardcoat layer). The stretch ratio E3 indicates the stretch ratio of a molded article, for example the decorative molded article according to the present disclosure. That is, it corresponds to the stretch ratio of a molded article in which a hardcoat layer has been formed by curing the coating layer according to the present disclosure.

Each of the stretch ratios is measured by a known method, for example, under a 160° C. atmosphere at a stretching rate of 300 mm/min.

By virtue of the stretch ratios E1, E2 and E3 having the above relationships, the occurrence of cracks and the like due to the dimensional difference that may occur between the molded article obtained by preforming and the mold used for insert molding is significantly reduced or inhibited.

As described above, any coating layer comprising the composition for forming a coating layer according to the present disclosure can include at least an uncured state, a semi-cured state, and a cured state. Depending on the required physical properties, shape, etc., for example, a laminate having an uncured coating layer may be subjected to processing such as preforming and insert molding.

Accordingly, any laminated member for decoration according to the present disclosure can be molded even into a complicated shape, and can reduce the occurrence of defective products during molding, and moreover, can have superior hardcoating performance, such as high hardness, abrasion resistance and chemical resistance.

In one embodiment, the stretch ratios E1, E2 and E3 have the relationship of $0.1\% \leq E3 < 2\% < E2 < 40\% < E1 \leq 400\%$, for example.
the relationship of $0.1\% \leq E3 < 2\% < E2 < 40\% < E1 \leq 350\%$.

In one embodiment, the stretch ratio E1 may be $200\% \leq E1 \leq 400\%$ and may be $230\% \leq E1 \leq 350\%$.

In one embodiment, the stretch ratio E2 may be $2\% < E2 < 200\%$, or may be $2\% < E2 < 100\%$, or for example may be $2\% < E2 < 50\%$.

When the stretch ratio E2 is in such an embodiment, the relationship between the stretch ratios E1 and E3 represented by Formula (4) above may also be changed according to the range of E2, and for example
may be the relationship of $0\% \leq E3 < 2\% < E2 < 100\% < E1$, or may have the relationship of
$0\% \leq E3 < 2\% < E2 < 50\% < E1$.

By virtue of the stretch ratios E1, E2 and E3 having the above relationships, the occurrence of cracks due to the dimensional difference that may occur between the laminated member obtained by preforming and the mold used for insert molding is significantly reduced or inhibited. In addition, injection molding can be performed while highly accurately maintaining the shape of the laminated member after preforming.

In another embodiment, for example when a stretch test is performed without peeling the protective film, the stretch ratio E1 is measured for a heated sample for a stretch test (unpeeled) to be subjected to the test, in the same manner as in the measurement of the stretch ratio for the heated sample (1) for a stretch test that has been heated in a 160° C. atmosphere for 1 minute. In this case, in the production of a decorative molded article, the decorative molded article can be produced by an embodiment including the Step iii) described later.

In the present disclosure, the "semi-cured" state means a state where a composition for forming a coating layer before curing that is formed by the application of a composition for forming a coating layer is irradiated with active energy rays (for example, ultraviolet rays) in a dose of 1 mJ/cm² or more and 100 mJ/cm² or less.

In the present description, "uncured" and "semi-cured" mean states that are distinguished from a state where the coating layer is completely cured. That is, in the present description, the "semi-cured" state is a state that is not a state where the coating layer is not completely cured, and can be regarded as one embodiment of the "uncured" state.

The coating layer has, for example, a thickness with which a thickness after curing of 2 μm or more and 25 μm or less, in one embodiment 3 μm or more and 20 μm or less, is attained.

In one embodiment, the coating layer according to the present disclosure has no cracks in a state where a 0 to 300% stretch is applied to a decorative molded member in a heated atmosphere of 150 to 190° C.

Further, the stretched decorative molded member does not have an air layer at the interface between the protective film and the coating layer, or does not have air bubbles having a diameter of 0.3 mm or more in a plan view taken from the side where the protective film is located.

In one embodiment, the protective film has an oxygen permeability of 2000 (ml/m² d MPa) or more and 800,000 (ml/m² d MPa) or less at (20° C., 90% RH) and the adhesive strength of the adhesive layer to the coating layer is 0.025 to 1.000 N/25 mm. Further, the coating layer according to the present disclosure has no cracks in a state where a 0 to 300% stretch is applied to a decorative molded member in a heated atmosphere of 150 to 190° C.

Further, the stretched decorative molded member does not have an air layer at the interface between the protective film and the coating layer, or does not have air bubbles having a diameter of 0.3 mm or more in a plan view taken from the side where the protective film is located. For example, the stretched decorative molded member does not have air bubbles having a diameter of 0.25 mm or more at the interface between the protective film and the coating layer, and in one embodiment, has no air bubbles having a diameter of 0.2 mm or more.

By virtue of having such a relationship, it can be performed into a complicated shape while maintaining higher smoothness. Further, the hardcoat layer obtained from the coating layer can also have a complicated shape and, in addition, can have a smooth hardcoat surface.

Composition for Forming a Coating Layer

The coating layer comprises a composition for forming a coating layer. The composition for forming a coating layer according to the present disclosure has an unreacted (meth)acryloyl group.

Further, the coating layer formed by applying the composition for forming a coating layer, for example, the coating layer of an unheated sample has an unreacted (meth)acryloyl group.

Moreover, in a state where the heated sample is irradiated with active energy rays of 500 mJ/cm², 10 to 100% of the unreacted (meth)acryloyl groups of the coating layer have been disappeared as compared with the unreacted (meth)acryloyl groups in the coating layer of the unheated sample.

The composition for forming a coating layer having such a relationship is allowed to set the crosslinking density within a desired range, and the hardcoat layer formed by curing the coating layer can have superior physical properties. For example, it is possible to obtain a molded article being superior in abrasion resistance and chemical resistance and having high hardness.

Thanks to such a coating layer and a composition for forming a coating layer, for example, the effects described below can be obtained.

The composition for forming a coating layer to be used for forming the coating layer according to the present disclosure is preferably a radiation-curable composition for forming a coating layer from the viewpoint of being able to afford high hardness, etc. Of these, a composition for forming an active energy ray-curable coating layer is more preferable.

The active energy ray-curable composition for forming a coating layer may be dried at, for example, 80° C. to 120° C. before being cured or semi-cured.

Further, any active energy ray-curable composition for forming a coating layer according to the present disclosure can be wound with the protective film, the coating layer and the resin substrate are laminated in this order and, for example, air entrapment between the protective film and the coating layer can be significantly reduced.

For example, the coating layer according to the present disclosure comprising an active energy ray-curable composition for forming a coating layer can significantly inhibit defects based on external stress that may occur during the formation of a decorative layer, for example printing on the resin substrate. For example, since defects such as dents and scratches can be inhibited, a molded article having a superior appearance can be obtained.

Further, the coating layer according to the present disclosure can inhibit curling, peeling, etc. due to the difference in heat shrinkage between the protective film and the resin substrate. Moreover, even if a complicated shape is given to the laminated member for decoration of the present disclosure in a preforming step or the like, cracks, change in appearance, foaming, etc. do not occur.

(Resin Component)

The composition for forming an active energy ray-curable coating layer comprises a resin component for forming a coating layer. As such a resin component, an active energy ray-curable component is preferably contained.

The active energy ray-curable component is a monomer, oligomer, or polymer (also referred to as resin) that can be crosslinked and cured by active energy rays (for example, ultraviolet rays). Specific examples of such an active energy ray-curable component include a monomer, oligomer or polymer having at least one unsaturated double bond group, and more specifically include a (meth)acrylate monomer, a (meth)acrylate oligomer, a (meth)acrylate polymer, a urethane (meth)acrylate monomer, a urethane (meth)acrylate oligomer, a urethane (meth)acrylate polymer, each of which has at least one unsaturated double bond group, and modified monomers, oligomers, and polymers thereof. Such monomers, oligomers, and polymers may be used in combination.

Here, "(meth)acrylate" means acrylate and/or methacrylate. In one embodiment, the composition for forming an active energy ray-curable coating layer comprises an unsaturated double bond-containing acrylic resin (also referred to as unsaturated double bond-containing acrylic polymer).

In one embodiment, the composition for forming a coating layer may comprise a non-reactive acrylic resin. The composition for forming a coating layer may comprise an unsaturated double bond-containing acrylic resin and/or a non-reactive acrylic resin.

The composition for forming a coating layer may comprise, for example, a plurality of unsaturated double bond-containing acrylic resins and/or non-reactive acrylic resins.

For example, an active energy ray-curable component, for example, a composition for forming a coating layer comprises an unsaturated double bond-containing acrylic resin and/or a non-reactive acrylic resin each having a weight-average molecular weight (Mw) of 5000 to 100000. In one embodiment, the unsaturated double bond-containing acrylic resin and/or the non-reactive acrylic resin may have a weight-average molecular weight (Mw) of 5000 or more and 100000 or less, for example, a weight-average molecular weight (Mw) of 6000 or more and 95000 or less. The weight-average molecular weight (Mw) can be calculated by a known method.

In another embodiment, when the active energy ray-curable component comprises a plurality of polymers, one polymer may have a weight-average molecular weight (Mw) of 5000 or more and 100000 or less, and another type of polymer may have a weight-average molecular weight (Mw) of 10000 or more and 80000 or less. In addition, polymers differing in the range of weight-average molecular weight (Mw) may be contained.

By using polymers having various weight-average molecular weight ranges in combination, the coating layer can exhibit various properties such as high smoothness and high rigidity when uncured. Further, the hardcoat layer obtained by curing the coating layer can also have high smoothness and superior hardcoating performance, for example, high hardness, abrasion resistance and chemical resistance.

Although it should not be interpreted only in a specific theory, by virtue of containing an unsaturated double bond-containing acrylic resin and/or a non-reactive acrylic resin, it is possible to enhance the rigidity of the uncured coating layer. Furthermore, by virtue of containing at least one species selected from the group consisting of polyfunctional (meth)acrylates and polyfunctional urethane (meth)acrylates, the crosslink density of the hardcoat layer obtained by curing the coating layer can be maintained, and the coating layer can have a high viscosity at room temperature. Further, when heated, the viscosity can be lowered, leading to superior moldability.

As a result, it can be molded even into a more complicated shape and can reduce the occurrence of defective products during molding, and the resulting molded article has better hardcoating performance, for example, higher hardness, abrasion resistance and chemical resistance.

In one embodiment, the composition for forming a coating layer comprises an unsaturated double bond-containing acrylic resin and/or a non-reactive acrylic resins and at least one species selected from the group consisting of polyfunctional (meth)acrylates and polyfunctional urethane (meth)acrylates. For example, the composition for forming a coating layer comprises an unsaturated double bond-containing acrylic resin and/or a non-reactive acrylic resins each having a weight-average molecular weight (Mw) of 5000 to 100000 and at least one species selected from the group consisting of polyfunctional (meth)acrylates having an acrylate equivalent of 50 to 500 and polyfunctional urethane (meth)acrylates having an acrylate equivalent of 50 to 500.

In the present description, the non-reactive acrylic resin is an acrylic resin that does not react or exhibits almost no reactivity even when irradiated with active energy rays, and for example, is an acrylic resin that does not react or exhibit almost no reactivity even when irradiated with ultraviolet rays.

Both the acrylate equivalents of the polyfunctional (meth)acrylate and the polyfunctional urethane (meth)acrylate are, for example, 50 or more and 500 or less, for example, the acrylate equivalents are 60 or more and 400 or less, and in another embodiment, the acrylate equivalents are 70 or more and 350 or less, and in still another embodiment, the acrylate equivalents are 100 or more and 200 or less.

By virtue of containing such a polyfunctional (meth)acrylate and/or a polyfunctional urethane (meth)acrylate and the acrylic resin as described above, air entrapment can be inhibited more satisfactorily, and a coating layer having no dust, scratches, etc. can be obtained. Moreover, it is possible to obtain a molded article having a good appearance without causing defects such as cracks even in a complicated shape.

In addition, it is possible to obtain a molded article being superior in abrasion resistance and chemical resistance and having high hardness.

In one embodiment, the composition for forming a coating layer comprises an unsaturated double bond-containing acrylic resin and/or a non-reactive acrylic resin, a polyfunctional silicone (meth)acrylate, a fluororesin, and inorganic oxide fine particles.

For example, the composition for forming a coating layer comprises an unsaturated double bond-containing acrylic resin and/or a non-reactive acrylic resin, a polyfunctional silicone (meth)acrylate having a weight-average molecular weight (Mw) of 700 to 100000, a fluororesin, and inorganic oxide fine particles.

Although it should not be interpreted only in a specific theory, the inclusion of a polyfunctional silicone (meth)acrylate allows for low surface tension, a superior leveling property and reduced tack. Meanwhile, by virtue of containing a fluororesin, slipperiness can be imparted to the coating layer (coating film). Further, by virtue of containing inorganic oxide fine particles, superior abrasion resistance can be imparted and tack can be reduced.

The weight-average molecular weight (Mw) of the polyfunctional silicon (meth)acrylate is, for example, 700 or more and 100000 or less, 800 or more and 90000 or less in one embodiment, and 800 or more and 85000 or less in another embodiment.

In one embodiment, the fluororesin has a fluorine content of 5% by weight or more and 80% by weight or less, for example, 5% by weight or more and 75% by weight or less.

For example, the composition for forming a coating layer comprises an unsaturated double bond-containing acrylic resin and/or a non-reactive acrylic resin in an amount of more than 20 parts by mass and 60 parts by mass or less, for example, 30 parts by mass or more and 60 parts by mass or less, and in one embodiment 35 parts by mass or more and 60 parts by mass or less, per 100 parts by mass of the solid content contained in the composition. When the composition for forming a coating layer contains a plurality of types of unsaturated double bond-containing acrylic resin and/or non-reactive acrylic resin, the total amount of the plurality of types of unsaturated double bond-containing acrylic resin and/or non-reactive acrylic resin is preferably within the above range.

In the present disclosure, "100 parts by mass of the solid content in a composition" means that, when the composition contains resin solid components such as an unsaturated double bond-containing acrylic resin and/or a non-reactive acrylic resin such as the (meth)acrylic resin described above, a polyfunctional (meth)acrylate, a polyfunctional urethane (meth)acrylate, a polyfunctional silicon (meth)acrylate, a fluororesin and a photopolymerization initiator, and inorganic oxide fine particles, the total with the solid content of the inorganic oxide fine particles is 100 parts by mass.

The composition for forming a coating layer contains a polyfunctional (meth)acrylate and/or a polyfunctional urethane (meth)acrylate in an amount of 5 parts by mass or more and 70 parts by mass or less, for example 10 parts by mass or more and 70 parts by mass or less, in another embodiment 13 parts by mass or more ad 68 parts by mass or less, per 100 parts by mass of the solid content in the composition.

The composition for forming a coating layer contains a polyfunctional silicon (meth)acrylate in an amount of 5 parts by mass or more and 50 parts by mass or less, for example 10 parts by mass or more and 48 parts by mass or less, in another embodiment 15 parts by mass or more ad 48 parts by mass or less, per 100 parts by mass of the solid content in the composition.

The composition for forming a coating layer contains a fluororesin in an amount of 0.1 parts by mass or more and 10 parts by mass or less, for example 1 part by mass or more and 8 parts by mass or less, in another embodiment 1.5 parts by mass or more ad 7 parts by mass or less, per 100 parts by mass of the solid content in the composition.

The composition for forming a coating layer contains inorganic oxide fine particles in an amount of 1 part by mass or more and 55 parts by mass or less, for example 10 parts by mass or more and 50 parts by mass or less, in another embodiment 12 parts by mass or more ad 40 parts by mass or less, per 100 parts by mass of the solid content in the composition.

By virtue of the composition for forming a coating layer containing inorganic oxide fine particles in such a range, rigidity can be imparted to the uncured coating film, and for example, a better coating film appearance can be formed. The appearance of the resulting molded article can be maintained well. In addition, the abrasion resistance of the coating film after curing can be improved.

In one embodiment, the composition for forming a coating layer in a state of having not been irradiated with active energy rays is a composition that does not change in the shape of molecular weight distribution before and after heating in an atmosphere of 150 to 190° C. for 30 to 60 seconds. For example, the coating composition contained in the coating layer of the heated sample for a stretch test (1), which is a sample before irradiation with active energy rays, is a composition that allows no change in the shape of molecular weight distribution before and after heating in an atmosphere of 150 to 190° C. for 30 to 60 seconds.

Herein, the fact that "allow no change in the shape of molecular weight distribution" means that for a peak of weight-average molecular weight or each molecular weight peak when there are two or more molecular weight peaks, both the amount of the vertical shift and the amount of the lateral shift of each molecular weight peak are within the range of ±5% before and after heating in an atmosphere of 150 to 190° C. for 30 to 60 seconds.

From the viewpoints of the capability of achieving a high crosslinking density after curing, the capability of enhancing the effect of improving surface hardness, and the capability of enhancing the effect of improving transparency, the composition for forming a coating layer according to the present disclosure preferably comprises at least one species selected from among polyfunctional (meth)acrylate compounds, polyfunctional urethane (meth)acrylate compounds and polyfunctional silicon (meth)acrylate compounds, such as polyfunctional (meth)acrylate compounds such as polyfunctional (meth)acrylate monomers, polyfunctional (meth)acrylate oligomers or polyfunctional (meth)acrylate polymers (in the present description, a polyfunctional (meth)acrylate compound may be briefly referred to as a "polyfunctional (meth)acrylate");

polyfunctional urethane (meth)acrylate compounds such as polyfunctional urethane (meth)acrylate monomers, polyfunctional urethane (meth)acrylate oligomers and polyfunctional urethane (meth)acrylate polymers (in the present description, a polyfunctional urethane (meth)acrylate compound may be briefly referred to as a "polyfunctional urethane (meth)acrylate"); and polyfunctional silicon (meth)acrylate compounds such as polyfunctional silicon (meth)acrylate monomers, polyfunctional silicon (meth)acrylate oligomers or polyfunctional silicon (meth)acrylate polymers (in the present description, a polyfunctional silicon (meth)acrylate compound may be briefly referred to as a "polyfunctional silicon (meth)acrylate").

As the (meth)acrylate monomer or oligomer having one unsaturated double bond group, a commercially available product may be used. Examples of such a commercially available product include methyl (meth)acrylate, ethyl (meth)acrylate, n-butyl (meth)acrylate, isobutyl (meth)acrylate, 2-ethylhexyl (meth)acrylate, acrylic acid, methacrylic acid, isostearyl (meth)acrylate, ethoxylated o-phenylphenol acrylate, methoxypolyethylene glycol acrylate, methoxypolyethylene glycol acrylate, phenoxypolyethylene glycol acrylate, 2-acryloyloxyethyl succinate, 2-hydroxyethyl (meth)acrylate, 2-hydroxypropyl (meth)acrylate, ethylene glycol mono(meth)acrylate, propylene glycol mono(meth)acrylate, 2-hydroxy-3-methoxypropyl (meth)acrylate, N-methylol(meth)acrylamide, and N-hydroxy(meth)acrylamide.

The polyfunctional (meth)acrylate monomer or oligomer may be modified as necessary. However, in the present description, neither "polyfunctional urethane (meth)acrylate" nor "polyfunctional silicon (meth)acrylate" shall be included in "polyfunctional (meth)acrylate".

As the polyfunctional (meth)acrylate monomer or oligomer, a commercially available product may be used. As such a commercially available product, for example, DPHA (manufactured by Daicel-Allnex Ltd.), PETRA (manufactured by Daicel-Allnex Ltd., pentaerythritol triacrylate), PETIA (manufactured by Daicel-Allnex Ltd.), ARONIX M-403 (manufactured by Toagosei Co., dipentaerythritol penta and hexaacrylate), ARONIX M-402 (manufactured by Toagosei Co., dipentaerythritol penta and hexaacrylate), ARONIX M-400 (manufactured by Toagosei Co., Ltd., dipentaerythritol penta and hexaacrylate), SR-399 (manufactured by ARKEMA, dipentaerythritol hydroxypentaacrylate), KAYARAD DPHA (manufactured by Nippon Kayaku Co., Ltd.), KAYARAD DPHA-2C (manufactured by Nippon Kayaku Co., Ltd.), ARONIX M-404, M-405, M-406, M-450, M-305, M-309, M-310, M-315, M-320, TO-1200, TO-1231, TO-595, TO-756 (manufactured by Toagosei Co., Ltd.), KAYARD D-310, D-330, DPHA, DPHA-2C (manufactured by Nippon Kayaku Co., Ltd.), NIKALAC MX-302 (manufactured by SANWA Chemical Co., Ltd.), A-9300, A-9300-1CL, A-GLY-9E, A-GLY-20E, A-TMM-3, A-TMM-3L, A-TMM-3LM-N, A-TMPT, AD-TMP, ATM-35E, A-TMMT, A-9550, A-DPH (manufactured by Shin Nakamura Chemical Co., Ltd.), etc. can be used.

Examples of the monofunctional or polyfunctional (meth) acrylate polymer include high molecular weight compounds of the above-described monofunctional or polyfunctional (meth)acrylate monomers or oligomers.

In the present description, the various polymers mentioned above may be simply referred to as an unsaturated double bond-containing acrylic polymer or an unsaturated double bond-containing acrylic resin.

As the polyfunctional urethane (meth)acrylate monomer or oligomer, a commercially available product may be used. As such a commercially available product, bifunctional urethane (meth)acrylates ("UX-2201", "UX-8101" and "UX-6101" manufactured by Nippon Kayaku Co., Ltd., "UF-8001" and "UF-8003" manufactured by Kyoeisha Chemical Co., Ltd., "Ebecryl 244", "Ebecryl 284", "Ebecryl 2002", "Ebecryl 4835", "Ebecryl 4883", "Ebecryl 8807", and "Ebecryl 6700" manufactured by Daicel-Allnex Ltd.); trifunctional urethane (meth)acrylates ("Ebecryl 254", "Ebecryl 264" and "Ebecryl 265" manufactured by Daicel-Allnex Ltd.); tetrafunctional urethane (meth)acrylates ("Ebecryl8210" manufactured by Daicel-Allnex Ltd.); hexafunctional urethane (meth)acrylates ("Ebecryl 1290k", "Ebecryl 5129", "Ebecryl 220", "KRM8200" and "Ebecryl 1290N" manufactured by Daicel-Allnex Ltd.); nonafunctional urethane (meth)acrylates ("KRM 7804" manufactured by Daicel-Allnex Ltd.); decafunctional urethane (meth)acrylates ("KRM 8452" and "KRM 8509" manufactured by Daicel-Allnex Ltd.); and pentadecafunctional urethane (meth)acrylates ("KRM 8655" manufactured by Daicel-Allnex Ltd.), ART RESIN UN-3320HA, ART RESIN UN-3320HB, ART RESIN UN-3320HC, ART RESIN UN-3320HS, ART RESIN UN-904, ART RESIN UN-901T, ART RESIN UN-905, ART RESIN UN-952 (manufactured by Negami Chemical Industrial Co., Ltd.), U-6HA, U-15HA, UA-100H, U-4HA, U-6LPA, UA-32P, U-324A, U-4H (manufactured by Shin Nakamura Chemical Co., Ltd.), etc. can be used.

The monofunctional or polyfunctional urethane (meth) acrylate monomers or oligomers can be prepared, for example, by reacting a polycarbonate diol, a (meth)acrylate compound containing a hydroxyl group and an unsaturated double bond group in the molecule thereof, and a polyisocyanate.

Examples of the monofunctional or polyfunctional urethane (meth)acrylate polymer include high molecular weight compounds of the above-described monofunctional or polyfunctional urethane (meth)acrylate monomers or oligomers.

The polyfunctional silicon (meth)acrylate monomer or oligomer is a compound having a silicone skeleton. For example, the compound having a silicone skeleton may have a fluorine atom-containing group, and the fluororesin may have a silicone skeleton.

As the polyfunctional silicon (meth)acrylate monomer or oligomer, a commercially available product may be used. Examples of such commercially available products include the following.

Compounds Having Methacryloyl Group and Acryloyl Group

Manufactured by BYK: BYK-UV3500, BYK-UV3570

Manufactured by Shin-Etsu Chemical Co., Ltd.: Shin-Etsu Silicone X-22-164, Shin-Etsu Silicone X-22-164AS, Shin-Etsu Silicone X-22-164A, Shin-Etsu Silicone X-22-164B, Shin-Etsu Silicone X-22-164C, Shin-Etsu Silicone X-22-164E, Shin-Etsu Silicone X-22-174DX, Shin-Etsu Silicone X-22-2426, Shin-Etsu Silicone X-22-2475, KER-4000-UV, KER-4700-UV, KER-4710-UV, KER-4800-UV, manufactured by JNC: FM-0711, FM-0721, FM-0725, TM-0701, FM-7711, FM-7721, FM-7725

Evonik Japan: TEGO$^{(registered\ trademark)}$ Rad 2010, TEGO$^{(registered\ trademark)}$ Rad 2011. Material having (meta) acryloyl group-containing fluorine atom-containing group and material in which fluororesin has compound having silicone skeleton Manufactured by The Nippon Synthetic Chemical Industry Co., Ltd.: Shikoh UV-AF305

T&K TOKA: ZX-212, ZX-214-A

Manufactured by Shin-Etsu Chemical Co., Ltd.: KY-1203

The composition for forming an active energy ray-curable coating layer may comprise, for example, a fluororesin in addition to the above-described resins. By virtue of the composition comprising a fluororesin, the abrasion resistance of a molded article can be further improved.

In the present disclosure, the fluororesin means a fluorine-containing resin containing no compound having a silicone skeleton. Examples thereof include perfluorooctyl acrylate and acrylic-modified perfluoropolyether. In the fluorine-containing resin, the functional groups, namely the methacryloyl group and the acryloyl group, may have been modified.

The fluororesin may be, for example, the following commercially available products.

Manufactured by DIC Corporation: MEGAFAC RS-72-K, MEGAFAC RS-75, MEGAFAC RS-76-E, MEGAFAC RS-76-NS, MEGAFAC RS-77

Manufactured by Daikin Industries, Ltd.: OPTOOL DAC-HP

Manufactured by Solvay Solexis, Inc.: FLUOROLINK MD700, FLUOROLINK AD1700

Manufactured by NEOS Co., Ltd.: Ftergent 601ADH2

Further, the composition for forming a coating layer does not allow tacking in an uncured state, and the coating layer can inhibit the adhesion of dust. Further, at the time of peeling the protective film, the occurrence of appearance defects on the coating layer can be inhibited or significantly reduced.

In one embodiment, the composition for forming a coating layer comprises inorganic oxide fine particles. The inorganic oxide fine particles may be inorganic oxide fine particles whose surface is modified with unsaturated double bonds.

Examples of the inorganic oxide fine particles include silica ($SiO_2$) particles, alumina particles, titania particles, tin oxide particles, antimony-doped tin oxide (abbreviation: ATO) particles, and zinc oxide particles. Among them, silica particles and alumina particles are desirable from the viewpoints of cost and coating material stability, and those with their functional groups modified are desirable. The functional groups are preferably (meth)acryloyl groups. The primary particle diameter of the inorganic oxide fine particles is, for example, 5 nm to 100 nm from the viewpoints of transparency and coating material stability. The average particle diameter of the particulate material referred to herein is a value measured using image processing software from an image taken with a cross-sectional electron microscope.

For example, by blending inorganic oxide fine particles, volume shrinkage can be alleviated with respect to the uncured coating film. Further, for example, by blending inorganic oxide fine particles, rigidity can be imparted to the coating film in addition to the above effects.

Further, by blending inorganic oxide fine particles, it is possible to inhibit the occurrence of curling due to curing shrinkage of the cured coating film, and for example, by blending inorganic oxide fine particles, abrasion resistance can be imparted in addition to the above-mentioned effects.

For example, commercially available inorganic oxide fine particles may be used, and examples of silica particles (colloidal silica) include IPA-ST, MEK-S TM, IBK-S T, PGM-ST, XBA-S T, MEK-AC-2101, MEK-AC-2202, MEK-AC-4101M I B K-SD manufactured by Nissan Chemical Corporation;

PL-1-IPA, PL-1-TOL, PL-2-IPA, PL-2-MEK, and PL-3-TOL manufactured by Fuso Chemical Co., Ltd.;

OSCAL series and ELECOM series manufactured by JGC Catalysts and Chemicals Ltd.; and NANOBYK-3605 manufactured by BYK Japan KK.

Examples of alumina particles include:

AS-15 0I, AS-150T manufactured by Sumitomo Osaka Cement Co., Ltd.; and

NANOBYK-3601, NANOBYK-3602, and NANOBYK-3610 manufactured by BYK Japan KK.

(Photopolymerization Initiator)

The composition for forming a coating layer of the present invention preferably comprises a photopolymerization initiator. By virtue of the existence of the photopolymerization initiator, resin components are well polymerized by irradiation with active energy rays, such as ultraviolet rays. Examples of the photopolymerization initiator include alkylphenone-based photopolymerization initiators, acylphosphine oxide-based photopolymerization initiators, titanocene-based photopolymerization initiators, and oxime ester-based polymerization initiators. Examples of the alkylphenone-based photopolymerization initiators include 2,2-dimethoxy-1,2-diphenylethan-1-one, 1-hydroxy-cyclohexyl-phenyl-ketone, 2-hydroxy-2-methyl-1-phenyl-propan-1-one, 1-[4-(2-hydroxyethoxy)-phenyl]-2-hydroxy-2-methyl-1-propan-1-one, 2-hydroxy-1-{4-[4-(2-hydroxy-2-methyl-propionyl)-benzyl]phenyl}-2-methyl-propan-1-one, 2-methyl-1-(4-methylthiophenyl)-2-morpholinopropan-1-one, 2-benzyl-2-dimethylamino-1-(4-morpholinophenyl)butanone-1,2-(dimethylamino)-2-[(4-methylphenyl)methyl]-1-[4-(4-morpholinyl)phenyl]-1-butanone. Examples of the acylphosphine oxide-based photopolymerization initiators include 2,4,6-trimethylbenzoyl-diphenyl-phosphine oxide and bis(2,4,6-trimethylbenzoyl)-phenylphosphine oxide. Examples of the titanocene-based photopolymerization initiators include bis($\eta$5-2,4-cyclopentadien-1-yl)-bis(2,6-difluoro-3-(1H-pyrrol-1-yl)-phenyl)titanium. Examples of the oxime ester-based polymerization initiator include 1,2-octanedione, 1-[4-(phenylthio)-, 2-(O-benzoyloxime)], ethanone, 1-[9-ethyl-6-(2-methylbenzoyl)-9H-carbazol-3-yl]-, 1-(0-acetyloxime), oxyphenylacetic acid, 2-[2-oxo-2-phenylacetoxyethoxy]ethyl ester, and 2-(2-hydroxyethoxy)ethyl ester. Such photopolymerization initiators may be used singly, or two or more species thereof may be used in combination.

Among the above-mentioned photopolymerization initiators, 2-hydroxy-2-methyl-1-phenyl-propan-1-one, 1-hydroxy-cyclohexyl-phenyl-ketone, 2-methyl-1-(4-methylthiophenyl)-2-morpholinopropan-1-one, 2-benzyl-2-dimethylamino-1-(4-morpholinophenyl)-butanone-1 and 2,2-dimethoxy-1,2-diphenylethan-1-one are preferably used.

A preferable amount of the photopolymerization initiator is 0.01 to 10 parts by mass, for example 1 to 10 parts by mass, per 100 parts by mass of the solid content of the composition for forming a coating layer. Photopolymerization initiators may be used singly or two or more photopolymerization initiators may be used in combination.

(Solvent)

The composition for forming a coating layer may comprise a solvent. The solvent is not particularly limited and may be selected at an appropriate time in consideration of the components contained in the composition, the type of the substrate to be coated, the method of applying the composition, etc. Specific examples of solvents that can be used include aromatic solvents such as toluene and xylene; ketone solvents such as methyl ethyl ketone, acetone, methyl isobutyl ketone, and cyclohexanone; ether solvents such as diethyl ether, isopropyl ether, tetrahydrofuran, dioxane, ethylene glycol dimethyl ether, ethylene glycol diethyl ether, diethylene glycol dimethyl ether, diethylene glycol diethyl ether, propylene glycol monomethyl ether, anisole and phenetole; ester solvents such as ethyl acetate, butyl acetate, isopropyl acetate and ethylene glycol diacetate; amide solvents such as dimethylformamide, diethylformamide and N-methylpyrrolidone; cellosolve solvents such as methyl cellosolve, ethyl cellosolve and butyl cellosolve; alcohol solvents such as methanol, ethanol, propanol, isopropyl alcohol, butanol and isobutyl alcohol; and halogen-containing solvents such as dichloromethane and chloroform. Such solvents may be used singly, or two or more species thereof may be used in combination. Of these solvents, ester solvents, ether solvents, alcohol solvents and ketone solvents are preferably used.

Various additives may be added to the composition for forming a coating layer, as necessary. Examples of such additives include conventional additives such as antistatic agents, plasticizers, surfactants, antioxidants, ultraviolet absorbers, light stabilizers, surface conditioning agents, and leveling agents. There is an advantage that by virtue of the composition for forming a coating layer containing the above-mentioned additive, the durability, etc. of the decorative molded member and the decorative molded article can be further improved. As such additives, additives commonly used in the field of coating layer formation can be used.

The composition for forming a coating layer can be prepared by a method commonly practiced by those skilled in the art. For example, it can be prepared by mixing the above-described components by using a commonly used mixing device such as a paint shaker and a mixer.

(Resin Substrate)

Examples of the resin substrate according to the present disclosure include resin substrates such as polycarbonate-based films, polyester-based films, such as polyethylene terephthalate and polyethylene naphthalate; cellulose-based films, such as diacetyl cellulose and triacetyl cellulose; and acrylic films, such as polymethyl methacrylate. These resin substrates may be transparent resin substrates.

Examples of the resin substrate according to the present disclosure include resin substrates including styrene-based films such as polystyrene and acrylonitrile-styrene copolymers; olefin-base films such as polyvinyl chloride, polyethylene, polypropylene, polyolefins having a cyclic or norbornene structure, and ethylene-propylene copolymers; and amide-based films such as nylon and aromatic polyamides. These resin substrates may be transparent resin substrates.

Furthermore, examples of the resin substrate according to the present disclosure include resin substrates made of polyimide, polysulfone, polyether sulfone, polyether ether ketone, polyphenylene sulfide, polyvinyl alcohol, polyvinylidene chloride, polyvinyl butyral, polyallylate, polyoxymethylene, epoxy resins, and blends of these polymers. These resin substrates may be transparent resin substrates.

Further, the resin substrate according to the present disclosure may be one in which a plurality of resin substrates are laminated. For example, the resin substrate according to the present disclosure may be a laminated member of a film of an acrylic resin and a film of a polycarbonate-based resin or a laminated member of sheets. These laminated members may be transparent laminated members.

As the resin substrate according to the present disclosure, a resin substrate with low optical birefringence, a resin substrate with a phase difference controlled to ¼ of a wavelength (e.g., 550 nm), i.e., $\lambda/4$, or ½ of a wavelength, i.e., $\lambda/2$, or a resin substrate with uncontrolled birefringence can be selected from resin substrates in view of its use.

The thickness of the resin substrate can be appropriately chosen according to the use of the laminated member for decoration, the method of processing the member, etc. Generally, it is 100 µm or more and about 500 µm, particularly preferably 200 µm or more and 500 µm or less, and more preferably 200 µm or more and 400 µm or less in view of strength and workability such as handleability.

(Laminated Member for Decoration)

The laminated member for decoration according to the present disclosure has a prescribed structure, so that its curling can be inhibited, and peeling of the protective film can be inhibited. For this reason, for example, the laminated member for decoration has superior strength and can be inhibited from curling even after being wound up, and the protective film can be inhibited from peeling.

The laminated member for decoration can be produce, for example, by applying a composition for forming a coating layer to a resin substrate to form a coating layer, and laminating a protective film on the coating layer on its side opposite from the resin substrate. At this time, the adhesive layer side of the protective film is arranged so as to be adjacent to the coating layer.

The method of applying the composition for forming a coating layer may be appropriately selected according to the composition for forming a coating layer and the situation of the application step, and the composition may be applied, for example, by a dip coating method, an air knife coating method, a curtain coating method, a roller coating method, a wire bar coating method, a die coating method, an inkjet method, a gravure coating method, or an extrusion coating method (U.S. Pat. No. 2,681,294).

In the laminated member for decoration according to the present disclosure, a hardcoat layer is formed by curing a coating film obtained by applying a composition for forming a coating layer, namely, a coating layer according to the present invention.

This curing or semi-curing can be carried out by irradiation with a light source that emits active energy rays with a required wavelength. One example of irradiation is ultraviolet rays, and for example, light having an integral light quantity of 1 to 5000 mJ/cm$^2$ can be applied. For example, by irradiating with light with an integral light quantity of 1 mJ/cm$^2$ or more and 100 mJ/cm$^2$ or less, the coating layer can be brought into a semi-cured state, and by irradiating with light with an integral light quantity of more than 100 mJ/cm$^2$ and 5000 mJ/cm$^2$, the coating layer can be cured to form a hardcoat layer.

For example, by irradiating with light with an integral light quantity of more than 100 mJ/cm$^2$ and 1000 mJ/cm$^2$ or less, the characteristics of the hardcoat layer can be fully exhibited, and the hardcoat layer can be formed more efficiently.

The wavelength of the irradiation light is not particularly limited and, for example, ultraviolet light having a wavelength of 380 nm or less can be used. Such light can be obtained by using a high pressure mercury lamp, an extra-high pressure mercury lamp or the like.

(Decorative Layer)

The laminated member for decoration of the present disclosure may further have a decorative layer, for example, may have a decorative layer on the resin substrate on the side opposite from the coating layer.

The decorative layer is a layer that affords decoration such as patterns, characters, and metallic luster to the laminated member for decoration according to the present disclosure. Examples of such a decorative layer include a printed layer or a vapor-deposited layer. Both the printed layer and the vapor-deposited layer are layers for the main purpose of affording decoration.

In the present disclosure, either one of the printed layer and the vapor-deposited layer may be provided as the decorative layer, or both the printed layer and the vapor-deposited layer may be provided. The printed layer may be a layer composed of a plurality of layers. For example, the decorative layer is a printed layer.

The printed layer is a layer that decorates the surface of a molded article with patterns and/or characters, or the like. Examples of the printed layer include patterns composed of woody textures, stone-like textures, cloth-like textures, sand-like textures, geometrical figures, characters, and whole solid. As the material for the printed layer, a colored ink may be used which contains resins such as polyvinyl-based resins including vinyl chloride/vinyl acetate-based copolymer, polyamide-based resins, polyester-based resins, polyacrylic resins, polyurethane-based resins, polyvinyl acetal-based resins, polyester urethane-based resins, cellulose ester-based resins, alkyd resins, and chlorinated polyolefin-based resins as a binder, and a pigment or dye with a suitable color as a coloring agent.

As the pigment of the ink to be used for the printed layer, for example, the following can be used. Ordinarily, as the pigment, there can be used azo pigments such as polyazo, organic pigments such as isoindolinone, or inorganic pigments such as titanium nickel antimony oxide as a yellow pigment; azo pigments such as polyazo, organic pigments such as quinacridone, or inorganic pigments such as iron red as a red pigment; organic pigments such as phthalocyanine blue or inorganic pigments such as cobalt blue as a blue pigment; organic pigments such as aniline black as a black pigment; and inorganic pigments such as titanium dioxide as a white pigment.

As the dye of the ink to be used for the printed layer, various known dyes may be used to an extent not impairing the effect of the present invention. As the method of printing the ink, it is preferable to use a known printing method such as an offset printing method, a gravure printing method and a screen printing method or a known coating method such as a roll coating method or a spray coating method.

Any laminated member for decoration of the present invention can solve, for example, the problem that squeegee marks and the like are transferred to the coating layer during screen printing.

The vapor-deposited layer can be formed by a vacuum vapor deposition method, a sputtering method, an ion plating method, a plating method, or the like using at least one metal selected from the group comprising aluminum, nickel, gold, platinum, chromium, iron, copper, indium, tin, silver, titanium, lead, zinc, etc., or an alloy or compound thereof.

The thickness of the printed layer or the vapor-deposited layer for decoration can be suitably chosen by a method ordinarily used depending on the degree of stretch at the time of molding such that a desired surface appearance of a molded article can be obtained.

(Decorative Molded Article)

A decorative molded article can be obtained by a method for producing a decorative molded article in which a laminated member for decoration according to the present disclosure is used and which comprises any one of the Steps i) to iii) described below.

Step i)
Step i) comprises
in the laminated member for decoration according to the present disclosure,
forming a decorative layer on the surface of the resin substrate on a side opposite from the coating layer,
peeling the protective film,
shaping a coating laminated member comprising the coating layer and the resin substrate,
forming a semi-cured laminated member by irradiating the coating laminated member after the shaping with active energy rays exceeding 100 mJ/cm² to cure the coating laminated member, and
insert molding a transparent substrate on a side where the decorative layer of the resin substrate in the cured laminated member is located.

Step ii)
Step ii) comprises
in the laminated member for decoration according to the present disclosure,
forming a decorative layer on the surface of the resin substrate on a side opposite from the coating layer,
peeling the protective film,
shaping a coating laminated member comprising the coating layer and the resin substrate,
forming a semi-cured laminated member by irradiating the coating laminated member after the shaping with active energy rays of 1 mJ/cm² or more and 100 mJ/cm² or less to semi-cure the coating laminated member,
insert molding a transparent substrate on a side where the decorative layer of the resin substrate in the semi-cured laminated member is located, and
irradiating the laminated member obtained by molding the transparent substrate with active energy rays exceeding 100 mJ/cm² to cure the semi-cured laminated member.

Step iii)
Step iii) comprises, in the laminated member for decoration according to the present disclosure,
forming a decorative layer on the surface of the resin substrate on a side opposite from the coating layer,
peeling the protective film,
shaping a laminated member for decoration having a decorative layer,
insert molding a transparent substrate on a side where the decorative layer of the resin substrate in the laminated member for decoration after the shaping is located,
performing irradiation with active energy rays exceeding 100 mJ/cm² to cure the laminated member for decoration after the insert molding, and
peeling the protective film.

In the following, Steps i), ii) and iii) will be described.

Step i)

Step i) comprises forming a decorative layer on the surface of the resin substrate on the side opposite from the coating layer. For the formation of the decorative layer, the above-mentioned method can be appropriately chosen.

In one embodiment, the decorative layer formed on the surface of the resin substrate on the side opposite from the coating layer is a printed layer. For the formation of the printed layer, the above-mentioned method and means can be appropriately chosen.

By the method for producing a decorative molded article using the laminated member for decoration according to the present disclosure, for example, the problem that squeegee marks are transferred when an ink is printed on a resin substrate and the problem of deformation or the like based on the external stress that may be produced during the formation of a decorative layer are unlikely to occur, and therefore, a decorative molded article with a superior appearance can be obtained.

Step i) comprises peeling the protective film from the laminated member for decoration according to the present disclosure. By using the laminated member for decoration according to the present disclosure, for example, the peeling between the protective film and the coating layer can be performed easily and the coating layer can be inhibited from peeling from the resin substrate, and therefore a decorative molded article with good yield can be obtained.

Step i) comprises shaping a coating laminated member comprising the coating layer according to the present disclosure and a resin substrate. Since the coating laminated member has the coating layer according to the present disclosure, it has high smoothness and can be shaped into a complicated shape.

For example, at the time of shaping, the coating layer may be heat-treated at a temperature of 90° C. or higher and 150° C. or lower, and thanks to the heat treatment, a coating laminated member having a surface having higher smoothness can be produced. Since the coating laminated member can be preformed into a complicated shape with high smoothness held as described above, the decorative molded article obtained by the production method according to the present disclosure can have a complicated shape and appearance defects such as cracks and wrinkles can be significantly inhibited.

Step i) comprises irradiating the coating laminated member after shaping with active energy rays exceeding 100 mJ/cm² to cure the coating laminated member and form a cured laminated member. The coating layer is cured by this step, and a hardcoat layer having superior hardcoating performance, such as high hardness, abrasion resistance and chemical resistance, can be obtained.

After the hardcoat layer is formed in Step i), trimming for removing unnecessary parts may be performed.

Subsequently, a transparent substrate is insert molded on the resin substrate in the cured laminated member with the hardcoat layer on the side where the decorative layer is located, and thereby a decorative molded article having the hardcoat layer, the resin substrate, the decorative layer and the transparent substrate in this order can be obtained.

The resulting decorative molded article can have a complicated shape, and can reduce the occurrence of defective products during molding, and has high hardness, abrasion resistance, chemical resistance, etc.

The embodiment described above is one example, and a known treatment, processing step, or the like may be introduced as desired.

Step ii)

Step ii) comprises forming a decorative layer on the surface of the resin substrate on the side opposite from the coating layer. For the formation of the decorative layer, the above-mentioned method can be appropriately chosen.

In one embodiment, the decorative layer formed on the surface of the resin substrate on the side opposite from the coating layer is a printed layer. For the formation of the printed layer, the above-mentioned method and means can be appropriately chosen.

By the method for producing a decorative molded article using the laminated member for decoration according to the present disclosure, for example, the problem that squeegee marks are transferred when an ink is printed on a resin substrate and the problem of deformation or the like based on the external stress that may be produced during the formation of a decorative layer are unlikely to occur, and therefore, a decorative molded article with a superior appearance can be obtained.

Step ii) comprises peeling the protective film from the laminated member for decoration according to the present disclosure. By using the laminated member for decoration according to the present disclosure, for example, the peeling between the protective film and the coating layer can be performed easily and the coating layer can be inhibited from peeling from the resin substrate, and therefore a decorative molded article with good yield can be obtained.

Step ii) comprises shaping a coating laminated member comprising the coating layer according to the present disclosure and a resin substrate. Since the coating laminated member has the coating layer according to the present disclosure, it has high smoothness and can be shaped into a complicated shape.

For example, the coating layer may be heated at a temperature of 90° C. or higher and 150° C. or lower during the shaping, and thanks to the heat treatment, a coating laminated member having a surface having higher smoothness can be produced. Since the coating laminated member can be preformed into a complicated shape with high smoothness held as described above, the decorative molded article obtained by the production method according to the present disclosure can have a complicated shape and appearance defects such as cracks and wrinkles can be significantly inhibited.

Step ii) comprises irradiating the coating laminated member after shaping with active energy rays of 1 mJ/cm$^2$ or more and 100 mJ/cm$^2$ or less to semi-cure the coating laminated member and form a semi-cured laminated member. By virtue of using the laminated member for decoration according to the present disclosure, the coating laminated member after shaping can be semi-cured. In the semi-cured state, for example, stretchability required for insert molding can be better secured. In addition, the occurrence of cracks can be inhibited in the appearance of the resulting decorative molded article.

After the semi-cured laminated member is formed in Step ii), trimming for removing unnecessary parts may be performed.

Subsequently, a transparent substrate is insert molded on the resin substrate in the semi-cured laminated member with the semi-cured coating layer on the side where the decorative layer is located, and thereby a laminated member having the semi-cured coating layer, the resin substrate, the decorative layer and the transparent substrate can be obtained.

Then, the laminated member having the semi-cured coating layer and the transparent substrate obtained in the above step is irradiated with active energy rays of greater than 100 mJ/cm$^2$ to cure the semi-cured coating layer and a hardcoat layer is formed.

By the production method described in Step ii), a decorative molded article having the hardcoat layer, the resin substrate, the decorative layer, and the transparent substrate in this order can be obtained.

The resulting decorative molded article can have a complicated shape, and can reduce the occurrence of defective products during molding, and has high hardness, abrasion resistance, chemical resistance, etc.

The embodiment described above is one example, and a known treatment, processing step, or the like may be introduced as desired.

Step iii)

Step iii) comprises forming a decorative layer on the surface of the resin substrate on the side opposite from the coating layer. For the formation of the decorative layer, the above-mentioned method can be appropriately chosen.

In one embodiment, the decorative layer formed on the surface of the resin substrate on the side opposite from the coating layer is a printed layer. For the formation of the printed layer, the above-mentioned method and means can be appropriately chosen.

By the method for producing a decorative molded article using the laminated member for decoration according to the present disclosure, for example, the problem that squeegee marks are transferred when an ink is printed on a resin substrate and the problem of deformation or the like based on the external stress that may be produced during the formation of a decorative layer are unlikely to occur, and therefore, a decorative molded article with a superior appearance can be obtained.

Unlike Steps i) and ii), Step iii) comprises shaping the laminated member for decoration without peeling the protective film. Any laminated member for decoration according to the present disclosure can be shaped without peeling the protective film as described above, and can be shaped into a complicated shape.

Since the laminated member for decoration has the coating layer according to the present disclosure, it has high smoothness and can be shaped into a complicated shape.

Further, the laminated member for decoration can inhibit air entrapment, and even if the coating layer is in an uncured state, it can inhibit defective appearance and insufficient coating film strength caused by scratches and cratering due to handling.

After the laminated member for decoration is shaped, trimming may be performed to remove unnecessary parts.

Subsequently, a transparent substrate is insert molded on the resin substrate in the shaped laminated member for decoration on the side where the decorative layer is located, and thereby a laminated member having the protective film, the coating layer, the resin substrate, the decorative layer and the transparent substrate can be obtained.

By using the laminated member for decoration according to the present disclosure, it can be molded into a complicated shape with high smoothness held even if it is molded with the coating layer uncured, and appearance defects such as cracks and wrinkles can be significantly inhibited.

Then, the laminated member having the protective film, the coating layer, the resin substrate, the decorative layer and the transparent substrate is irradiated with active energy rays of greater than 100 mJ/cm² to cure the coating layer and a hardcoat layer is formed.

Subsequently, the protective film is peeled, and thus a decorative molded article having the hardcoat layer, the resin substrate, the decorative layer and the transparent substrate in this order can be obtained.

The resulting decorative molded article can have a complicated shape, and can reduce the occurrence of defective products during molding, and has high hardness, abrasion resistance, chemical resistance, etc.

The embodiment described above is one example, and a known treatment, processing step, or the like may be introduced as desired.

As described above, the decorative molded article produced using the laminated member for decoration according to the present disclosure can have a complicated shape, and can reduce the occurrence of defective products during molding, and can have high hardness, abrasion resistance, chemical resistance, etc. Further, for example, air entrapment can be significantly reduced between the protective film and the coating layer, and defects caused by scratches, dents, etc. due to handling at the time of forming a decorative layer can be inhibited.

Further, it is possible to inhibit the peeling of the protective film in the process of producing the decorative molded article, and it is possible to inhibit the curling of the laminated member. In addition, since the hardcoat layer of the decorative molded article has high smoothness, the decorative molded article can have a superior appearance, such as high gloss and high design property.

Further, the occurrence of cracks can be prevented during the injection molding that may be included in the process of producing the decorative molded article, namely, during the insert molding of the transparent substrate.

As the transparent substrate to be used in Steps i), ii) and iii), for example, among the resin components that may be contained in the resin substrate described above, resin components that become transparent after molding can be used. For example, the resin contained in the transparent substrate to be insert molded is a polycarbonate-based resin or the like.

In one embodiment, in at least one of the Step i) and the Step ii), $E1$ represents a stretch ratio in a heated sample for a stretch test (1) prepared by heating, in an atmosphere of 160° C. for 1 minute, a sample having the coating layer with a thickness of 3 μm or more and 20 μm or less and the resin substrate with a thickness of 100 μm or more and 500 μm or less after peeling the protective film in the laminated member at a rate of 5.0 mm/sec and before shaping the coating laminated member, $E2$ represents a stretch ratio in a heated sample for a stretch test (2) to be measured under a condition where the heated sample for a stretch test (1) is irradiated with 1 mJ/cm² or more and 100 mJ/cm² or less, $E3$ represents a stretch ratio in a heated sample for a stretch test (3) to be measured under a condition where the heated sample for a stretch test (1) is irradiated with more than 100 mJ/cm² and 5000 mJ/cm² or less, and the stretch ratios $E1$, $E2$ and $E3$ have the relationship of $$0\% \leq E3 < 2\% < E2 < 40\% < E1 \tag{4}$$

By virtue of the stretch ratios $E1$, $E2$ and $E3$ having the above relationships, the occurrence of cracks and the like due to the dimensional difference that may occur between the molded article obtained by preforming and the mold used for insert molding is significantly reduced or inhibited.

As described above, any coating layer comprising the composition for forming a coating layer according to the present disclosure can include at least an uncured state, a semi-cured state, and a cured state, and depending on the required physical properties, shape, etc., a laminate having an uncured coating layer or a semi-cured coating layer may be subjected to processing such as preforming and insert molding.

Accordingly, any laminated member for decoration according to the present disclosure can be molded even into a complicated shape, and can reduce the occurrence of defective products during molding, and moreover, can have superior hardcoating performance, such as high hardness, abrasion resistance and chemical resistance.

Further, the details regarding the stretch ratios $E1$, $E2$ and $E3$ can include all the technical ideas described on the coating layer according to the present disclosure.

The decorative molded article according to the present disclosure may have, for example, a high refractive index layer, a low refractive index layer, a multilayer including a low refractive index layer and a high refractive index layer, and an antifouling layer as a functional layer. These functional layers can be formed by a technique commonly used in this field, such as applying and curing a composition for forming a coating layer for forming a functional layer. For example, the decorative molded article may have a functional layer on the hardcoat layer on its side opposite from the resin substrate.

The laminated member for decoration and the decorative molded article of the present invention can be suitably used as a member arranged on a display or an exterior component portion and a sensor member arranged around that member. Examples of the display include a liquid crystal display, an organic EL display, and a plasma display. Examples of the exterior parts include exterior parts constituting an automobile body, such as a hood, a bumper, a fender, a side step mole, a roof rack, a spoiler, and a rear garnish. For example, when the decorative molded article of the present invention is arranged on a display or exterior parts, it is arranged such that, in a decorative molded article in which a hardcoat layer is laminated on one side of a resin substrate, the other side of the resin substrate faces the surface of the display or the external component, for example, such that a surface of a transparent substrate formed by insert molding, the surface being located on the side opposite from a decorative layer, faces the surface of the display or the external component. The laminated member for decoration and the decorative molded article can also be suitably used as a member to be arranged on automobile interior parts (including display interior parts). Examples of interior parts (other than display interior parts) include sun visors, instrument panels, switch panels, indicator panels, console boxes, pillar trims, decoration panels, door modules, center modules, door trims, change knobs, sub-trunks, trunk side trims, and assist grips.

The laminated member for decoration and the decorative molded article of the present invention can also be suitably used as, for example, an optical laminated member for in-vehicle device touch panel displays.

EXAMPLES

The present invention will be described hereafter in more detail by way of examples, to which the present invention is not intended to be limited. In the examples, "parts" and "%" are on a mass basis unless otherwise indicated.

The components used in the examples and comparative examples in the present description are as follows.
(Unsaturated Double Bond-Containing Acrylic Resin)
  (1) Product name: V-6850, manufacturer: DIC Corporation, Tg: 65° C.
  Mw: 25,000
  (2) Product name: MAP-7000, manufacturer: Negami Chemical Industrial Co., Ltd.
  Mw 100,000
  (3) Product name: EMS-635, manufacturer: DIC Corporation, Tg: 50° C.
  Mw: 9,800
  (4) Resin A: An unsaturated double bond-containing acrylic resin was prepared according to a known method using methyl methacrylate, acrylic acid, methacrylic acid, glycidyl methacrylate, glycidyl acrylate, and butyl methacrylate. The Tg was 70° C. and the Mw was 80,000.
  (5) Product name: WEL-355, manufacturer: DIC Corporation, Tg: 85° C.
  Mw: 45,000
(Non-Reactive Acrylic Resin)
  (1) Resin B: A non-reactive acrylic resin was prepared according to a known method using methyl methacrylate, acrylic acid, methacrylic acid, and butyl methacrylate. The Tg was 80° C. and the Mw was 6,000.
  (2) Resin C: A non-reactive acrylic resin was prepared according to a known method using methyl methacrylate, methacrylic acid, and butyl methacrylate. The Tg was 90° C. and the Mw was 95,000.
(Polyfunctional Urethane Acrylate 1)
  Manufacturer: Daicel-Allnex Ltd.
  Product name: KRM-8452
  Mw: 3884
  Acrylate equivalent: 120 g equivalent
(Polyfunctional Urethane Acrylate 2)
  Manufacturer: Negami Chemical Industrial Co., Ltd.
  Product name: UN-3320HS
  Acrylate equivalent: 340 g equivalent
(Polyfunctional Acrylate 1)
  Manufacturer: Toagosei Co., Ltd.
  Product name: M-402
  Compound name: dipentaerythritol penta and hexa-acrylate
  Acrylate equivalent: 100 g equivalent
(Polyfunctional Acrylate 2)
  Manufacturer: Toagosei Co., Ltd.
  Product name: M-315
  Compound name: EO-modified isocyanurate diacrylate and triacrylate
  Acrylate equivalent: 150 g equivalent
(Fluorosilicone Resin Containing Unsaturated Double Bonds)
  Manufacturer: The Nippon Synthetic Chemical Industry Co., Ltd.
  Product name: Shikoh UV-AF305
  Mw: 18000
(Fluororesin)
  Manufacturer: Daikin Industries, Ltd.
  Product name: OPTOOL DAC-HP
(Silica Organosol Containing Unsaturated Double Bonds)
  Manufacturer: JGC Catalysts and Chemicals Ltd.
  Product name: OSCAL 1842
  Particle diameter: 10 nm
(Photopolymerization Initiator)
  α-Hydroxyalkylphenone (Omnirad 184 manufactured by IGM Resins B.V.)
(Ultraviolet Absorber 1)
  Benzotriazole-based ultraviolet absorber
  Manufacturer: BASF
  Product name: Tinuvin PS
(Ultraviolet Absorber 2)
  Hydroxyphenyltriazine-based ultraviolet absorber
  Manufacturer: BASF
  Product name: Tinuvin 400
(Light Stabilizer 1)
  N—$CH_3$ type hindered amine light stabilizer
  Manufacturer: BASF
  Product name: Tinuvin 292
(Light Stabilizer 2)
  N—OR type hindered amine light stabilizer
  Manufacturer: BASF
  Product name: Tinuvin 123
(Protective Film)
  OPP: biaxially oriented polypropylene film (manufactured by Nichiei Kakoh Co., Ltd.)
  CPP: cast polypropylene film (manufactured by Nichiei Kakoh Co., Ltd.)
  PE: polyethylene film (manufactured by Nichiei Kakoh Co., Ltd.)
  Modified PO: modified polyolefin film (manufactured by Toray Industries, Inc.)
  PS: polystyrene film (manufactured by Kurabo Industries Ltd.)
  TPX: polymethylpentene film (manufactured by Panac Co., Ltd.)

Production Example 1

(Production of Composition for Forming Coating Layer 1)

Clear hardcoating composition 1 having a solid concentration of 35% was produced by mixing 15 parts by mass of KRM-8452 (manufactured by Daicel-Allnex Ltd., polyfunctional urethane acrylate 1), 40 parts by mass of UNIDIC V-6850 (manufactured by DIC Corporation, unsaturated double bond-containing acrylic resin), 40 parts by mass of inorganic oxide fine particles (trade name: OSCAL 1842, manufactured by JGC Catalysts and Chemicals Ltd., average particle diameter: 10 nm), and 5 parts by mass of a photopolymerization initiator (trade name: Omnirad184, manufactured by IGM RESINS B.V.) as active energy ray-curable components in a vessel containing 185 parts of methyl isobutyl ketone.

Example 1

(Production of Laminated Members for Decoration)

The laminated member for decoration in Example 1 was produced by using each production method comprising the following Step i) or Step ii).

Method i: Manufacture of Laminated Member for Decoration 1

Composition for forming a coating layer (E1) having the composition shown in Table 1 was applied with a bar coater to a bilayer (PMMA/PC) film having a thickness of 250 μm made of PMMA and PC (trade name: AW-10U, manufactured by SHINTECHNO Corporation) on the surface of PMMA such that a film thickness after curing of 10 μm was achieved, and then was dried at 80° C. for 1 minute to volatilize the solvent. The surface of the coating layer after drying did not have tackiness (namely, was tack-free).

An oriented polypropylene (OPP) protective film in which the thickness of the adhesive layer was 16 μm and the thickness of the substrate layer was 60 μm (trade name: manufactured by Nichiei Kakoh Co., Ltd.) was laminated on the coating layer resulting from the application such that the adhesive layer came into contact with the coating layer, and thus laminated member for decoration 1 was produced.

The adhesive layer contained an acrylic adhesive, and the average Rz(a) of the adhesive layer was 1.79 μm.

Step i: Production of Decorative Molded Article 1

A printed layer was laminated by screen printing on a substrate surface (PC surface) opposite from the coating layer of the laminated member for decoration 1 obtained by the above method, and dried at a drying temperature of 80° C. for 10 minutes. After repeating this printing step five times, drying was further performed at 90° C. for 1 hour. The protective film was peeled from the coating layer at a rate of 5.0 mm/sec. Then, the resultant was subjected to preforming by heating at 190° C. for 30 seconds, and then cured by irradiation treatment with active energy rays having an integral light quantity of 500 mJ/cm$^2$ and trimmed. Subsequently, IML molding was performed to afford a decorative molded article 1. The IML molding was performed such that a transparent resin substrate (polycarbonate) was in contact with the resin substrate on its printed layer side. In the examples, unless otherwise specified, ultraviolet rays were selected as the active energy rays.

Step ii: Production of Decorative Molded Article 2

A printed layer was laminated by screen printing on a substrate surface (PC surface) opposite from the coating layer of the laminated member for decoration 1 obtained by the above method, and dried at a drying temperature of 80° C. for 10 minutes. After repeating this printing step five times, drying was further performed at 90° C. for 1 hour. The protective film was peeled from the coating layer at a rate of 5.0 mm/sec. Then, the resultant was subjected to preforming by heating at 190° C. for 30 seconds, and then subjected to irradiation treatment with active energy rays having an integral light quantity of 30 mJ/cm$^2$ and trimmed. Subsequently, IML molding was performed such that a transparent resin substrate (polycarbonate) was in contact with the resin substrate on its printed layer side, and the molded article was cured by irradiation treatment with active energy rays having an integral light quantity of 500 mJ/cm$^2$ to afford a decorative molded article 2.

Example 2 to Example 49

The components contained in the composition for forming a coating layer were changed to those shown in Tables 1 to 5. In Examples 2 to 12 and Examples 19 to 49, laminated members for decoration 1 and 2 and samples for various measurements were produced by using the above Step i) or Step ii) in the same manner as in Example 1.

On the other hand, in Examples 13 to 18, a decorative molded article 3 and samples for various measurements were produced according to the production method including the following Step iii).

In any of Examples 2 to 49, the surface of the coating layer after drying did not have adhesiveness.

Details of the preforming temperature and time are as shown in Tables 7 to 12.

Step iii: Production of Decorative Molded Article 3

A printed layer was laminated by screen printing on a substrate surface (PC surface) opposite from the coating layer of the laminated member for decoration 1 obtained by the above method, and dried at a drying temperature of 80° C. for 10 minutes. After repeating this printing step five times, drying was further performed at 90° C. for 1 hour.

Then, the resultant was heated at 190° C. for 30 seconds to perform preforming, and then trimmed. Subsequently, IML molding was performed such that a transparent resin substrate (polycarbonate) came into contact with the resin substrate on the side where the printed layer was located, and in the resulting molded article, the protective film was peeled from the coating layer at a rate of 5.0 mm/sec, and the molded article was cured by irradiation treatment with active energy rays with an integral light quantity of 500 mJ/cm$^2$, and thus a decorative molded article 3 was obtained.

Comparative Examples 1 and 2

Laminated members (Comparative Examples 1 and 2) were produced in the same manner as in Example 1 except that the respective components contained in the composition for forming a coating film were changed to those shown in Table 6.

Further, molded articles were produced for the laminated members of Comparative Examples 1 and 2 by the same process as in Example 1.

The following evaluations were performed using the laminated members for decoration and the decorative molded articles obtained in the above Examples, and the laminated members and the molded articles obtained in the Comparative Examples. The evaluation results are shown in Tables 7A to 13 below.

TABLE 1

| | | | | Composition number | | | | | | |
|---|---|---|---|---|---|---|---|---|---|---|
| | | | | E1 | E2 | E3 | E2 | E2 | E2 | E2 |
| | | | | Corresponding example | | | | | | |
| | Relationship with steps | | | Example 1 | Example 2 | Example 3 | Example 4 | Example 5 | Example 6 | Example 7 |
| Composition for forming a coating layer | i, ii, iii | Unsaturated double bond-containing acrylic resin Mw 25,000 | V-6850 | 40 | 55 | 25 | 55 | 55 | 55 | 55 |
| | | Unsaturated double bond-containing acrylic resin Mw 9,800 | EMS-635 | | | | | | | |
| | | Unsaturated double bond-containing acrylic resin Mw 80000 | Resin A | | | | | | | |
| | | Non-reactive acrylic resin Mw 45,000 | WEL-355 | | | | | | | |
| | | Non-reactive acrylic resin Mw 6000 | Resin B | | | | | | | |
| | | Non-reactive acrylic resin Mw 95000 | Resin C | | | | | | | |
| | | Polyfunctional urethane acrylate Equivalent 120 | KRM-8452 | 15 | 25 | 65 | 25 | 25 | 25 | 25 |
| | | Unsaturated double bond-containing fluorosilicone Mw 18000 | Shikoh UV-AF305 | | | | | | | |
| | | Fluororesin additive | OPTOOL DAC-HP | | | | | | | |
| | | Unsaturated double bond-containing silica organosol | OSCAL 1842 | 40 | 15 | 5 | 15 | 15 | 15 | 15 |
| | | Photopolymerization Initiator | Omnirad 184 | 5 | 5 | 5 | 5 | 5 | 5 | 5 |
| | | Total | | 100 | 100 | 100 | 100 | 100 | 100 | 100 |

| | | | | Composition number | | | | |
|---|---|---|---|---|---|---|---|---|
| | | | | E2 | E2 | E2 | E4 | E3 |
| | | | | Corresponding example | | | | |
| | Relationship with steps | | | Example 8 | Example 9 | Example 10 | Example 11 | Example 12 |
| | Composition for forming a coating layer | i, ii, iii | Unsaturated double bond-containing acrylic resin Mw 25,000 | V-6850 | 55 | 55 | 55 | 57 | 25 |
| | | | Unsaturated double bond-containing acrylic resin Mw 9,800 | EMS-635 | | | | | |
| | | | Unsaturated double bond-containing acrylic resin Mw 80000 | Resin A | | | | | |
| | | | Non-reactive acrylic resin Mw 45,000 | WEL-355 | | | | | |
| | | | Non-reactive acrylic resin Mw 6000 | Resin B | | | | | |
| | | | Non-reactive acrylic resin Mw 95000 | Resin C | | | | | |
| | | | Polyfunctional urethane acrylate Equivalent 120 | KRM-8452 | 25 | 25 | 25 | 26 | 65 |
| | | | Unsaturated double bond-containing fluorosilicone Mw 18000 | Shikoh UV-AF305 | | | | | |
| | | | Fluororesin additive | OPTOOL DAC-HP | | | | | |
| | | | Unsaturated double bond-containing silica organosol | OSCAL 1842 | 15 | 15 | 15 | 16 | 5 |
| | | | Photopolymerization Initiator | Omnirad 184 | 5 | 5 | 5 | 1 | 5 |
| | | | Total | | 100 | 100 | 100 | 100 | 100 |

TABLE 2

| | Relationship with steps | | | Composition number | | | | | | | |
|---|---|---|---|---|---|---|---|---|---|---|---|
| | | | | E2 | E2 | E2 | E2 | E2 | E2 | E2 | E2 |
| | | | | Corresponding example | | | | | | | |
| | | | | Example 13 | Example 14 | Example 15 | Example 16 | Example 17 | Example 18 | Example 19 | Example 20 |
| Composition for forming a coating layer | i, ii, iii | Unsaturated double bond-containing acrylic resin Mw 25,000 | V-6850 | 55 | 55 | 55 | 55 | 55 | 55 | 55 | 55 |
| | | Unsaturated double bond-containing acrylic resin Mw 9,800 | EMS-635 | | | | | | | | |
| | | Unsaturated double bond-containing acrylic resin Mw 80000 | Resin A | | | | | | | | |
| | | Non-reactive acrylic resin Mw 45,000 | WEL-355 | | | | | | | | |
| | | Non-reactive acrylic resin Mw 6000 | Resin B | | | | | | | | |
| | | Non-reactive acrylic resin Mw 95000 | Resin C | | | | | | | | |
| | | Polyfunctional urethane acrylate Equivalent 120 | KRM-8452 | 25 | 25 | 25 | 25 | 25 | 25 | 25 | 25 |
| | | Unsaturated double bond-containing fluorosilicone Mw 18000 | Shikoh UV-AF305 | | | | | | | | |
| | | Fluororesin additive | OPTOOL DAC-HP | | | | | | | | |
| | | Unsaturated double bond-containing silica organosol | OSCAL 1842 | 15 | 15 | 15 | 15 | 15 | 15 | 15 | 15 |
| | | Photopolymerization Initiator | Omnirad 184 | 5 | 5 | 5 | 5 | 5 | 5 | 5 | 5 |
| | | Total | | 100 | 100 | 100 | 100 | 100 | 100 | 100 | 100 |

| | Relationship with steps | | | Composition number | | | | | | |
|---|---|---|---|---|---|---|---|---|---|---|
| | | | | E2 | E2 | E2 | E2 | E2 | E2 | E2 |
| | | | | Corresponding example | | | | | | |
| | | | | Example 21 | Example 22 | Example 23 | Example 24 | Example 25 | Example 26 | Example 27 |
| Composition for forming a coating layer | i, ii, iii | Unsaturated double bond-containing acrylic resin Mw 25,000 | V-6850 | 55 | 55 | 55 | 55 | 55 | 55 | 55 |
| | | Unsaturated double bond-containing acrylic resin Mw 9,800 | EMS-635 | | | | | | | |
| | | Unsaturated double bond-containing acrylic resin Mw 80000 | Resin A | | | | | | | |
| | | Non-reactive acrylic resin Mw 45,000 | WEL-355 | | | | | | | |
| | | Non-reactive acrylic resin Mw 6000 | Resin B | | | | | | | |
| | | Non-reactive acrylic resin Mw 95000 | Resin C | | | | | | | |
| | | Polyfunctional urethane acrylate Equivalent 120 | KRM-8452 | 25 | 25 | 25 | 25 | 25 | 25 | 25 |
| | | Unsaturated double bond-containing fluorosilicone Mw 18000 | Shikoh UV-AF305 | | | | | | | |
| | | Fluororesin additive | OPTOOL DAC-HP | | | | | | | |
| | | Unsaturated double bond-containing silica organosol | OSCAL 1842 | 15 | 15 | 15 | 15 | 15 | 15 | 15 |
| | | Photopolymerization Initiator | Omnirad 184 | 5 | 5 | 5 | 5 | 5 | 5 | 5 |
| | | Total | | 100 | 100 | 100 | 100 | 100 | 100 | 100 |

TABLE 3

| | Relationship with steps | | | Composition number | | | | | | | | | |
|---|---|---|---|---|---|---|---|---|---|---|---|---|---|
| | | | | E2 | E2 | E2 | E2 | E5 | E6 | E7 | E8 | E9 | |
| | | | | Corresponding example | | | | | | | | | |
| | | | | Example 28 | Example 29 | Example 30 | Example 31 | Example 32 | Example 33 | Example 34 | Example 35 | Example 36 | |
| Composition for forming a coating layer | i, ii, iii | Unsaturated double bond-containing acrylic resin Mw 25,000 | V-6850 | 55 | 55 | 55 | 55 | | | | | | |
| | | Unsaturated double bond-containing acrylic resin Mw 9,800 | EMS-635 | | | | | | 55 | | | | |
| | | Unsaturated double bond-containing acrylic resin Mw 80000 | Resin A | | | | | | | | 55 | | |
| | | Non-reactive acrylic resin Mw 45,000 | WEL-355 | | | | | | | 55 | | | |
| | | Non-reactive acrylic resin Mw 6000 | Resin B | | | | | | 55 | | | | |
| | | Non-reactive acrylic resin Mw 95000 | Resin C | | | | | | | | | 55 | |
| | | Polyfunctional urethane acrylate Equivalent 120 | KRM-8452 | 25 | 25 | 25 | 25 | 25 | 25 | 25 | 25 | 25 | |
| | | Unsaturated double bond-containing fluorosilicone Mw 18000 | Shikoh UV-AF305 | | | | | | | | | | |
| | | Fluororesin additive | OPTOOL DAC-HP | | | | | | | | | | |
| | | Unsaturated double bond-containing silica organosol | OSCAL 1842 | 15 | 15 | 15 | 15 | 15 | 15 | 15 | 15 | 15 | |
| | | Photopolymerization Initiator | Omnirad 184 | 5 | 5 | 5 | 5 | 5 | 5 | 5 | 5 | 5 | |
| | | Total | | 100 | 100 | 100 | 100 | 100 | 100 | 100 | 100 | 100 | |

TABLE 4

| | | | | Composition number | | | | | | |
|---|---|---|---|---|---|---|---|---|---|---|
| | | | | E10 | E11 | E12 | E13 | E14 | E15 | E16 |
| | | | | Corresponding example | | | | | | |
| | Relationship with steps | | | Example 37 | Example 38 | Example 39 | Example 40 | Example 41 | Example 42 | Example 43 |
| Composition for forming a coating layer | i, ii, iii | Unsaturated double bond-containing acrylic resin Mw 25,000 | V-6850 | 55 | 55 | 55 | 45 | 45 | 45 | |
| | | Unsaturated double bond-containing acrylic resin Mw 100,000 | MAP-7000 | | | | | | | 45 |
| | | Unsaturated double bond-containing acrylic resin Mw 9,800 | EMS-635 | | | | | | | |
| | | Unsaturated double bond-containing acrylic resin Mw 80000 | Resin A | | | | | | | |
| | | Non-reactive acrylic resin Mw 45,000 | WEL-355 | | | | | | | |
| | | Non-reactive acrylic resin Mw 6000 | Resin B | | | | | | | |
| | | Non-reactive acrylic resin Mw 95000 | Resin C | | | | | | | |
| | | Polyfunctional urethane acrylate Equivalent 120 | KRM-8452 | 15 | 15 | 15 | 25 | 25 | 25 | 25 |
| | | Polyfunctional urethane acrylate Equivalent 340 | UN-3320HS | | 10 | | | 10 | | |
| | | Dipentaerythritol penta and hexa-acrylate equivalent 100 | M-402 | | | 10 | | | 10 | |
| | | Isocyanuric acid EO-modified di and triacrylate equivalent 150 | M-315 | | | | 10 | | 10 | 10 |

TABLE 4-continued

|  |  |  | Composition number | | | | | | |
|---|---|---|---|---|---|---|---|---|---|
|  |  |  | E10 | E11 | E12 | E13 | E14 | E15 | E16 |
|  |  |  | Corresponding example | | | | | | |
|  | Relationship with steps |  | Example 37 | Example 38 | Example 39 | Example 40 | Example 41 | Example 42 | Example 43 |
|  | Unsaturated double bond-containing fluorosilicone Mw 18000 | Shikoh UV-AF305 |  |  |  |  |  |  |  |
|  | Fluororesin additive | OPTOOL DAC-HP |  |  |  |  |  |  |  |
|  | Unsaturated double bond-containing silica organosol | OSCAL 1842 | 15 | 15 | 15 | 15 | 15 | 15 | 15 |
|  | Benzotriazole-based ultraviolet absorber | Tinuvin PS |  |  |  |  |  |  |  |
|  | Hydroxyphenyltriazine-based ultraviolet absorber | Tinuvin 400 |  |  |  |  |  |  |  |
|  | >N—CH3 type hindered amine light stabilizer | Tinuvin 292 |  |  |  |  |  |  |  |
|  | >N—OR type hindered amine light stabilizer | Tinuvin 123 |  |  |  |  |  |  |  |
|  | Photopolymerization Initiator | Omnirad 184 | 5 | 5 | 5 | 5 | 5 | 5 | 5 |
|  | Total |  | 100 | 100 | 100 | 100 | 100 | 100 | 100 |

TABLE 5

|  |  |  |  | Composition number | | | | | |
|---|---|---|---|---|---|---|---|---|---|
|  |  |  |  | E17 | E18 | E19 | E20 | E21 | E22 |
|  |  |  |  | Corresponding example | | | | | |
|  | Relationship with steps |  |  | Example 44 | Example 45 | Example 46 | Example 47 | Example 48 | Example 49 |
| Composition for forming a coating layer | i, ii, iii | Unsaturated double bond-containing acrylic resin Mw 25,000 | V-6850 | 49 | 51 | 51 | 51 | 49 | 47 |
|  |  | Unsaturated double bond-containing acrylic resin Mw 9,800 | EMS-635 |  |  |  |  |  |  |
|  |  | Unsaturated double bond-containing acrylic resin Mw 80000 | Resin A |  |  |  |  |  |  |
|  |  | Non-reactive acrylic resin Mw 45,000 | WEL-355 |  |  |  |  |  |  |
|  |  | Non-reactive acrylic resin Mw 6000 | Resin B |  |  |  |  |  |  |
|  |  | Non-reactive acrylic resin Mw 95000 | Resin C |  |  |  |  |  |  |
|  |  | Polyfunctional urethane acrylate Equivalent 120 | KRM-8452 | 22 | 23 | 23 | 23 | 22 | 21 |
|  |  | Polyfunctional urethane acrylate Equivalent 340 | UN-3320HS |  |  |  |  |  |  |
|  |  | Dipentaerythritol penta and hexa-acrylate equivalent 100 | M-402 |  |  |  |  |  |  |
|  |  | Isocyanuric acid EO-modified di and triacrylate equivalent 150 | M-315 |  |  |  |  |  |  |
|  |  | Unsaturated double bond-containing fluorosilicone Mw 18000 | Shikoh UV-AF305 |  |  |  |  |  |  |
|  |  | Fluororesin additive | OPTOOL DAC-HP |  |  |  |  |  |  |
|  |  | Unsaturated double bond-containing silica organosol | OSCAL 1842 | 13 | 14 | 14 | 14 | 13 | 13 |
|  |  | Benzotriazole-based ultraviolet absorber | Tinuvin PS | 9 |  |  |  |  | 4 |
|  |  | Hydroxyphenyltriazine-based ultraviolet absorber | Tinuvin 400 |  | 5 |  |  | 2 |  |

TABLE 5-continued

|  |  |  | Composition number | | | | | |
|---|---|---|---|---|---|---|---|---|
|  |  |  | E17 | E18 | E19 | E20 | E21 | E22 |
|  |  |  | Corresponding example | | | | | |
|  | Relationship with steps |  | Example 44 | Example 45 | Example 46 | Example 47 | Example 48 | Example 49 |
|  | >N—CH3 type hindered amine light stabilizer | Tinuvin 292 |  |  | 5 |  | 5 | 5 |
|  | >N—OR type hindered amine light stabilizer | Tinuvin 123 |  |  |  | 5 |  |  |
|  | Photopolymerization Initiator | Omnirad 184 | 7 | 7 | 7 | 7 | 7 | 7 |
|  | Total |  | 100 | 100 | 100 | 100 | 98 | 97 |

TABLE 6

|  |  |  |  | Composition number | |
|---|---|---|---|---|---|
|  |  |  |  | C1 | C2 |
|  |  |  |  | Corresponding comparative example | |
|  | Relationship with steps |  |  | Comparative Example 1 | Comparative Example 2 |
| Composition for forming a coating layer | i, ii, iii | Unsaturated double bond-containing acrylic resin Mw 25,000 | V-6850 | 45 |  |
|  |  | Unsaturated double bond-containing acrylic resin Mw 9,800 | EMS-635 |  |  |
|  |  | Unsaturated double bond-containing acrylic resin Mw 80000 | Resin A |  |  |
|  |  | Non-reactive acrylic resin Mw 45,000 | WEL-355 |  | 95 |
|  |  | Non-reactive acrylic resin Mw 6000 | Resin B |  |  |
|  |  | Non-reactive acrylic resin Mw 95000 | Resin C |  |  |
|  |  | Polyfunctional urethane acrylate Equivalent 120 | KRM-8452 |  |  |
|  |  | Unsaturated double bond-containing fluorosilicone Mw 18000 | Shikoh UV-AF305 |  |  |
|  |  | Fluororesin additive | OPTOOL DAC-HP |  |  |
|  |  | Unsaturated double bond-containing silica organosol | OSCAL 1842 | 50 |  |
|  |  | Photopolymerization Initiator | Omnirad 184 | 5 | 5 |
|  | Total |  |  | 100 | 100 |

TABLE 7A

|  |  |  |  | Example number | | | | | |
|---|---|---|---|---|---|---|---|---|---|
|  |  |  |  | Example 1 | Example 2 | Example 3 | Example 4 | Example 5 | Example 6 |
|  |  | Relationship |  | Composition number | | | | | |
| Processing | Item | with steps |  | E1 | E2 | E3 | E2 | E2 | E2 |
| Untreated | Surface shape of protective film/ coating layer | i, ii, iii | Rz(a) | 1.79 | 1.79 | 1.79 | 0.22 | 1.79 | 1.79 |
|  |  |  | Rz(b) | 1.57 | 1.72 | 1.91 | 0.21 | 1.72 | 1.72 |
|  |  |  | Rz(bh) | 0.40 | 0.20 | 0.11 | 0.12 | 0.38 | 0.26 |
|  |  |  | Formula (1) | 88 | 96 | 107 | 95 | 96 | 96 |
|  |  |  | Formula (2) | 25 | 12 | 6 | 57 | 22 | 15 |
|  |  |  | Formula (3) | 0.40 | 0.20 | 0.11 | 0.12 | 0.38 | 0.26 |

TABLE 7A-continued

| | | Relationship with steps | | | | | | | |
|---|---|---|---|---|---|---|---|---|---|
| Processing | Item | | | | | | | | |
| | Resin substrate | i, ii, iii | Thickness | 250 | 250 | 250 | 250 | 250 | 250 |
| | Coating layer | i, ii, iii | Thickness | 10.0 | 10.0 | 10.0 | 10.0 | 10.0 | 10.0 |
| | Protective film substrate | i, ii, iii | Type | OPP | OPP | OPP | OPP | OPP | OPP |
| | | | Oxygen permeability | 6300 | 6300 | 6300 | 6300 | 6300 | 6300 |
| | | | Thickness | 60 | 60 | 60 | 60 | 60 | 60 |
| | Adhesive layer | i, ii, iii | Thickness | 16 | 16 | 16 | 16 | 16 | 16 |
| | | | Adhesive strength | 0.010 | 0.015 | 0.024 | 0.010 | 0.015 | 0.015 |
| | Coating layer appearance | i, ii, iii | Strength rigidity | ○ | ○ | ○ | ○ | ○ | ○ |
| | | | Air entrapment | ○ | ○ | ○ | ○ | ○ | ○ |
| | | | Gloss | 86 | 85 | 83 | 89 | 86 | 85 |
| Preforming | Heating | i, ii, iii | Temperature | 160 | 160 | 160 | 160 | 150 | 150 |
| | | | Time | 30 | 30 | 30 | 30 | 30 | 60 |
| | Appearance after shaping | i, ii | Gloss | 88 | 90 | 91 | 90 | 89 | 90 |
| | State of coating film | 0 mJ | i, ii | Crack | ○ | ○ | ○ | ○ | ○ | ○ |
| UV irradiation | Stretch ratio/ C=C disappearance ratio of coating layer | 0 mJ | i, ii | Formula (4) E1 | 300 | 300 | 300 | 300 | 300 | 300 |
| | | 5 mJ | i, ii | Formula (4) E2 | 35 | 35 | 20 | 35 | 35 | 35 |
| | | | | Disappearance ratio (%) | 14 | 15 | 27 | 15 | 15 | 14 |
| | | 30 mJ | i, ii | Formula (4) E2 | 25 | 25 | 15 | 25 | 25 | 25 |
| | | | | Disappearance ratio (%) | 30 | 32 | 45 | 29 | 28 | 29 |
| | | 95 mJ | i, ii | Formula (4) E2 | 5 | 5 | 3 | 5 | 5 | 5 |
| | | | | Disappearance ratio (%) | 39 | 40 | 66 | 38 | 39 | 39 |
| | | 500 mJ | i, ii | Formula (4) E3-1 | 1 | 1 | 0 | 1 | 1 | 1 |
| | | | | Disappearance ratio (%) | 55 | 54 | 91 | 57 | 56 | 57 |
| | | 7000 mJ | i, ii | Formula (4) E3-2 | 1 | 1 | 0 | 1 | 1 | 1 |
| | | | | Disappearance ratio (%) | 84 | 86 | 94 | 85 | 86 | 85 |

| | | | | Example number | | | | | |
|---|---|---|---|---|---|---|---|---|---|
| | | | | Example 7 | Example 8 | Example 9 | Example 10 | Example 11 | Example 12 |
| | | Relationship | | Composition number | | | | | |
| Processing | Item | with steps | | E2 | E2 | E2 | E2 | E4 | E3 |
| Untreated | Surface shape of protective film/ coating layer | i, ii, iii | Rz(a) | 1.79 | 1.79 | 1.79 | 1.79 | 1.79 | 1.79 |
| | | | Rz(b) | 1.72 | 1.72 | 1.72 | 1.72 | 1.72 | 1.91 |
| | | | Rz(bh) | 0.30 | 0.21 | 0.20 | 0.13 | 0.20 | 0.11 |
| | | | Formula (1) | 96 | 96 | 96 | 96 | 96 | 107 |
| | | | Formula (2) | 17 | 12 | 12 | 8 | 12 | 6 |
| | | | Formula (3) | 0.30 | 0.21 | 0.20 | 0.13 | 0.20 | 0.11 |
| | Resin substrate | i, ii, iii | Thickness | 250 | 250 | 250 | 250 | 250 | 250 |
| | Coating layer | i, ii, iii | Thickness | 10.0 | 10.0 | 10.0 | 10.0 | 10.0 | 10.0 |
| | Protective film substrate | i, ii, iii | Type | OPP | OPP | OPP | OPP | OPP | OPP |
| | | | Oxygen permeability | 6300 | 6300 | 6300 | 6300 | 6300 | 6300 |
| | | | Thickness | 60 | 60 | 60 | 60 | 60 | 60 |
| | Adhesive layer | i, ii, iii | Thickness | 16 | 16 | 16 | 16 | 16 | 16 |
| | | | Adhesive strength | 0.015 | 0.015 | 0.015 | 0.015 | 0.015 | 0.024 |
| | Coating layer appearance | i, ii, iii | Strength rigidity | ○ | ○ | ○ | ○ | ○ | ○ |
| | | | Air entrapment | ○ | ○ | ○ | ○ | ○ | ○ |
| | | | Gloss | 85 | 86 | 85 | 85 | 86 | 82 |
| Preforming | Heating | i, ii, iii | Temperature | 170 | 170 | 190 | 190 | 160 | 160 |
| | | | Time | 30 | 60 | 30 | 60 | 30 | 30 |
| | Appearance after shaping | i, ii | Gloss | 89 | 90 | 90 | 92 | 91 | 92 |
| | State of coating film | 0 mJ | i, ii | Crack | ○ | ○ | ○ | ○ | ○ | ○ |
| UV irradiation | Stretch ratio/ C=C disappearance ratio of coating layer | 0 mJ | i, ii | Formula (4) E1 | 300 | 300 | 300 | 300 | 300 | 300 |
| | | 5 mJ | i, ii | Formula (4) E2 | 35 | 35 | 35 | 35 | 80 | 20 |
| | | | | Disappearance ratio (%) | 17 | 15 | 15 | 13 | 4 | 24 |
| | | 30 mJ | i, ii | Formula (4) E2 | 25 | 25 | 25 | 25 | 40 | 15 |
| | | | | Disappearance ratio (%) | 29 | 30 | 30 | 31 | 11 | 45 |
| | | 95 mJ | i, ii | Formula (4) E2 | 5 | 5 | 5 | 5 | 35 | 3 |
| | | | | Disappearance ratio (%) | 40 | 40 | 41 | 40 | 15 | 66 |

TABLE 7A-continued

|  |  |  |  |  |  |  |  |  |
|---|---|---|---|---|---|---|---|---|
| 500 mJ | i, ii | Formula (4) E3-1 | 1 | 1 | 1 | 1 | 25 | 0 |
|  |  | Disappearance ratio (%) | 54 | 56 | 55 | 56 | 20 | 90 |
| 7000 mJ | i, ii | Formula (4) E3-2 | 1 | 1 | 1 | 1 | 5 | 0 |
|  |  | Disappearance ratio (%) | 86 | 88 | 85 | 87 | 42 | 94 |

TABLE 7B

| Processing | Item | Relationship with steps |  |  | Example 1 | Example 2 | Example 3 | Example 4 | Example 5 | Example 6 | Example 7 |
|---|---|---|---|---|---|---|---|---|---|---|---|
|  |  |  |  |  | E1 | E2 | E3 | E2 | E2 | E2 | E2 |
| Appearance, performance and physical properties of molded article | i | 500 mJ | Appearance (gloss) |  | 90 | 91 | 91 | 90 | 90 | 90 | 91 |
|  |  |  | Abrasion resistance |  | ○+ | ○ | ○+ | ○ | ○ | ○ | ○+ |
|  |  |  | Hardness |  | 3H | 2H | 3H | 2H | 2H | 2H | 2H |
|  |  |  | Chemical resistance |  | ○ | ○ | ○ | ○ | ○ | ○ | ○ |
|  | ii | 500 mJ | Appearance (gloss) |  | 90 | 91 | 91 | 91 | 90 | 91 | 90 |
|  |  |  | Abrasion resistance |  | ○+ | ○ | ○+ | ○ | ○ | ○ | ○+ |
|  |  |  | Hardness |  | 3H | 2H | 3H | 2H | 2H | 2H | 2H |
|  |  |  | Chemical resistance |  | ○ | ○ | ○ | ○ | ○ | ○ | ○ |

| Processing | Item | Relationship with steps |  |  | Example 8 | Example 9 | Example 10 | Example 11 | Example 12 |
|---|---|---|---|---|---|---|---|---|---|
|  |  |  |  |  | E2 | E2 | E2 | E4 | E3 |
| Appearance, performance and physical properties of molded article | i | 500 mJ | Appearance (gloss) |  | 90 | 91 | 91 | 88 | 91 |
|  |  |  | Abrasion resistance |  | ○ | ○ | ○ | ○ | ○+ |
|  |  |  | Hardness |  | 2H | 2H | 2H | 2H | 3H |
|  |  |  | Chemical resistance |  | ○ | ○ | ○ | ○ | ○ |
|  | ii | 500 mJ | Appearance (gloss) |  | 90 | 90 | 91 | 89 | 91 |
|  |  |  | Abrasion resistance |  | ○ | ○ | ○ | ○ | ○+ |
|  |  |  | Hardness |  | 2H | 2H | 2H | 2H | 3H |
|  |  |  | Chemical resistance |  | ○ | ○ | ○ | ○ | ○ |

TABLE 8

| Processing | Item | Relationship with steps |  | Example 13 | Example 14 | Example 15 | Example 16 | Example 17 | Example 18 |
|---|---|---|---|---|---|---|---|---|---|
|  |  |  |  | E2 | E2 | E2 | E2 | E2 | E2 |
| Untreated | Surface shape of protective film/coating layer | i, ii, iii | Rz(a) | 1.79 | 1.79 | 1.79 | 1.79 | 1.79 | 1.79 |
|  |  |  | Rz(b) | 1.72 | 1.72 | 1.72 | 1.62 | 1.72 | 1.88 |
|  |  |  | Rz(bh) | 0.20 | 0.20 | 0.20 | 0.20 | 0.20 | 0.40 |
|  |  |  | Formula (1) | 96 | 96 | 96 | 91 | 96 | 105 |
|  |  |  | Formula (2) | 12 | 12 | 12 | 12 | 12 | 21 |
|  |  |  | Formula (3) | 0.20 | 0.20 | 0.20 | 0.20 | 0.20 | 0.40 |

TABLE 8-continued

| Processing | Item | Relationship with steps | | | Example 13 | Example 14 | Example 15 | Example 16 | Example 17 | Example 18 |
|---|---|---|---|---|---|---|---|---|---|---|
| | | | | Composition number | E2 | E2 | E2 | E2 | E2 | E2 |
| | Resin substrate | i, ii, iii | Thickness | | 250 | 250 | 250 | 250 | 250 | 250 |
| | Coating layer | i, ii, iii | Thickness | | 10.0 | 10.0 | 10.0 | 10.0 | 10.0 | 10.0 |
| | Protective film substrate | i, ii, iii | Type | | OPP | CPP | PE | OPP | OPP | OPP |
| | | | Oxygen permeability | | 3700 | 32000 | 65000 | 6300 | 6300 | 6300 |
| | | | Thickness | | 100 | 30 | 100 | 60 | 60 | 60 |
| | Adhesive layer | i, ii, iii | Thickness | | 16 | 16 | 16 | 10 | 16 | 20 |
| | | | Adhesive strength | | 0.5 | 0.5 | 0.5 | 0.03 | 0.5 | 0.8 |
| | Coating layer appearance | i, ii, iii | Strength rigidity | | ○ | ○ | ○ | ○ | ○ | ○ |
| | | | Air entrapment | | ○ | ○ | ○ | ○ | ○ | ○ |
| | | | Gloss | | 85 | 86 | 85 | 87 | 85 | 83 |
| Preforming | Heating | i, ii, iii | Temperature | | 160 | 160 | 160 | 160 | 160 | 160 |
| | | | Time | | 30 | 30 | 30 | 30 | 30 | 30 |
| | Appearance of molded article | iii | Foaming marks | | ○ | ○ | ○ | ○ | ○ | ○ |
| | State of coating film | iii | | 0 mJ | ○ | ○ | ○ | ○ | ○ | ○ |
| UV irradiation 1 | Stretch ratio of coating layer | iii | Formula (4) E1 (unpeeled) | 0 mJ | 250 | 250 | 250 | 250 | 250 | 250 |
| | Appearance, performance and physical properties of molded article | iii | Appearance (gloss) | 500 mJ | ○ | ○ | ○ | ○ | ○ | ○ |
| | | | Abrasion resistance | | ○ | ○ | ○ | ○ | ○ | ○ |
| | | | Hardness | | 2H | 2H | 2H | 2H | 2H | 2H |
| | | | Chemical resistance | | ○ | ○ | ○ | ○ | ○ | ○ |

TABLE 9A

| Processing | Item | Relationship with steps | | | Example 19 | Example 20 | Example 21 | Example 22 | Example 23 |
|---|---|---|---|---|---|---|---|---|---|
| | | | | Composition number | E2 | E2 | E2 | E2 | E2 |
| Untreated | Surface shape of protective film/ coating layer | i, ii, iii | Rz(a) | | 1.79 | 1.79 | 1.79 | 1.79 | 1.79 |
| | | | Rz(b) | | 1.72 | 1.72 | 1.72 | 1.72 | 1.72 |
| | | | Rz(bh) | | 0.20 | 0.20 | 0.20 | 0.20 | 0.20 |
| | | | Formula (1) | | 96 | 96 | 96 | 96 | 96 |
| | | | Formula (2) | | 12 | 12 | 12 | 12 | 12 |
| | | | Formula (3) | | 0.20 | 0.20 | 0.20 | 0.20 | 0.20 |
| | Resin substrate | i, ii, iii | Thickness | | 250 | 250 | 250 | 250 | 250 |
| | Coating layer | i, ii, iii | Thickness | | 10.0 | 10.0 | 10.0 | 10.0 | 10.0 |
| | Protective film substrate | i, ii, iii | Type | | OPP | OPP | PE | CPP | Modified PO |
| | | | Oxygen permeability | | 12500 | 3700 | 32000 | 16000 | 3600 |
| | | | Thickness | | 30 | 100 | 100 | 100 | 100 |
| | Adhesive layer | i, ii, iii | Thickness | | 16 | 16 | 16 | 16 | 16 |
| | | | Adhesive strength | | 0.015 | 0.015 | 0.015 | 0.015 | 0.015 |
| | Coating layer appearance | i, ii, iii | Strength rigidity | | ○ | ○ | ○ | ○ | ○ |
| | | | Air entrapment | | ○ | ○ | ○ | ○ | ○ |
| | | | Gloss | | 85 | 85 | 84 | 84 | 86 |
| Preforming | Heating | i, ii, iii | Temperature | | 160 | 160 | 160 | 160 | 160 |
| | | | Time | | 30 | 30 | 30 | 30 | 30 |
| | Appearance of molded article | i, ii | Gloss | | 91 | 88 | 88 | 88 | 89 |
| | State of coating film | i, ii | Crack | 0 mJ | ○ | ○ | ○ | ○ | ○ |

TABLE 9A-continued

| | | | | | | | | | | |
|---|---|---|---|---|---|---|---|---|---|---|
| UV irradiation 1 | Stretch ratio/ C=C disappearance ratio of coating layer | 0 mJ | i, ii | Formula (4) E1 | 300 | 300 | 300 | 300 | 300 | |
| | | 5 mJ | i, ii | Formula (4) E2 | 35 | 35 | 35 | 35 | 35 | |
| | | | | Disappearance ratio (%) | 15 | 15 | 14 | 13 | 17 | |
| | | 30 mJ | i, ii | Formula (4) E2 | 25 | 25 | 25 | 25 | 25 | |
| | | | | Disappearance ratio (%) | 33 | 30 | 28 | 32 | 31 | |
| | | 95 mJ | i, ii | Formula (4) E2 | 5 | 5 | 5 | 5 | 5 | |
| | | | | Disappearance ratio (%) | 41 | 42 | 41 | 42 | 40 | |
| | | 500 mJ | i, ii | Formula (4) E3-1 | 1 | 1 | 1 | 1 | 1 | |
| | | | | Disappearance ratio (%) | 56 | 55 | 52 | 56 | 52 | |
| | | 7000 mJ | i, ii | Formula (4) E3-2 | 1 | 1 | 1 | 1 | 1 | |
| | | | | Disappearance ratio (%) | 83 | 86 | 83 | 83 | 82 | |

| | | | | | Example number | | | |
|---|---|---|---|---|---|---|---|---|
| | | | | | Example 24 | Example 25 | Example 26 | Example 27 |
| | | | Relationship | | | Composition number | | |
| Processing | Item | | with steps | | E2 | E2 | E2 | E2 |
| Untreated | Surface shape of protective film/ coating layer | | i, ii, iii | Rz(a) | 1.79 | 1.79 | 1.79 | 1.79 |
| | | | | Rz(b) | 1.72 | 1.72 | 1.62 | 1.88 |
| | | | | Rz(bh) | 0.20 | 0.20 | 0.20 | 0.40 |
| | | | | Formula (1) | 96 | 96 | 91 | 105 |
| | | | | Formula (2) | 12 | 12 | 12 | 21 |
| | | | | Formula (3) | 0.20 | 0.20 | 0.20 | 0.40 |
| | Resin substrate | | i, ii, iii | Thickness | 250 | 250 | 250 | 250 |
| | Coating layer | | i, ii, iii | Thickness | 10.0 | 10.0 | 10.0 | 10.0 |
| | Protective film substrate | | i, ii, iii | Type | PS | TPX | OPP | OPP |
| | | | | Oxygen permeability | 26000 | 650000 | 6300 | 6300 |
| | | | | Thickness | 100 | 100 | 60 | 60 |
| | Adhesive layer | | i, ii, iii | Thickness | 16 | 16 | 10 | 20 |
| | | | | Adhesive strength | 0.015 | 0.015 | 0.01 | 0.024 |
| | Coating layer appearance | | i, ii, iii | Strength rigidity | ○ | ○ | ○ | ○ |
| | | | | Air entrapment | ○ | ○ | ○ | ○ |
| | | | | Gloss | 84 | 85 | 85 | 81 |
| Preforming | Heating | | i, ii, iii | Temperature | 160 | 160 | 160 | 160 |
| | | | | Time | 30 | 30 | 30 | 30 |
| | Appearance of molded article | | i, ii | Gloss | 87 | 88 | 89 | 87 |
| | State of coating film | 0 mJ | i, ii | Crack | ○ | ○ | ○ | ○ |
| UV irradiation 1 | Stretch ratio/ C=C disappearance ratio of coating layer | 0 mJ | i, ii | Formula (4) E1 | 300 | 300 | 300 | 300 |
| | | 5 mJ | i, ii | Formula (4) E2 | 35 | 35 | 35 | 35 |
| | | | | Disappearance ratio (%) | 15 | 15 | 16 | 16 |
| | | 30 mJ | i, ii | Formula (4) E2 | 25 | 25 | 25 | 25 |
| | | | | Disappearance ratio (%) | 29 | 29 | 30 | 31 |
| | | 95 mJ | i, ii | Formula (4) E2 | 5 | 5 | 5 | 5 |
| | | | | Disappearance ratio (%) | 41 | 41 | 43 | 39 |
| | | 500 mJ | i, ii | Formula (4) E3-1 | 1 | 1 | 1 | 1 |
| | | | | Disappearance ratio (%) | 57 | 55 | 55 | 56 |
| | | 7000 mJ | i, ii | Formula (4) E3-2 | 1 | 1 | 1 | 1 |
| | | | | Disappearance ratio (%) | 85 | 86 | 86 | 85 |

TABLE 9B

| Processing | Item | Relationship with steps | | | Example 19 | Example 20 | Example 21 | Example 22 | Example 23 | Example 24 | Example 25 | Example 26 | Example 27 |
|---|---|---|---|---|---|---|---|---|---|---|---|---|---|
| | | | | | E2 | E2 | E2 | E2 | Composition number E2 | E2 | E2 | E2 | E2 |
| Appearance, performance and physical properties of molded article | i | | 500 mJ | Appearance (gloss) | 89 | 88 | 90 | 90 | 89 | 88 | 89 | 89 | 88 |
| | | | | Abrasion resistance | ○ | ○ | ○ | ○ | ○ | ○ | ○ | ○ | ○ |
| | | | | Hardness | 2H | 2H | 2H | 2H | 2H | 2H | 2H | 2H | 2H |
| | | | | Chemical resistance | ○ | ○ | ○ | ○ | ○ | ○ | ○ | ○ | ○ |
| | ii | | 500 mJ | Appearance (gloss) | 90 | 89 | 88 | 90 | 89 | 88 | 89 | 90 | 87 |
| | | | | Abrasion resistance | ○ | ○ | ○ | ○ | ○ | ○ | ○ | ○ | ○ |
| | | | | Hardness | 2H | 2H | 2H | 2H | 2H | 2H | 2H | 2H | 2H |
| | | | | Chemical resistance | ○ | ○ | ○ | ○ | ○ | ○ | ○ | ○ | ○ |

TABLE 10A

| Processing | Item | | | Relationship with steps | | Example 28 | Example 29 | Example 30 | Example 31 | Example 32 |
|---|---|---|---|---|---|---|---|---|---|---|
| | | | | | | E2 | E2 | Composition number E2 | E2 | E5 |
| Untreated | Surface shape of protective film/coating layer | | | i, ii, iii | Rz(a) | 1.79 | 1.79 | 1.79 | 1.79 | 1.79 |
| | | | | | Rz(b) | 1.72 | 1.72 | 1.72 | 1.72 | 1.82 |
| | | | | | Rz(bh) | 0.20 | 0.20 | 0.19 | 0.21 | 0.20 |
| | | | | | Formula (1) | 96 | 96 | 96 | 96 | 102 |
| | | | | | Formula (2) | 12 | 12 | 11 | 12 | 11 |
| | | | | | Formula (3) | 0.20 | 0.20 | 0.19 | 0.21 | 0.20 |
| | Resin substrate | | | i, ii, iii | Thickness | 250 | 250 | 100 | 500 | 250 |
| | Coating layer | | | i, ii, iii | Thickness | 3.0 | 20.0 | 3.0 | 3.0 | 10.0 |
| | Protective film substrate | | | i, ii, iii | Type | OPP | OPP | OPP | OPP | OPP |
| | | | | | Oxygen permeability | 6300 | 6300 | 6300 | 6300 | 6300 |
| | | | | | Thickness | 60 | 60 | 60 | 60 | 60 |
| | Adhesive layer | | | i, ii, iii | Thickness | 16 | 16 | 16 | 16 | 16 |
| | | | | | Adhesive strength | 0.015 | 0.015 | 0.015 | 0.015 | 0.015 |
| | Coating layer appearance | | | i, ii, iii | Strength rigidity | ○ | ○ | ○ | ○ | ○ |
| | | | | | Air entrapment | ○ | ○ | ○ | ○ | ○ |
| | | | | | Gloss | 87 | 87 | 87 | 87 | 86 |
| Performing | Heating | | | i, ii, iii | Temperature | 160 | 160 | 160 | 160 | 160 |
| | | | | | Time | 30 | 30 | 30 | 30 | 30 |
| | Appearance of molded article | | | i, ii | Gloss | 90 | 89 | 89 | 90 | 91 |
| | State of coating film | 0 mJ | | i, ii | Crack | ○ | ○ | ○ | ○ | ○ |
| UV irradiation 1 | Stretch ratio/C=C disappearance ratio of coating layer | 0 mJ | | i, ii | Formula (4) E1 | 300 | 300 | 300 | 300 | 300 |
| | | 5 mJ | | i, ii | Formula (4) E2 | 35 | 35 | 35 | 35 | 35 |
| | | | | | Disappearance ratio (%) | 15 | 16 | 15 | 15 | 20 |
| | | 30 mJ | | i, ii | Formula (4) E2 | 25 | 25 | 25 | 25 | 25 |
| | | | | | Disappearance ratio (%) | 29 | 32 | 30 | 31 | 30 |
| | | 95 mJ | | i, ii | Formula (4) E2 | 5 | 5 | 5 | 5 | 5 |
| | | | | | Disappearance ratio (%) | 41 | 39 | 40 | 41 | 39 |
| | | 500 mJ | | i, ii | Formula (4) E3-1 | 1 | 1 | 1 | 1 | 1 |
| | | | | | Disappearance ratio (%) | 56 | 53 | 57 | 56 | 56 |
| | | 7000 mJ | | i, ii | Formula (4) E3-2 | 1 | 1 | 1 | 1 | 1 |
| | | | | | Disappearance ratio (%) | 86 | 87 | 86 | 86 | 85 |

TABLE 10A-continued

| | | | | Example number | | | |
|---|---|---|---|---|---|---|---|
| | | | | Example 33 | Example 34 | Example 35 | Example 36 |
| | | Relationship | | | | | |
| | | | | Composition number | | | |
| Processing | Item | with steps | | E6 | E7 | E8 | E9 |
| Untreated | Surface shape of protective film/ coating layer | i, ii, iii | Rz(a) | 1.79 | 1.79 | 1.79 | 1.79 |
| | | | Rz(b) | 1.82 | 1.80 | 1.55 | 1.55 |
| | | | Rz(bh) | 0.20 | 0.40 | 0.40 | 0.40 |
| | | | Formula (1) | 102 | 101 | 87 | 87 |
| | | | Formula (2) | 11 | 22 | 26 | 26 |
| | | | Formula (3) | 0.20 | 0.40 | 0.40 | 0.40 |
| | Resin substrate | i, ii, iii | Thickness | 250 | 250 | 250 | 250 |
| | Coating layer | i, ii, iii | Thickness | 10.0 | 10.0 | 10.0 | 10.0 |
| | Protective film substrate | i, ii, iii | Type | OPP | OPP | OPP | OPP |
| | | | Oxygen permeability | 6300 | 6300 | 6300 | 6300 |
| | | | Thickness | 60 | 60 | 60 | 60 |
| | Adhesive layer | i, ii, iii | Thickness | 16 | 16 | 16 | 16 |
| | | | Adhesive strength | 0.015 | 0.01 | 0.01 | 0.01 |
| | Coating layer appearance | i, ii, iii | Strength rigidity | ○ | ○ | ○ | ○ |
| | | | Air entrapment | ○ | ○ | ○ | ○ |
| | | | Gloss | 87 | 83 | 82 | 84 |
| Performing | Heating | i, ii, iii | Temperature | 160 | 160 | 160 | 160 |
| | | | Time | 30 | 30 | 30 | 30 |
| | Appearance of molded article | i, ii | Gloss | 91 | 88 | 88 | 89 |
| | State of coating film | 0 mJ | i, ii | Crack | ○ | ○ | ○ | ○ |
| UV irradiation 1 | Stretch ratio/ C=C disappearance ratio of coating layer | 0 mJ | i, ii | Formula (4) E1 | 300 | 300 | 300 | 300 |
| | | 5 mJ | i, ii | Formula (4) E2 | 40 | 35 | 35 | 35 |
| | | | | Disappearance ratio (%) | 18 | 16 | 15 | 16 |
| | | 30 mJ | i, ii | Formula (4) E2 | 30 | 25 | 25 | 25 |
| | | | | Disappearance ratio (%) | 22 | 29 | 29 | 31 |
| | | 95 mJ | i, ii | Formula (4) E2 | 10 | 5 | 5 | 5 |
| | | | | Disappearance ratio (%) | 33 | 39 | 40 | 39 |
| | | 500 mJ | i, ii | Formula (4) E3-1 | 5 | 1 | 1 | 1 |
| | | | | Disappearance ratio (%) | 42 | 56 | 55 | 58 |
| | | 7000 mJ | i, ii | Formula (4) E3-2 | 1 | 1 | 1 | 1 |
| | | | | Disappearance ratio (%) | 85 | 85 | 84 | 85 |

TABLE 10B

| | | | | | | Example number | | | | | | | |
|---|---|---|---|---|---|---|---|---|---|---|---|---|---|
| | | | | | | Example 28 | Example 29 | Example 30 | Example 31 | Example 32 | Example 33 | Example 34 | Example 35 | Example 36 |
| | | Relationship | | | | | | | | Composition number | | | | |
| Processing | Item | with steps | | | | E2 | E2 | E2 | E2 | E5 | E6 | E7 | E8 | E9 |
| Appearance, performance and physical properties of molded article | i | | 500 mJ | Appearance (gloss) | | 90 | 90 | 91 | 90 | 91 | 91 | 89 | 90 | 89 |
| | | | | Abrasion resistance | | ○ | ○ | ○ | ○ | ○ | ○ | ○ | ○ | ○ |
| | | | | Hardness | | 2H | 2H | 2H | 2H | 2H | 2H | 2H | 2H | 2H |
| | | | | Chemical resistance | | ○ | ○ | ○ | ○ | ○ | ○ | ○ | ○ | ○ |
| | ii | | 500 mJ | Appearance (gloss) | | 90 | 90 | 90 | 90 | 91 | 91 | 89 | 90 | 90 |
| | | | | Abrasion resistance | | ○ | ○ | ○ | ○ | ○ | ○ | ○ | ○ | ○ |
| | | | | Hardness | | 2H | 2H | 2H | 2H | 2H | 2H | 2H | 2H | 2H |
| | | | | Chemical resistance | | ○ | ○ | ○ | ○ | ○ | ○ | ○ | ○ | ○ |

TABLE 11A

| | | | | Example number | | | | | | |
|---|---|---|---|---|---|---|---|---|---|---|
| | | | | Example 37 | Example 38 | Example 39 | Example 40 | Example 41 | Example 42 | Example 43 |
| | | Relationship | | | | | Composition number | | | |
| Processing | Item | with steps | | E10 | E11 | E12 | E13 | E14 | E15 | E16 |
| Untreated | Surface shape of protective film/coating layer | i, ii, iii | Rz(a) | 1.79 | 1.79 | 1.79 | 1.79 | 1.79 | 1.79 | 1.79 |
| | | | Rz(b) | 1.78 | 1.82 | 1.80 | 1.81 | 1.89 | 1.83 | 1.69 |
| | | | Rz(bh) | 0.21 | 0.18 | 0.21 | 0.20 | 0.15 | 0.17 | 0.39 |
| | | | Formula (1) | 99 | 102 | 101 | 101 | 106 | 102 | 94 |
| | | | Formula (2) | 12 | 10 | 12 | 11 | 8 | 9 | 23 |
| | | | Formula (3) | 0.21 | 0.18 | 0.21 | 0.20 | 0.15 | 0.17 | 0.39 |
| | Resin substrate | i, ii, iii | Thickness | 250 | 250 | 250 | 250 | 250 | 250 | 250 |
| | Coating layer | i, ii, iii | Thickness | 10.0 | 10.0 | 10.0 | 10.0 | 10.0 | 10.0 | 10.0 |
| | Protective film substrate | i, ii, iii | Type | OPP | OPP | OPP | OPP | OPP | OPP | OPP |
| | | | Oxygen permeability | 6300 | 6300 | 6300 | 6300 | 6300 | 6300 | 6300 |
| | | | Thickness | 60 | 60 | 60 | 60 | 60 | 60 | 60 |
| | Adhesive layer | i, ii, iii | Thickness | 16 | 16 | 16 | 16 | 16 | 16 | 16 |
| | | | Adhesive strength | 0.025 | 0.06 | 0.05 | 0.055 | 0.115 | 0.08 | 0.018 |
| | Coating layer appearance | i, ii, iii | Strength rigidity | ○ | ○ | ○ | ○ | ○ | ○ | ○ |
| | | | Air entrapment | ○ | ○ | ○ | ○ | ○ | ○ | ○ |
| | | | Gloss | 86 | 88 | 88 | 87 | 86 | 88 | 83 |
| Pre-forming | Heating | i, ii, iii | Temperature | 160 | 160 | 160 | 160 | 160 | 160 | 160 |
| | | | Time | 30 | 30 | 30 | 30 | 30 | 30 | 30 |
| | Appearance of molded article | i, ii | Gloss | 88 | 90 | 89 | 90 | 91 | 90 | 87 |
| | State of coating film | 0 mJ | i, ii | Crack | ○ | ○ | ○ | ○ | ○ | ○ | ○ |
| UV irradiation 1 | Stretch ratio/ C=C disappearance ratio of coating layer | 0 mJ | i, ii | Formula (4) E1 | 300 | 300 | 300 | 300 | 300 | 300 | 300 |
| | | 5 mJ | i, ii | Formula (4) E2 | 35 | 30 | 35 | 35 | 25 | 30 | 35 |
| | | | | Disappearance ratio (%) | 20 | 23 | 18 | 16 | 20 | 16 | 14 |
| | | 30 mJ | i, ii | Formula (4) E2 | 25 | 20 | 25 | 20 | 15 | 25 | 25 |
| | | | | Disappearance ratio (%) | 28 | 29 | 26 | 30 | 32 | 28 | 27 |
| | | 95 mJ | i, ii | Formula (4) E2 | 5 | 3 | 5 | 3 | 3 | 5 | 5 |
| | | | | Disappearance ratio (%) | 36 | 40 | 38 | 42 | 45 | 41 | 41 |
| | | 500 mJ | i, ii | Formula (4) E3-1 | 1 | 1 | 1 | 1 | 1 | 1 | 1 |
| | | | | Disappearance ratio (%) | 58 | 60 | 57 | 6 | 69 | 59 | 60 |
| | | 7000 mJ | i, ii | Formula (4) E3-2 | 1 | 1 | 1 | 1 | 1 | 1 | 1 |
| | | | | Disappearance ratio (%) | 82 | 80 | 82 | 84 | 79 | 82 | 85 |

TABLE 11B

| | | | | | Example number | | | | | | |
|---|---|---|---|---|---|---|---|---|---|---|---|
| | | | | | Example 37 | Example 38 | Example 39 | Example 40 | Example 41 | Example 42 | Example 43 |
| | | Relationship | | | | | | Composition number | | | |
| Processing | Item | with steps | | | E10 | E11 | E12 | E13 | E14 | E15 | E16 |
| Appearance, performance and physical properties of molded article | i | 500 mJ | Appearance (gloss) | | 88 | 90 | 89 | 90 | 90 | 91 | 89 |
| | | | Abrasion resistance | | ○ | ○ | ○ | ○ | ○ | ○ | ○ |
| | | | Hardness | | 2H | 2H | 2H | 2H | 2H | 2H | 2H |
| | | | Chemical resistance | | ○ | ○ | ○ | ○ | ○ | ○ | ○ |
| | ii | 500 mJ | Appearance (gloss) | | 90 | 90 | 89 | 89 | 91 | 91 | 90 |
| | | | Abrasion resistance | | ○ | ○ | ○ | ○ | ○ | ○ | ○ |
| | | | Hardness | | 2H | 2H | 2H | 2H | 2H | 2H | 2H |
| | | | Chemical resistance | | ○ | ○ | ○ | ○ | ○ | ○ | ○ |

TABLE 12A

| Processing | Item | Relationship with steps | | Example 44 | Example 45 | Example 46 | Example 47 | Example 48 | Example 49 |
|---|---|---|---|---|---|---|---|---|---|
| | | | | \multicolumn{6}{c}{Composition number} |
| | | | | E17 | E18 | E19 | E20 | E21 | E22 |
| Untreated | Surface shape of protective film/ coating layer | i, ii, iii | Rz(a) | 1.79 | 1.79 | 1.79 | 1.79 | 1.79 | 1.79 |
| | | | Rz(b) | 1.77 | 1.77 | 1.77 | 1.77 | 1.77 | 1.77 |
| | | | Rz(bh) | 0.23 | 0.25 | 0.23 | 0.25 | 0.25 | 0.22 |
| | | | Formula (1) | 99 | 99 | 99 | 99 | 99 | 99 |
| | | | Formula (2) | 12 | 12 | 12 | 12 | 12 | 12 |
| | | | Formula (3) | 0.21 | 0.21 | 0.21 | 0.21 | 0.21 | 0.21 |
| | Resin substrate | i, ii, iii | Thickness | 250 | 250 | 250 | 250 | 250 | 250 |
| | Coating layer | i, ii, iii | Thickness | 10.0 | 10.0 | 10.0 | 10.0 | 10.0 | 10.0 |
| | Protective film substrate | i, ii, iii | Type | OPP | OPP | OPP | OPP | OPP | OPP |
| | | | Oxygen permeability | 6300 | 6300 | 6300 | 6300 | 6300 | 6300 |
| | | | Thickness | 60 | 60 | 60 | 60 | 60 | 60 |
| | Adhesive layer | i, ii, iii | Thickness | 16 | 16 | 16 | 16 | 16 | 16 |
| | | | Adhesive strength | 0.028 | 0.028 | 0.03 | 0.028 | 0.028 | 0.03 |
| | Coating layer appearance | i, ii, iii | Strength rigidity | ○ | ○ | ○ | ○ | ○ | ○ |
| | | | Air entrapment | ○ | ○ | ○ | ○ | ○ | ○ |
| | | | Gloss | 87 | 89 | 88 | 88 | 86 | 85 |
| Performing | Heating | i, ii, iii | Temperature | 160 | 160 | 160 | 160 | 160 | 160 |
| | | | Time | 30 | 30 | 30 | 30 | 30 | 30 |
| | Appearance of molded article | i, ii | Gloss | 87 | 88 | 88 | 88 | 89 | 88 |
| | State of coating film | 0 mJ | i, ii | Crack | ○ | ○ | ○ | ○ | ○ | ○ |
| UV irradiation 1 | Stretch ratio/ C=C disappearance ratio of coating layer | 0 mJ | i, ii | Formula (4) E1 | 300 | 300 | 300 | 300 | 300 | 300 |
| | | 5 mJ | i, ii | Formula (4) E2 | 35 | 35 | 35 | 35 | 35 | 35 |
| | | | | Disappearance ratio (%) | 17 | 18 | 20 | 19 | 18 | 17 |
| | | 30 mJ | i, ii | Formula (4) E2 | 25 | 25 | 25 | 25 | 25 | 25 |
| | | | | Disappearance ratio (%) | 22 | 23 | 28 | 27 | 24 | 20 |
| | | 95 mJ | i, ii | Formula (4) E2 | 5 | 5 | 5 | 5 | 5 | 5 |
| | | | | Disappearance ratio (%) | 33 | 32 | 37 | 35 | 32 | 30 |
| | | 500 mJ | i, ii | Formula (4) E3-1 | 1 | 1 | 1 | 1 | 1 | 1 |
| | | | | Disappearance ratio (%) | 55 | 56 | 57 | 57 | 57 | 54 |
| | | 7000 mJ | i, ii | Formula (4) E3-2 | 1 | 1 | 1 | 1 | 1 | 1 |
| | | | | Disappearance ratio (%) | 79 | 81 | 83 | 82 | 78 | 76 |

TABLE 12B

| Processing | Item | Relationship with steps | | | Example 44 | Example 45 | Example 46 | Example 47 | Example 48 | Example 49 |
|---|---|---|---|---|---|---|---|---|---|---|
| | | | | | \multicolumn{6}{c}{Composition number} |
| | | | | | E17 | E18 | E19 | E20 | E21 | E22 |
| Appearance, performance and physical properties of molded article | | i | 500 mJ | Appearance (gloss) | 91 | 91 | 91 | 91 | 89 | 88 |
| | | | | Abrasion resistance | ○ | ○ | ○ | ○ | ○ | ○ |
| | | | | Hardness | 2H | 2H | 2H | 2H | 2H | 2H |
| | | | | Chemical resistance | ○ | ○ | ○ | ○ | ○ | ○ |
| | | ii | 500 mJ | Appearance (gloss) | 90 | 89 | 89 | 89 | 91 | 90 |
| | | | | Abrasion resistance | ○ | ○ | ○ | ○ | ○ | ○ |
| | | | | Hardness | 2H | 2H | 2H | 2H | 2H | 2H |
| | | | | Chemical resistance | ○ | ○ | ○ | ○ | ○ | ○ |

TABLE 13

| Processing | Item | Relationship with steps | | Corresponding comparative example | |
|---|---|---|---|---|---|
| | | | | Comparative Example 1 | Comparative Example 2 |
| | | | | Composition number | |
| | | | | C1 | C2 |
| Untreated | Surface shape of protective film/coating layer | i, ii, iii | Rz(a) | 1.79 | 1.79 |
| | | | Rz(b) | 1.58 | 1.61 |
| | | | Rz(bh) | 1.20 | 0.20 |
| | | | Formula (1) | 88 | 90 |
| | | | Formula (2) | 76 | 12 |
| | | | Formula (3) | 1.20 | 0.20 |
| | Resin substrate | i, ii, iii | Thickness | 250 | 250 |
| | Coating layer | i, ii, iii | Thickness | 10.0 | 10.0 |
| | Protective film substrate | i, ii, iii | Type | OPP | OPP |
| | | | Oxygen permeability | 6300 | 6300 |
| | | | Thickness | 60 | 60 |
| | Adhesive layer | i, ii, iii | Thickness | 16 | 16 |
| | | | Adhesive strength | 0.01 | 0.015 |
| | Coating layer appearance | i, ii, iii | Strength rigidity | ○ | ○ |
| | | | Air entrapment | ○ | ○ |
| | | | Gloss | 70 | 85 |
| Printing | Coating layer appearance | i, ii, iii | Squeegee marks | ○ | ○ |
| | | | Suction marks | ○ | ○ |
| | | | Protective peeling marks | ○ | ○ |
| | | | Foaming marks | ○ | ○ |
| | Film | i, ii, iii | Curling property | ○ | ○ |
| Peeling | Coating layer appearance | i, ii | Peeling marks | ○ | ○ |
| | | | Cracking of substrate | ○ | ○ |
| | | | Gloss | 65 | 80 |
| Preforming | Heating | i, ii, iii | Temperature | 160 | 160 |
| | | | Time | 30 | 30 |
| | Appearance of molded article | i, ii | Gloss | 71 | 88 |
| | State of coating film | 0 mJ | i, ii | Crack | ○ | ○ |
| UV irradiation 1 | Stretch ratio/ C=C disappearance ratio of coating layer | 0 mJ | i, ii | Formula (4) E1 | 250 | 300 |
| | | 5 mJ | i, ii | Formula (4) E2 | 25 | 300 |
| | | | | Disappearance ratio (%) | 7 | 0 |
| | | 30 mJ | i, ii | Formula (4) E2 | 15 | 300 |
| | | | | Disappearance ratio (%) | 15 | 0 |
| | | 95 mJ | i, ii | Formula (4) E2 | 1 | 300 |
| | | | | Disappearance ratio (%) | 25 | 0 |
| | | 500 mJ | i, ii | Formula (4) E3-1 | 0 | 300 |
| | | | | Disappearance ratio (%) | 30 | 0 |
| | | 7000 mJ | i, ii | Formula (4) E3-2 | 0 | 300 |
| | | | | Disappearance ratio (%) | 55 | 0 |
| | Appearance, performance and physical properties of molded article | i | 500 mJ | Appearance (gloss) | 72 | 87 |
| | | | | Abrasion resistance | Δ | x |
| | | | | Hardness | 2H | F |
| | | | | Chemical resistance | ○ | x |
| | | ii | 500 mJ | Appearance (gloss) | 71 | 88 |
| | | | | Abrasion resistance | Δ | x |
| | | | | Hardness | 2H | F |
| | | | | Chemical resistance | ○ | x |

In Tables 7A to 13, each evaluation item was measured as follows.

Measurement of Rz(a)

For each of the protective films used in Examples and Comparative Examples, the surface roughness Rz(a) of the adhesive layer before coming into contact with the coating layer, taken on the side where the coating layer was located, was measured according to the following procedure.

A test sample was cut into a size of 50 mm×50 mm and measured in accordance with JIS B0601; 2001 with a laser microscope (VK 8700 produced by KEYENCE) having an eyepiece magnification of 20 times and an objective lens magnification of 50 times to obtain an Rz(a) value.

Measurement of Rz(b)

In each of the laminated members prepared in Examples and Comparative Examples, the protective film was peeled from the coating layer at a temperature of 20 to 30° C. and a rate of 5.0 mm/sec. Then, the surface roughness Rz(b) of the coating layer from which the protective film was peeled, taken on the side opposite from the resin substrate, was measured according to the following procedure.

A test sample was cut into a size of 50 mm×50 mm and measured in accordance with JIS B0601; 2001 with a laser microscope (VK 8700 produced by KEYENCE) having an eyepiece magnification of 20 times and an objective lens magnification of 50 times to obtain an Rz(b) value.

Measurement of Rz(bh)

In each of the laminated members prepared in Examples and Comparative Examples, the protective film was peeled from the coating layer at a temperature of 20 to 30° C. and a rate of 5.0 mm/sec. An unheated sample having the coating layer and the resin substrate was heated in an atmosphere of 160° C. for 30 seconds and then cooled to room temperature.

For the heated sample obtained, the surface roughness Rz(bh) of the coating layer on the side opposite from the resin substrate was measured according to the following procedure.

A test sample was cut into a size of 50 mm×50 mm and measured in accordance with JIS B0601; 2001 with a laser microscope (VK 8700 produced by KEYENCE) having an eyepiece magnification of 20 times and an objective lens magnification of 50 times to obtain an Rz(bh) value.

In the same manner as in the Examples, for each of the laminated members (Comparative Examples 1 and 2), the Rz(bh) of the laminated member was measured.

From the obtained Rz(a), Rz(b) and Rz(bh), the results of Formulas (1) and (2) below were calculated. In addition, Formula (3) was examined. The obtained results are shown in Tables 7 to 13.

$$Rz(b)/Rz(a) \times 100 \quad \text{Formula (1)}$$

$$Rz(bh)/Rz(b) \times 100 \quad \text{Formula (2)}$$

$$Rz(bh) \leq Rz(b) \quad \text{Formula (3)}$$

Measurement of Thickness of Coating Layer

For a sample prepared by peeling a protective film at a temperature of 20 to 30° C. and a rate of 5.0 mm/sec and irradiating it with active energy rays at an integral light quantity of 500 mJ/cm$^2$, the thickness of the coating layer was measured.

Specifically, the thickness of the coating layer was measured as follows. A test sample was formed into a size of 10 mm×10 mm, and a cross section of the coating layer was precipitated with a microtome (LEICA RM 2265). The formed cross section was observed with a laser microscope (VK8700 manufactured by KEYENCE Corporation), the thickness of the coating layer was measured at ten points and the average value of the measurements was calculated to determine the thickness of the coating layer.

Oxygen Permeability of Protective Film

Oxygen permeability was measured by differential pressure gas chromatography according to JIS K7126-1 (differential pressure method).

Measurement of Substrate Thickness of Protective Film

The substrate thickness was measured as follows. A test sample was cut into a size of 10 mm×10 mm, and a cross section of the substrate was formed with a microtome (LEICA RM 2265). The formed cross section was observed with a laser microscope (VK8700 manufactured by KEYENCE Corporation), the thickness of the substrate was measured at ten points and the average value of the measurements was calculated to determine the thickness of the substrate.

Measurement of Adhesive Layer Thickness of Protective Film

The adhesive layer thickness was measured as follows. A test sample was formed into a size of 10 mm×10 mm, and a cross section of the adhesive layer was formed with a microtome (LEICA RM 2265). The formed cross section was observed with a laser microscope (VK8700 manufactured by KEYENCE Corporation), the film thickness was measured at ten protruding portions and ten recessing portions, and the average value of the measurements was calculated to determine the adhesive layer thickness.

Measurement of the Adhesive Strength of Adhesive Layer of Protective Film

After a laminated member for decoration was cut into a strip sized 25 mm×200 mm, the protective film was peeled 10 mm from a side with a width of 25 mm, clipped with a terminal, and peeled 150 mm in the 170° direction at a rate of 5.0 mm/sec, and at this time the peel strength was measured.

Evaluation of Strength and Rigidity

The strength and rigidity of the laminated members for decoration (Examples) each having a protective film, a coating layer and a resin substrate and the laminated members (Comparative Examples) were evaluated.

After the load of an Eriksen hardness tester equipped with a 0.75 mm indenter was adjusted to 0.5 N, a measuring device was set vertically on the protective film of a laminated member for decoration, and then the operation of moving the device parallelly 50 mm was repeated five times. Then, the protective film was peeled from the uncured coating layer, and the uncured coating layer corresponding to a testing site was observed with a laser microscope (VK8700, manufactured by KEYENCE) and the presence of a dent was evaluated. Evaluation criteria are as follows.

○: 0 dents in 5 tests

□: 1 dent in 5 tests x: 2 or more dents in 5 tests

Evaluation of Air Entrapment Defect

A test sample prepared by cutting a laminated member for decoration obtained in an Example into 200 mm×200 mm was heated at 90° C. for 1 hour, taken out, and left at room temperature for 1 hour, and then the appearance of the test sample was visually evaluated.

Further, the protective film of the test sample described above was peeled from the uncured coating layer, heated for 30 seconds in an atmosphere of 190° C., and left at room temperature for 1 hour, and then the appearance of the test piece was visually evaluated. The same evaluation was performed for the laminated members (Comparative Examples).

Evaluation criteria are as follows.

○: There is no bulge on the protective film./There is no abnormality in the appearance after heating at 190° C.

○□: There are bulges caused by air entrapment at less than 10 points and the appearance is restored by heating at 190° C.

□: There are bulges caused by air entrapment at 10 or more points and the appearance is restored by heating at 190° C.

x: There are bulges caused by air entrapment at 10 or more points and there can be recognized as defects after heating at 190° C.

Evaluation of Gloss of Coating Layer

A laminated member for decoration obtained in an Example was cut into 200 mm×200 mm, and a printed layer was laminated by screen printing on the surface opposite from the coating layer and then dried at a drying temperature of 80° C. for 10 minutes. After repeating this printing process five times and then further drying at 90° C. for 1 hour, the protective film was peeled at a temperature of 20 to 30° C. and a rate of 5.0 mm/sec to obtain a test sample. First, after the test sample, the glossiness was measured from the surface of the coating layer using a microgloss manufactured by BYK, and thus the glossiness at 60 was obtained. The same evaluation was performed for the laminated members (Comparative Examples).

About Pre-Forming Temperature and Time

An unheated sample composed of a coating layer and a resin substrate formed by peeling off the protective film of the laminated member at a speed of 5.0 mm/sec was heated at the temperature and for the time shown in the tables in Examples, and was preformed.

In addition, in the comparative examples, pre-forming was done in the same manner.

Evaluation of Molded Article's Appearance (Foam Marks)

With respect to the molded article obtained by the above method (iii), it was observed whether foam marks were present on the coating layer. In this evaluation, the result that no foaming marks were observed on the coating layer of the molded article after preforming was expressed by "○", and the result that foaming marks were observed on the coating layer was expressed by "x".

Evaluation of Molded Article's Appearance (Gloss)

For each of the molded articles obtained by the methods i and ii, the glossiness on the coating layer after preforming was measured.

More specifically, each of the molded articles obtained by the methods i and ii was irradiated with active energy rays of 500 mJ/cm$^2$ after preforming to obtain a test sample. The evaluation was performed at a place where the decorative layer was located on the opposite surface of the coating layer, and the glossiness was measured from the surface of the coating layer using a microgloss manufactured by BYK, and thus the glossiness at 60° was obtained. The same evaluation was performed for the laminated members (Comparative Examples). In the present disclosure, when the glossiness is 80 or more, it can be determined that the glossiness is good.

Evaluation of Cracks

For the molded articles obtained by the methods i, ii and iii, the presence of cracks on the coating layer was checked. The result that no crack was observed in the coating layer was expressed by "○", and the result that cracks were observed in the coating layer was expressed by "x". In this evaluation, the presence of cracks was visually observed.

Measurement of Stretch Ratio E1 of Coating Layer after Heating

For each of the laminated members for decoration obtained in Examples, the protective film was peeled from the coating layer (thickness: 5 μm) at 20 to 30° C. and a rate of 5.0 mm/sec, and thus a sample having the coating layer and the resin substrate (thickness: 250 μm) was prepared. For the heated sample for a stretch test (1) prepared by heating that sample in an atmosphere of 160° C. for 1 minute, the stretch ratio E1 was measured. The stretch ratio E1 was measured using a heated sample with a size of 10 mm×100 mm in an atmosphere of 160° C. at a tensile force of 5.0 Kgf and a stretching rate of 300 mm/min.

In the same manner as described above, for each of the laminated members (Comparative Examples), a sample prepared by peeling the protective film and heating at 160° C. was subjected to the measurement of the stretch ratio E1.

Measurement of Stretch Ratio E2 after Semi-Curing Coating Layer

The heated sample for a stretch test (1) in each Example was irradiated with active energy rays of 5 mJ/cm$^2$, 30 mJ/cm$^2$, or 95 mJ/cm$^2$ to semi-cure the coating layer. The stretch ratio E2 in the resulting heated sample for a stretch test (2) was measured in the same manner as in the above-described method for measuring the stretch ratio E1.

Further, for the laminated members (Comparative Examples), the stretch ratio E2 was measured under the same condition as in the Examples.

Measurement of Stretch Ratio E3 after Curing Coating Layer

The heated sample for a stretch test (1) in each Example was irradiated with active energy rays of 500 mJ/cm$^2$ or 7000 mJ/cm$^2$ to cure the coating layer. The stretch ratio E3 in the resulting heated sample for a stretch test (3) was measured in the same manner as in the above-described method for measuring the stretch ratio E1. Further, for the laminated members (Comparative Examples), the stretch ratio E3 was measured under the same condition as in the Examples.

Measurement of Stretch Ratio E1 in Heated Sample for Stretch Test (Unpeeled)

For the laminated members for decoration obtained in Examples, the stretch ratio E1 in the heated samples for a stretch test (unpeeled) each prepared by heating the sample with the protective film unpeeled in an atmosphere of 160° C. for 1 minute was measured. The stretch ratio E1 (unpeeled) was measured using a heated sample with a size of 10 mm×100 mm in an atmosphere of 160° C. at a tensile force of 5.0 Kgf and a stretching rate of 300 mm/min.

In the same manner as described above, for each of the laminated members (Comparative Examples), a sample heated at 160° C. without peeling the protective film was subjected to the measurement of the stretch ratio E1 (unpeeled). The stretch ratio E1 (unpeeled) according to Examples 13 to 18 was measured according to this measuring method.

Measurement of Disappearance Ratio

For each of the laminated members obtained in Examples, there was prepared an unheated sample having a resin substrate and a coating layer formed by peeling a protective film from the coating layer at a rate of 5.0 mm/sec. The number of the unreacted (meth)acryloyl groups contained in the coating layer of the resulting unheated sample was determined by the ATR method using FT-IR.

More specifically, the uncured coating layer was measured and, as a result, the peak height of each of the peak top located around 1730 cm$^{-1}$ (the absorption band of carbonyl group C═O) and the peak top located around 1635 cm$^{-1}$ (the absorption band of unsaturated double bond C═C) was determined.

The peak height was obtained by the same procedure also for the coating layer after irradiation with a prescribed amount of active energy rays.

The disappearance ratio (%) was calculated by the following formulas.

Peak height ratio=height at 1635 cm$^{-1}$/height at 1730 cm$^{-1}$  Formula 1)

Disappearance ratio (%)=peak height ratio of coating layer after irradiation with active energy rays/peak height ratio of uncured coating layer×100  Formula 2)

On the other hand, each unheated sample was irradiated with active energy rays of 5 mJ/cm$^2$, 30 mJ/cm$^2$, 95 mJ/cm$^2$, 500 mJ/cm$^2$ or 7000 mJ/cm$^2$, and the number of the unreacted (meth)acryloyl groups contained in the coating layer was calculated in the same manner as described above.

Evaluation of Performance and Physical Properties of Molded Article

The abrasion resistance, hardness and chemical resistance of the laminated member for decoration 1 obtained in accordance with the above method (i) were evaluated. Here, the test piece subjected to each test was prepared by irradiating an unheated sample with active energy rays having 500 mJ/cm$^2$. Further, according to the test, the protective film in the laminated member for decoration 1 was peeled from the coating layer at 25° C. and a rate of 5.0 mm/sec.

Also for the laminated member for decoration 2 obtained in accordance with the above-described method (ii) and the laminated member for decoration 3 obtained in accordance with the above-described method (iii), the abrasion resistance, hardness and chemical resistance were similarly evaluated.

Evaluation of Abrasion Resistance

The abrasion resistance of the coating layer after curing (hardcoat layer) was evaluated for the decorative molded articles obtained in Examples and the molded articles obtained in Comparative Examples.

The test was carried out by abrading the surface of the coating layer in a state where the heated sample was irradiated with 500 mJ/cm$^2$ of active energy rays with a cotton cloth 9N, 2000 times.

Evaluation criteria are as follows.
- ○+: No scratches were visually recognized even in the wear test of 9N and 5000 times.
- ○: No scratches were visually recognized.
- □: Five or less scratches were visually recognized.
- x: Many scratches were visually recognized.

Evaluation of Pencil Hardness

The pencil hardness was evaluated for the decorative molded articles obtained in Examples 1 to 49 and the molded articles obtained in Comparative Examples 1 and 2.

In the measurement, the pencil hardness of the coating layer after curing (hardcoat layer) was measured in accordance with JIS K5600-5-4 (1999) Scratch hardness (Pencil method).

Evaluation of Chemical Resistance

The chemical resistance of the coating layer after curing (hardcoat layer) was evaluated in the following procedure for the decorative molded articles obtained in Examples 1 to 49 and the molded articles obtained in Comparative Examples 1 and 2.

Two grams of Neutrogena SUNSCREEN SPF45 was applied to a 10 cm×10 cm test sample over the entire surface thereof evenly with fingers, heated at 80° C. for 4 hours, cooled to room temperature, and washed with water, and the appearance of the hardcoat layer was visually evaluated.

Evaluation criteria are as follows.
- ○: There is no abnormality in appearance.
- ○□: Marks of application can be found, but lifting is not found.
- □: Mild lifting is found.
- x: Severe lifting occurs.

Evaluation of Curling

The curling of the laminated members for decoration (Examples) each having a protective film, a coating layer and a resin substrate were evaluated.

A test sample prepared by cutting a laminated member for decoration into 200 mm×200 mm was heated at 90° C. for 1 hour, taken out, and left at room temperature for 1 hour, and then the four corners of the test sample were measured with a ruler and the warpage was evaluated. Evaluation criteria are as follows.
- ○: The average amount of warpage is 10 mm or less.
- ○□: The average amount of warpage is 10 or more and less than 15 mm.
- □: The average amount of warpage is 15 mm or more and less than 20 mm.
- x: The average amount of warpage is 20 mm or more.

As a result of the evaluation of curling, the results of all the test samples in Examples were "○".

Evaluation Regarding Peeling of Protective Film

The peeling of the protective film was evaluated for the laminated members for decoration (Examples) each having the protective film, the coating layer, and the resin substrate.

A test sample prepared by cutting a laminated member for decoration into 200 mm×200 mm was heated at 90° C. for 1 hour, taken out, and left at room temperature for 1 hour, and then the appearance of the test sample was visually evaluated.

All the test samples in Examples did not develop the peeling of the protective film.

In any one of the laminated members for decoration in Examples, no defects such as squeegee marks and suction marks were observed in the cured coating layer (hardcoat layer) even when a printed layer was formed.

Regarding the coating compositions contained in the coating layers used in Examples, the compositions for forming a coating layer in the state of not being irradiated with active energy rays are compositions that exhibit no change in the shape of molecular weight distribution before and after heating in an atmosphere of 150 to 190° C. for 30 to 60 seconds.

According to the results of the examples, any laminated member for decoration according to the present disclosure can have high stretchability, high physical properties, and high yield.

For example, in any laminated member for decoration of the present disclosure, the coating layer can secure rigidity while being uncured.

Accordingly, the laminated member for decoration of the present disclosure can be molded even into a complicated shape, can reduce the occurrence of defective products during molding, and can have superior hardcoating performance, for example, high hardness, abrasion resistance, and chemical resistance.

Further, the laminated member for decoration according to the present disclosure is good in followability and adhesion between the adhesive layer of the protective film and the coating layer, and can inhibit air entrapment. In addition, it is possible to inhibit defects that may occur on the surface of the adhesive layer of the protective film from being transferred to the uncured coating layer.

Moreover, with any laminated member for decoration of the present disclosure, it is possible to prevent the protective film from peeling that may be caused by the difference in the heat shrinkage of each layer, and curling of the laminated member for decoration can be prevented.

Then, with any laminated member for decoration of the present disclosure, by peeling the protective film and then heating under conditions where the physical properties of the coating layer, etc. are not impaired, the surface roughness caused by the protective layer can be reduce or eliminated, so that a superior appearance, for example gloss can be developed. In addition, the molded article can exhibit a high quality appearance such as having a superior glossiness.

As described above, the laminated member for decoration of the present disclosure have successfully solved a composite problem, so that it can be molded even into a complicated shape and can reduce or inhibit the occurrence of defective products during molding. Moreover, molded articles having superior hardcoating performance, for example, high hardness, abrasion resistance, and chemical resistance, can be obtained.

On the other hand, in Comparative Example 1, the physical property values related to surface roughness, for example, the value of (Rz(bh)/Rz(b)×100) represented by Formula (2) and the relationship between Rz(bh) and Rz(b) represented by Formula (3) are not satisfied. Therefore, there is a problem that the coating layer cannot obtain smoothness. Further, the appearance of the molded article was insufficient.

In Comparative Example 2, since the disappearance ratio of the unreacted (meth)acryloyl groups was outside the scope of the present invention, it was insufficient in various aspects such as abrasion resistance, hardness, and chemical resistance. Moreover, the appearance of the molded article was insufficient.

INDUSTRIAL APPLICABILITY

The laminated member for decoration of the present invention can be molded even in a complicated shape, can reduce the occurrence of defective products during molding, and has superior hardcoating performance, for example, high hardness, abrasion resistance, and chemical resistance. Further, the method for producing a decorative molded article according to the present invention can perform molding even into a complicated shape, can reduce the occurrence of defective products during molding, and can produce a decorative molded article having high hardness, abrasion resistance, chemical resistance, etc.

The invention claimed is:

1. A method for producing a decorative molded article using a laminated member for decoration, the method comprising:

forming an uncured coating layer on a resin substrate, forming a laminated member for decoration, wherein forming the laminated member comprises laminating a protective film comprising an adhesive layer, the adhesive layer comprising an adhesive side and a non-adhesive side, and arranging the adhesive side adjacent to the uncured coating layer on an opposite side of the uncured coating layer from the resin substrate, forming a decorative layer on an opposite side of the resin substrate from the uncured coating layer, and peeling the protective film from the uncured coating layer to obtain the decorative molded article, wherein a surface roughness Rz(a) of the adhesive layer on the adhesive side, the surface roughness being taken in a state where the adhesive layer is not in contact with the uncured coating layer, and a surface roughness Rz(b) of the uncured coating layer in an unheated sample comprising the resin substrate and the uncured coating layer formed by peeling the protective film from the uncured coating layer at 25° C. at a rate of 5.0 mm/sec with a peeling direction set to 170°, the surface roughness being taken on a side opposite from the resin substrate, exhibits a relationship of $$85\% < Rz(b)/Rz(a) \times 100 \leq 110\% \quad (1);$$

the surface roughness Rz(b), and a surface roughness Rz(bh) of the uncured coating layer in a heated sample obtained by heating the unheated sample in an atmosphere of 160° C. for 30 seconds, the surface roughness being taken on a side opposite from the resin substrate, satisfy at least one of Formulas (2) and (3) below:

$$0\% \leq Rz(bh)/Rz(b) \times 100 < 30\% \quad (2), \text{ and}$$

$$0 \leq Rz(bh) \leq Rz(b) < 0.5 \text{ μm} \quad (3);$$

the uncured coating layer has unreacted (meth)acryloyl groups; and in a state where the heated sample has been irradiated with ultraviolet light having a wavelength of 380 nm or less of 500 mJ/cm², 10 to 1000% of the unreacted (meth)acryloyl groups of the uncured coating layer disappear when cured, Rz(a) is 0.01 m or more and 2.0 m or less, Rz(b) is 0.01 μm or more and 2.0 m or less, and Rz(bh) is 0.01 m or more and less than 0.7 m.

2. The method according to claim 1, wherein the formed laminated member has a stretch ratio of 400% or less.

3. The method according to claim 1, wherein when a scratch test is performed at a pressure of 0.5 N on the protective film using an Eriksen hardness tester, no scratch test mark is visible on a surface of the uncured coating layer on a side where the protective film is located.

4. The method according to claim 1, wherein the protective film has an oxygen permeability of 2000 (ml/m² d MPa) or more and 800,000 (ml/m² d MPa) or less at 20° C. and 90% RH, and the adhesive layer has an adhesive strength of 0.025 N/25 mm or more and 1.000 N/25 mm or less on the adhesive side; and in a state where the laminated member for decoration is stretched at 0 to 300% in a heating atmosphere of 150 to 190° C., the uncured coating layer has no cracks, and a stretched decorative molded member has no air layer or has no air bubbles having a diameter of 0.3 mm or more in a plan view taken from a side where the protective film is located, at an interface between the protective film and the uncured coating layer.

5. The method according to claim 1, wherein the protective film comprises at least one protective film substrate having a thickness of 30 μm or more and 100 μm or less selected from the group consisting of a polyethylene film, a polystyrene film, a modified polyolefin film, a polymethylpentene film, a cast polypropylene film, and a biaxially oriented polypropylene film, and the adhesive layer has a thickness of 10 μm or more and 30 m or less;

an adhesive strength of the adhesive side of the adhesive layer is 0.005 N/25 mm or more and 0.025 N/25 mm or less; and in a state where a 0 to 300% stretch is further applied in a heating atmosphere of 150 to 190° C. to the uncured coating layer formed by peeling the protective film in the laminated member from the uncured coating layer at a rate of 5.0 mm/see, the uncured coating layer has no cracks.

6. The method according to claim 1, wherein the uncured coating layer is formed from a composition comprising:

an unsaturated double bond-containing acrylic resin and/or a non-reactive acrylic resin having a weight-average molecular weight (Mw) of 5000 to 100000, and at least one species selected from the group consisting of a polyfunctional (meth)acrylate having an acrylate equivalent of 50 to 500 and a polyfunctional urethane (meth)acrylate having an acrylate equivalent of 50 to 500.

7. The method according to claim 1, wherein the uncured coating layer is formed from a composition comprising an unsaturated double bond-containing acrylic resin and/or a non-reactive acrylic resin, a polyfunctional silicon (meth)acrylate having a weight-average molecular weight (Mw) of 700 to 100000, a fluororesin, and inorganic oxide fine particles.

8. The method according to claim 1, wherein the uncured coating layer is formed from a composition comprising at least one of an ultraviolet absorber and a light stabilizer.

9. The method according to claim 1, wherein the uncured coating layer is formed from a composition that does not change in a shape of molecular weight distribution before and after a heating in an atmosphere of 150 to 190° C. for 30 to 60 seconds.

10. The method according to claim 1, wherein no scratch is visible as a result of a wear test in which a surface of a cured coating layer in a state where a heated sample prepared by heating an unheated sample in an atmosphere of 150 to 190° C. for 30 to 60 seconds has been irradiated with active energy rays of 500 mJ/cm$^2$ is abraded 2000 times with 9 N.

11. The method according to claim 1, further comprising at least one of the following step i) or step ii) after peeling the protective film:

step i) shaping a coating laminated member comprising the uncured coating layer and the resin substrate, forming a cured laminated member by irradiating the coating laminated member after the shaping with active energy rays exceeding 100 mJ/cm$^2$ to cure the coating laminated member, and insert molding a transparent substrate on a side where the decorative layer of the resin substrate in the cured laminated member is located;

step ii) shaping a coating laminated member comprising the uncured coating layer and the resin substrate, forming a semi-cured laminated member by irradiating the coating laminated member after the shaping with active energy rays of 1 mJ/cm$^2$ or more and 100 mJ/cm$^2$ or less to semi-cure the coating laminated member, insert molding a transparent substrate on a side where the decorative layer of the resin substrate in the semi-cured laminated member is located, and irradiating the laminated member obtained by molding the transparent substrate with active energy rays exceeding 100 mJ/cm$^2$ to cure the semi-cured laminated member.

12. The method according to claim 1, further comprising the following steps before peeling the protective film in this order:

shaping the laminated member comprising the decorative layer to obtain a shaped laminated member, then inserting the shaped laminated member in a mold putting a transparent substrate on a side where the decorative layer of the resin substrate in the shaped laminated member is located to obtain a molded laminated member, and then performing irradiation on the molded laminated member with active energy rays exceeding 100 mJ/cm$^2$ to cure the molded laminated member.

* * * * *